US012630690B2

(12) United States Patent
Huber et al.

(10) Patent No.: US 12,630,690 B2
(45) Date of Patent: May 19, 2026

(54) RECYCLING OF PLASTICS BY SOLVENT-TARGETED RECOVERY AND PRECIPITATION (STRAP)

(71) Applicant: Wisconsin Alumni Research Foundation, Madison, WI (US)

(72) Inventors: George W. Huber, Middleton, WI (US); Kevin L. Sánchez-Rivera, Madison, WI (US); Reid C Van Lehn, Madison, WI (US); Ted Walker, Madison, WI (US); Panzheng Zhou, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 791 days.

(21) Appl. No.: 17/989,960

(22) Filed: Nov. 18, 2022

(65) Prior Publication Data

US 2023/0174736 A1 Jun. 8, 2023

Related U.S. Application Data

(60) Provisional application No. 63/280,669, filed on Nov. 18, 2021.

(51) Int. Cl.
*C08J 11/08* (2006.01)

(52) U.S. Cl.
CPC ............ *C08J 11/08* (2013.01); *C08J 2323/06* (2013.01); *C08J 2323/08* (2013.01); *C08J 2323/12* (2013.01); *C08J 2327/06* (2013.01); *C08J 2329/04* (2013.01); *C08J 2367/02* (2013.01); *C08J 2377/02* (2013.01); *C08J 2377/06* (2013.01)

(58) Field of Classification Search
USPC .......................................................... 521/46
See application file for complete search history.

(56) References Cited

U.S. PATENT DOCUMENTS

| | | | |
|---|---|---|---|
| 5,198,471 A | | 3/1993 | Nauman |
| 5,278,282 A | * | 1/1994 | Nauman .................... B29B 7/94 |
| | | | 528/495 |
| 8,138,232 B2 | | 3/2012 | Maeurer |
| 9,616,595 B2 | | 4/2017 | Fullana Font |
| 10,266,479 B2 | | 4/2019 | Vilaplana Artigas |
| 11,655,350 B2 | | 5/2023 | Broderick |
| 2004/0229965 A1 | | 11/2004 | Maurer et al. |
| 2023/0272180 A1 | | 8/2023 | Gorin et al. |

FOREIGN PATENT DOCUMENTS

| | | | |
|---|---|---|---|
| EP | 1419829 A1 | 5/2004 | |
| WO | WO-2004081093 A1 | * 9/2004 | ................ C08J 3/14 |

OTHER PUBLICATIONS

WO2004081093A1 Machine Translation (Year: 2004).*
International Search Report and Written Opinion dated Mar. 27, 2023, for PCT Application No. PCT/US2022/050363.
A. B. Thompson, D. W. Woods, The transitions of polyethylene terephthalate. Trans. Faraday Soc. 52, 1383-1397 (1956).
A. Dutta, A. Sahir, E. Tan, D. Humbird, L. J. Snowden-Swan, P. Meyer, D. S. Jeff Ross, R. Yap, J. Lukas, Process Design and Economics for the Conversion of Lignocellulosic Biomass to Hydrocarbon Fuels Thermochemical Research Pathways with In Situ and Ex Situ Upgrading of Fast Pyrolysis Vapors, National Renewable Energy Laboratory, Pacific Northwest National Laboratory, PNNL-23823, 2015.
A. J. Hadi, G. F. Najmuldeen, K. B. Yusoh, Dissolution/reprecipitation technique for waste polyolefin recycling using new pure and blend organic solvents, J. Polym. Eng. 2013, 33, 471-481.
A. Klamt, Conductor-like screening model for real solvents: A new approach to the quantitative calculation of solvation phenomena, J. Phys. Chem. 1995, 99, 2224-2235.
A. Klamt, F. Eckert, M. Hornig, M. E. Beck, T. Bürger, Prediction of aqueous solubility of drugs and pesticides with COSMO-RS. J. Comput. Chem. 23, 275-281 (2002).
A. Klamt, V. Jonas, T. Bürger, J. C. Lohrenz, Refinement and parametrization of COSMO-RS, J. Phys. Chem. A 1998, 102, 5074-5085.
B. Fan et al., Polyglyoxylates: A versatile class of triggerable self-immolative polymers from readily accessible monomers. J. Am. Chem. Soc. 136, 10116-10123 (2014).
C. M. Hansen, Hansen solubility parameters: a user's handbook, CRC press, 2007. (Book—No Copy Provided).
C. M. Rochman et al., Policy: Classify plastic waste as hazardous. Nature 494, 169-171 (2013).
Commodity Resin Prices Rise, but PP Falls, Plastics Technology 2021, www.ptonline.com/articles/commodity-resin-prices-rise-but-ppfalls.
D. C. C. Habgood, A. F. A. Hoadley, L. Zhang, Chem. Eng. Res. Des. 2015, 102, 57-68.
Dimethyl Sulfoxide (DMSO) Solubility Data, Oct. 1, 2007, XP055089467, Retrieved from the Internet: URL:http://www.gaylordchemical.com/uploads/images/pdfs/literature/102B_english.pdf.

(Continued)

*Primary Examiner* — Terressa Boykin

(74) *Attorney, Agent, or Firm* — Joseph T. Leone; Yanjun Ma; DeWitt LLP

(57) ABSTRACT

Disclosed herein is a method to recover constituent polymers in multilayer plastic films or mixed plastic wastes. The method comprises selectively dissolving a polymer in a solvent at a temperature, wherein the polymer is soluble, but other polymers in the multilayer plastic film or mixed plastic waste are not. The solubilized polymer is then separated from the multilayer plastic film or mixed plastic waste by mechanical filtration and precipitated by changing the temperature and/or adding a cosolvent. The process is repeated for each of the polymer component, resulting in a number of segregated streams that can then be recycled. Computational tools can be used to select solvent systems and temperatures that selectively dissolve different polymers from among all of the components.

29 Claims, 35 Drawing Sheets

(56) References Cited

OTHER PUBLICATIONS

D. Lithner et al., Environmental and health hazard ranking and assessment of plastic polymers based on chemical composition. Sci. Total Environ. 409, 3309-3324 (2011).

D. S. Achilias, C. Roupakias, P. Megalokonomos, A. A. Lappas, E. V. Antonakou, Chemical recycling of plastic wastes made from polyethylene (LDPE and HDPE) and polypropylene (PP). J. Hazard. Mater. 149, 536-542 (2007).

D. Zhang, E. A. del Rio-Chanona, N. Shah. Life cycle assessment of bio-based sustainable polylimonene carbonate production processes, International Symposium on Process Systems Engineering (PSE 2018) 2018, 1693-1698.

E. K. Y. Chen et al., Self-immolative polymers containing rapidly cyclizing spacers: Toward rapid depolymerization rates. Macromolecules 45, 7364-7374 (2012).

G. Bergsma, M. Bijleveld, M. Otten, B. Krutwagen, LCA: Recycling Van Kunststof Verpakkingsafval Uit Huishoudens (CE Delft, Delft, 2011).

G. Pappa, C. Boukouvalas, C. Giannaris, N. Ntaras, V. Zografos, K. Magoulas, A. Lygeros, D. Tassios, The selective dissolution/precipitation technique for polymer recycling: A pilot unit application. Resour. Conserv. Recycl. 34, 33-44 (2001).

G. S. Weeden, Jr., N. H. Soepriatna, N. H. Wang, Method for efficient recovery of high-purity polycarbonates from electronic waste, Environ. Sci. Technol. 2015, 49, 2425-2433.

G. Towler, R. Sinnott, Chemical Engineering Design Principles, Practice and Economics of Plant and Process Design, Elsevier, 2013. (Book—No Copy Provided).

H. H. Khoo, LCA of plastic waste recovery into recycled materials, energy and fuels in Singapore. Resour. Conserv. Recycl. 145, 67-77 (2019).

I. Vollmer, M. J. F. Jenks, M. C. P. Roelands, R. J. White, T. Harmelen, P. Wild, G. P. Laan, F. Meirer, J. T. F. Keurentjes, B. M. Weckhuysen, Beyond mechanical recycling: Giving new life to plastic waste. Angew. Chem. Int. Ed. 59, 15402-15423 (2020).

J. M. Garcia, M. L. Robertson, The future of plastics recycling. Science 358, 870-872 (2017).

J. Kahlen, K. Masuch, K. Leonhard, Modelling cellulose solubilities in ionic liquids using COSMO-RS, Green Chem. 2010, 12, 2172-2181.

J. M. Wang, W. Wang, P. A. Kollman, D. A. Case, Automatic atom type and bond type perception in molecular mechanical calculations. J. Mol. Graph. Model. 25, 247-260 (2006).

J. M. Wang, R. M. Wolf, J. W. Caldwell, P. A. Kollman, D. A. Case, Development and testing of a general AMBER force field. J. Comput. Chem. 25, 1157-1174 (2004).

K. Fukushima et al., Advanced chemical recycling of poly (ethylene terephthalate) through organocatalytic aminolysis. *Polym. Chem.* 4, 1610-1616 (2013).

K. L. Sánchez-Rivera, P. Zhou, M. S. Kim, L. D. G. Chávez, S. Grey, K. Nelson, S. Wang, I. Hermans, V. M. Zavala, R. C. Van Lehn, G. W. Huber, Reducing Antisolvent Use in the STRAP Process by Enabling a Temperature-Controlled Polymer Dissolution and Precipitation for the Recycling of Multilayer Plastic Films, ChemSusChem. 2021, 14, 4317-4329.

K. Wohnig, Sustainable Plastic Innocation: Closing the Loop, in GPCA PlastiCon, 2018.

L. K. Massey, Permeability Properties of Plastics and Elastomers: A Guide to Packaging and Barrier Materials. William Andrew, Norwich, NY, 2003. (Book—No Copy Provided).

M. A. Samus, G. Rossi, Methanol absorption in ethylene-vinyl alcohol copolymers: Relation between solvent diffusion and changes in glass transition temperature in glassy polymeric materials. Macromolecules 29, 2275-2288 (1996).

M. Frisch, G. Trucks, H. Schlegel, G. Scuseria, M. Robb, J. Cheeseman, G. Scalmani, V. Barone, G. Petersson, H. Nakatsuji, Gaussian, Inc. Wallingford, CT, 2016. (Not Available).

M. Joelovich, Optimal Method for Production of Amorphous Cellulose with Increased Enzymatic Digestibility, Org. Polym. Mater. Res. 2019, 1.

M. J. Abraham, T. Murtola, R. Schulz, S. Páll, J. C. Smith, B. Hess, E. Lindahl, GROMACS: High performance molecular simulations through multi-level parallelism from laptops to supercomputers. SoftwareX 1-2, 19-25 (2015).

M. Niaounakis, Recycling of Flexible Plastic Packaging. Plastics Design Library, William Andrew, 2020. (Book—No Copy Provided).

N. A. Rorrer et al., Combining reclaimed PET with bio-based monomers enables plastics upcycling. *Joule* 3, 1006-1027 (2019).

O. G. Piringer, A. L. Baner, *Plastic Packaging: Interactions with Food and Pharmaceuticals*. Wiley-VCH Verlag GmbH & Co. KGaA, Weinheim, 2008. (Book—No Copy Provided).

O. Horodytska, F. J. Valdés, A. Fullana, Plastic flexible films waste management—A state of art review. *Waste Manag.* 77, 413-425 (2018).

P. Lacy, J. Rutqvist, *Waste to Wealth: The Circular Economy Advantage*. Palgrave Macmillan, New York, NY, 2016. (Book—No Copy Provided).

P. Muhs et al., Recycling PET bottles by depolymerization. Kunstst. Ger. *Plast.* 82, 289-292 (1992).

P. Naviroj, J. Treacy, C. Urffer, Chemical Recycling of Plastics by Dissolution (University of Pennsylvania, 2019).

R. Coles, M. J. Kirwan, *Food and Beverage Packaging Technology*. Blackwell Publishing Ltd, 2011. (Book—No Copy Provided).

R. H. J. M. Gradus, P. H. L. Nillesen, E. Dijkgraaf, R. J. Van Koppen, A cost-effectiveness analysis for incineration or recycling of Dutch household plastic waste. Ecol. Econ. 135, 22-28 (2017).

S. Abbott, C. M. Hansen, Hansen Solubility Parameters in Practice (2008); Hansen-Solubility.com.

S. H. Krishna, K. Huang, K. J. Barnett, J. He, C. T. Maravelias, J. A. Dumesic, G. W. Huber, M. de bruyn, B. M. Weckhuysen, Oxygenated commodity chemicals from chemo-catalytic conversion of biomass derived heterocycles. AIChE J. 64, 1910-1922 (2018).

S. Ugduler, K. M. Van Geem, M. Roosen, E. I. P. Delbeke, S. De Meester, Challenges and opportunities of solvent-based additive extraction methods for plastic recycling, Waste Manage. 2020, 104, 148-182.

T. Chen, J. Zhang, H. You, RSC Adv. 2016, 6, 102778-102790.

T. W. Walker, N. Frelka, Z. Shen, A. K. Chew, J. Banick, S. Grey, J. A. Dumesic, R. C. V. Lehn, G. W. Huber, Recycling of multilayer plastic packaging materials by solvent-targeted recovery and precipitation, Sci. Adv. 2020, 6 (47), eaba7599.

V. Turbomole, a development of University of Karlsruhe and Forschungszentrum Karlsruhe GmbH, 1989-2007, TURBOMOLE GmbH, since 2007. There is no corresponding record for this reference. [Google Scholar], (2010).

W. Cobbs Jr., R. Burton, Crystallization of polyethylene terephthalate. J. Polym. Sci. 10, 275-290 (1953).

W. Jiang, X. Qiao, K. Sun, Mechanical and thermal properties of thermoplastic acetylated starch/poly (ethylene-co-vinyl alcohol) blends. Carbohydr. Polym. 65, 139-143 (2006).

Z. Shen, R. C. Van Lehn, Solvent selection for the separation of lignin-derived monomers using the conductor-like screening model for real solvents. Ind. Eng. Chem. Res. 59, 7755-7764 (2020).

Z. Zhang, I. J. Britt, M. A. Tung, Water absorption in EVOH films and its influence on glass transition temperature. J. Polym. Sci. Pol. Phys. 37, 691-699 (1999).

* cited by examiner

Hansen solubility parameters (solvent screening)

Molecular dynamics (Conformation sampling)

COSMO-RS (solubility predictions)

STRAP solvent selection and process conditions

PE-selective solvents

EVOH-selective solvents

PET-selective solvents

Antisolvents

Fig. 3D

RECYCLING OF PLASTICS BY SOLVENT-TARGETED RECOVERY AND PRECIPITATION (STRAP)

CROSS-REFERENCE TO RELATED APPLICATIONS

Priority is hereby claimed to provisional application Ser. No. 63/280,669, filed Nov. 18, 2021, which is incorporated herein by reference.

FEDERAL FUNDING STATEMENT

This invention was made with government support under DE-EE0009285 awarded by the US Department of Energy. The government has certain rights in the invention.

BACKGROUND

Multilayer plastic films are ubiquitous in the flexible and rigid plastic packaging industry (L. K. Massey, *Permeability Properties of Plastics and Elastomers: A Guide to Packaging and Barrier Materials*. William Andrew, Norwich, N.Y., 2003). These complex materials consist of distinct layers of heteropolymers such as polyolefins and polyesters, with each layer selected to contribute a corresponding property advantage to the bulk material, depending on the application (O. G. Piringer, A. L. Baner, *Plastic Packaging: Interactions with Food and Pharmaceuticals*. Wiley-VCH Verlag GmbH & Co. KGaA, Weinheim, 2008).

The versatility and affordability of multilayer plastic films have created a large demand for them. Accordingly, more than 100 million tons of multilayer thermoplastics are produced globally each year (D. Lithner et al., Environmental and health hazard ranking and assessment of plastic polymers based on chemical composition. *Sci. Total Environ.* 409, 3309-3324 (2011)). However, up to 40% of manufactured multilayer films go unused in the final packaging application because of inefficiencies in the packaging fabrication processes, such as cutting the film into templated shapes (R. Coles, M. J. Kirwan, *Food and Beverage Packaging Technology*. Blackwell Publishing Ltd, 2011). These unused fractions represent large, postindustrial waste (PIW) sources that are not contaminated with food or other impurities and could be readily captured and reintroduced into multilayer film manufacturing equipment. However, multilayer packaging materials cannot be recycled using traditional plastic recycling technologies (like mechanical recycling) owing to the chemical incompatibility of the different layers. To be compatible with existing recycling infrastructures, multilayer plastic waste scraps would first need to be partially or fully deconstructed into their constituent resins before being cofed into processing equipment to produce reconstituted multilayer films (J. M. Garcia, M. L. Robertson, The future of plastics recycling. *Science* 358, 870-872 (2017)). Currently, no commercially viable technologies exist to do so. Multilayer plastics present in postconsumer municipal waste streams present a similar problem: Technologies exist to recycle single-component plastics based on mechanical or chemically assisted methods (N. A. Rorrer et al., Combining reclaimed PET with bio-based monomers enables plastics upcycling. *Joule* 3, 1006-1027 (2019)), but no strategies exist to process multilayer films in closed-loop primary recycling schemes (O. Horodytska, F. J. Valdés, A. Fullana, Plastic flexible films waste management—A state of art review. *Waste Manag.* 77, 413-425 (2018); P. Lacy, J. Rutqvist, *Waste to Wealth: The Circular Economy Advan-*

*tage*. Palgrave Macmillan, New York, N.Y., 2016). Furthermore, in contrast to PIW, these postconsumer waste streams are contaminated with food and other impurities, making the cleaning of them a challenge. Together, these technology gaps represent key facets of an ongoing human and environmental health crisis that is characterized by outcomes such as the accumulation of plastic waste in oceans, fetid human habitats, and dead marine life (C. M. Rochman et al., Policy: Classify plastic waste as hazardous. *Nature* 494, 169-171 (2013)).

One approach for recovering individual polymer components from mixed plastic wastes is to selectively dissolve the targeted polymer in a solvent system (G. Pappa et al., The selective dissolution/precipitation technique for polymer recycling: A pilot unit application. *Resour. Conserv. Recycl.* 34, 33-44 (2001); D. S. Achilias et al., Chemical recycling of plastic wastes made from polyethylene (LDPE and HDPE) and polypropylene (PP). *J. Hazard. Mater.* 149, 536-542 (2007)). Technologies based on this strategy have been studied and are currently being implemented by a number of companies. For example, APK's Newcycling process is based on preferentially dissolving polyethylene (PE) or polypropylene from multilayer plastics in a solvent system consisting of alkanes, isooctane, or cycloalkanes (I. Vollmer et al., Beyond mechanical recycling: Giving new life to plastic waste. *Angew. Chem. Int. Ed.* 59, 15402-15423 (2020)); dissolved polymers are recovered from solution and pelletized by extrusion (M. Niaounakis, Recycling of Flexible Plastic Packaging. Plastics Design Library, William Andrew, 2020; K. Wohnig, in GPCA PlastiCon, 2018). CreaSolv process is based on selective dissolution of polyolefins using a solvent selected from a group of aliphatic hydrocarbons. An antisolvent consisting of mono/polyhydroxy hydrocarbons, e.g., 1-propanol or 1,3-propanediol, is then used to precipitate the polyolefin from the mixture (U.S. Pat. No. 8,138,232). PureCycle's process consists of contacting the plastic waste with a proprietary solvent at elevated temperatures and pressures to obtain the purified polypropylene (PP). VinyLoop® process of Solvay separates polyvinyl chloride (PVC) from polymer coatings and involves both a mechanical step and a selective dissolution step using a proprietary solvent. The examples above indicate that selective dissolution represents a promising approach to recycling of complex plastics wastes. However, these technologies process large volumes of waste plastics but recover only one or two polymer components in pure form.

Several chemical depolymerization processes have been developed for conversion of polyesters into monomer units including Eastman's methanolysis process (P. Muhs et al., Recycling PET bottles by depolymerization. Kunstst. Ger. Plast. 82, 289-292 (1992)), IBM's Volcat process (K. Fukushima et al., Advanced chemical recycling of poly (ethylene terephthalate) through organocatalytic aminolysis. *Polym. Chem.* 4, 1610-1616 (2013)), and Ioniqa's catalytic PET process (U.S. Pat. No. 10,266,479). These technologies are likely expensive to operate, as they involve reconstituting the virgin polymer from their corresponding monomers and require more separation steps. Other basic research efforts in waste plastic recycling are aimed at replacing multilayer film components with polymers that are more easily depolymerized or biodegraded; however, these efforts represent longer-term approaches that are far from commercialization (B. Fan et al., Polyglyoxylates: A versatile class of triggerable self-immolative polymers from readily accessible monomers. *J. Am. Chem. Soc.* 136, 10116-10123 (2014); E. K. Y. Chen et al., Self-immolative polymers containing rapidly cyclizing spacers: Toward rapid depolymerization rates. *Macromolecules* 45, 7364-7374 (2012)).

The multiplicity of these examples demonstrates the timeliness of the problem around recycling of complex, multilayer plastics. Further technology development is needed for the more efficient collection, sorting, separation, and recycling of these multilayer packaging materials, as they represent an increasing amount of postindustrial and postconsumer waste.

SUMMARY

Disclosed herein is a method to recover constituent polymers in a multilayer plastic film or mixed plastic waste. The method comprises:

(a) selectively dissolving a polymer in a solvent at a temperature, wherein the polymer component is soluble, but other polymers in the multilayer plastic film or mixed plastic waste are not, to yield a solubilized polymer;

(b) separating the solubilized polymer from the multilayer film or mixed plastic waste by mechanical filtration;

(c) precipitating the solubilized polymer from the solvent; and (d) repeating steps (a), (b), and (c) for each different polymers in the multilayer plastic film or mixed plastic waste using a solvent and a temperature that selectively dissolves each different polymer.

The method further comprises using computational tools to select the solvent and the temperature that selectively dissolves a polymer from among all of the components present in the multilayer plastic film or mixed plastic waste. The computational tools include calculating Hansen solubility parameters (HSPs), molecular dynamics (MD) simulations, and a combined quantum chemical and statistical mechanical modeling.

The method further comprises a deinking step to remove ink from the multilayer plastic film or mixed plastic waste before step (a). In some embodiments, the deinking step is conducted by treating the multilayer plastic film or mixed plastic waste in a solvent comprising tetrahydrofuran (THF) and N,N-dimethylformamide (DMF). Alternatively, the deinking step can be omitted entirely or performed solely on the polymer fraction separated using PET. It has been found that most inks used for polymers are separated into the PET fraction.

The method further comprises cutting the multilayer plastic film or mixed plastic waste into stamps ≤1 cm² before step (a). In certain versions, the method further comprises shredding the multilayer plastic film or mixed plastic waste into strips ≤5 mm, ≤4 mm, ≤3 mm, or ≤2 mm before step (a).

In some embodiments, in step (c), the solubilized polymer is precipitated from the solvent by adding an antisolvent. In some embodiments, in step (c), the solubilized polymer is precipitated from the solvent by changing the temperature of the solvent.

In one version of the method, the multiplayer plastic film consists essentially of polyethylene (PE), ethylene vinyl alcohol (EVOH) and polyethylene terephthalate (PET). In step (a), the PE is selectively dissolved in toluene at about 110° C., and the EVOH is selectively dissolved in dimethyl sulfoxide (DMSO) at about 95° C. In step (c), the solubilized PE is precipitated by adding acetone, and the solubilized EVOH is precipitated by adding water.

Alternatively, in step (a), the PE is selectively dissolved in toluene or a $C_6$ to $C_{12}$ alkane at about 110° C., and the EVOH is selectively dissolved in a solvent comprising DMSO and water at about 95° C. In step (c), the solubilized PE is precipitated by lowering the temperature of the toluene to about 35° C., and the solubilized EVOH is precipitated by lowering the temperature of the DMSO and water to about 35° C.

In one version of the method, the multilayer plastic film consisting essentially of PE, EVOH and PET further comprises a tie layer comprising ethylene vinyl acetate (EVA). The EVA is dissolved in toluene at about 110° C. in step (a) and precipitated by adding acetone in step (c) together with the PE, and the EVA is separated from the PE after step (c) by selectively dissolving the EVA in N-methylpyrrolidinone (NMP). Alternatively, the EVA is dissolved in toluene at about 110° C. in step (a) together with the PE, and the EVA is separated from the PE in step (c) by lowering the temperature of the toluene to about 35° C. to precipitate the PE.

In one version of the method, the multilayer plastic film consists essentially of polyethylene terephthalate glycol (PETG), PE, EVOH and PET. In step (a), the PETG is selectively dissolved in a solvent comprising DMF and THF at about 87° C., the PE is selectively dissolved in toluene at about 110° C., and the EVOH is selectively dissolved in a solvent comprising DMSO and water at about 95° C. In step (c), the solubilized PETG is precipitated by adding 1-propanol, the solubilized PE is precipitated by lowering the temperature of the toluene to about 35° C., and the solubilized EVOH is precipitated by lowering the temperature of the DMSO and water to about 35° C.

In another version of the method, the mixed plastic waste consists essentially of PE, polypropylene (PP), polyvinyl chloride (PVC), PET and polyamide (PA). In step (a), the PE is selectively dissolved in dodecane at about 100° C., and the PP is selectively dissolved in toluene at about 110° C. In step (c), the solubilized PE is precipitated by lowering the temperature of the dodecane to about 35° C., and the solubilized PP is precipitated by lowering the temperature of the toluene to about 35° C.

In yet another version of the method, the multilayer plastic film consists essentially of PE, EVOH and nylon. In step (a), the PE is selectively dissolved in toluene at about 110° C., and the EVOH is selectively dissolved in a solvent comprising DMSO and water at about 85° C. In step (c), the solubilized PE is precipitated by lowering the temperature of the toluene to about 35° C., and the solubilized EVOH is precipitated by lowering the temperature of the DMSO and water to about 35° C.

In a still further version of the method, the mixed plastic waste consists essentially of PVC, low-density polyethylene (LDPE), PP, high-density polyethylene (HDPE), PET, nylon 6,6,6, nylon 6, and nylon 6,6. In step (a), the PVC is selectively dissolved in THF at about 68° C., the LDPE is selectively dissolved in toluene at about 85° C., the PP is selectively dissolved in tetrahydropyran (THP) at about 90° C., the HDPE is selectively dissolved in toluene at about 110° C., the PET is selectively dissolved in γ-valerolactone (GVL) at about 160° C., the nylon 6,6,6 is selectively dissolved in 1,2-propanediol at about 135° C., the nylon 6 is selectively dissolved in DMSO at about 145° C., and the nylon 6,6 is selectively dissolved in formic acid at about 65° C. In step (c), the solubilized PVC is precipitated by adding water, the solubilized LDPE is precipitated by lowering the temperature of the toluene to about 35° C., the solubilized PP is precipitated by lowering the temperature of the THP to about 35° C., the solubilized HDPE is precipitated by lowering the temperature of the toluene to about 35° C., the solubilized PET is precipitated by lowering the temperature of the GVL to about 35° C., the solubilized nylon 6,6,6 is precipitated by lowering the temperature of the 1,2-propane-diol to about 35° C., the solubilized nylon 6 is precipitated by lowering the temperature of the DMSO to about 35° C., and the solubilized nylon 6,6 is precipitated by adding water.

The objects and advantages of the disclosure will appear more fully from the following detailed description of the preferred embodiment of the disclosure made in conjunction with the accompanying drawings.

BRIEF DESCRIPTION OF THE DRAWINGS

FIGS. 3A-3D. Computational tools used to guide the solvent selection for the STRAP process. FIG. 3A. Process of selecting solvents using a combination of HSPs, classical MD simulations, and COSMO-RS calculations. The solubility of PE, EVOH, and PET was estimated using HSPs for 22 common solvents. Solvents selective to each polymer were then used for subsequent calculations. Classical MD simulations were performed to provide input oligomer configurations for COSMO-RS, which uses ab initio methods to calculate the screening charge density of each molecule. COSMO-RS calculations then determine thermodynamic properties, such as solubilities. FIG. 3B. PE-, EVOH-, and PET-selective solvents and antisolvents (in which none of the polymers are soluble) determined from HSP calculations. DMSO, dimethyl sulfoxide; DMF, N,N-dimethylformamide; THFA, tetrahydrofurfuryl alcohol; THF, tetrahydrofuran; NMP, N-methylpyrrolidinone; GVL, γ-valerolactone; IPA, isopropyl alcohol. FIG. 3C. Predicted solubility versus temperature for PE, EVOH, and PET in pure toluene (PE selective) and DMSO (EVOH selective) computed using COSMO-RS. FIG. 3D. Predicted solubility versus solvent-antisolvent mass ratio for PE (upper panel) and EVOH (lower panel). Acetone and water were used as antisolvents for the dissolution of PE and EVOH, respectively. Black dashed lines in FIGS. 3C and 3D are the temperatures and mass ratios selected for the STRAP process.

FIG. 4A. Process schematic for deconstructing a commercial Amcor multilayer film (Amcor plc, Zurich, Switzerland) into its constituent resins using the STRAP process. FIG. 4B. Photographs of comingled plastic resin beads consisting of 7:2:2 PE, EVOH, and PET and the recovered resins using the same procedure shown in FIG. 4A. The mass balance for this process is 99.40 wt % with respect to the initial mass of the physical mixture, with an SE of ±0.19 wt %. Photo credit: Theodore W. Walker, University of Wisconsin-Madison. FIG. 4C. Photographs of the commercial Amcor film and the recovered resin using the STRAP process in FIG. 4A. The mass balance for this process is 100.44 wt % with respect to the initial mass of the commercial film, with an SE of ±1.39 wt %. Photo credit: Theodore W. Walker, University of Wisconsin-Madison.

FIG. 12A: PE; FIG. 12B: EVOH; FIG. 12C: PET.

FIG. 15A: PETG; FIG. 15B: PE; FIG. 15C: EVOH; FIG. 15D: EVA; FIG. 15E: PET.

DETAILED DESCRIPTION

Definitions and Abbreviations

ATR-FTIR=attenuated total reflectance Fourier transform infrared spectroscopy. COSMO/COSMO-RS=conductor-like screening model for realistic solvents. CPE=chlorinated polyethylene. DMF=N,N-dimethylformamide. DMSO=dimethyl sulfoxide. EVA=ethylene vinyl acetate. EVOH=ethylene vinyl alcohol. GVL=γ-valerolactone. HDPE=high-density polyethylene. HDXLPE=high-density cross-linked polyethylene. HMWPE=high-molecular-weight polyethylene. HSP=Hansen solubility parameter. IPA=isopropyl alcohol. LDPE=low-density polyethylene. LLDPE=linear low-density polyethylene. MD=molecular dynamics. NMP=N-methylpyrrolidinone. PA=polyamide. PC=polycarbonate. PE=polyethylene. PEI=polyetherimide. PES=polyether sulfone. PET=polyethylene terephthalate. PETG=polyethylene terephthalate glycol. PEX=cross-linked polyethylene. PIW=post-industrial waste. POM=polyoxymethylene. PP=polypropylene. PPO=polyphenylene oxide. PPS=polyphenylene sulfide. PS=polystyrene. PTFE=polytetrafluoroethylene. PVC=polyvinyl chloride. PVDF=polyvinylidene fluoride. SAN=styrene acrylonitrile. SMA=styrene maleic anhydride. STRAP=solvent-targeted recovery and precipitation. THF=tetrahydrofuran. THP=tetrahydropyran. UHMWPE=ultra-high-molecular-weight polyethylene. ULMWPE=ultra-low-molecular-weight polyethylene. VLDPE=very-low-density polyethylene.

As used herein, the term "about" refers to ±10% of the variable referenced.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

The elements and method steps described herein can be used in any combination whether explicitly described or not, unless otherwise specified or clearly implied to the contrary by the context in which the referenced combination is made.

All combinations of method steps as used herein can be performed in any order, unless otherwise specified or clearly implied to the contrary by the context in which the referenced combination is made.

The system disclosed herein my comprise, consist of, or consist essentially of the various steps and elements disclosed herein.

It is understood that the disclosure is not confined to the particular elements and method steps herein illustrated and described, but embraces such modified forms thereof as come within the scope of the claims.

Solvent-Targeted Recovery and Precipitation (STRAP)

Figure 1:
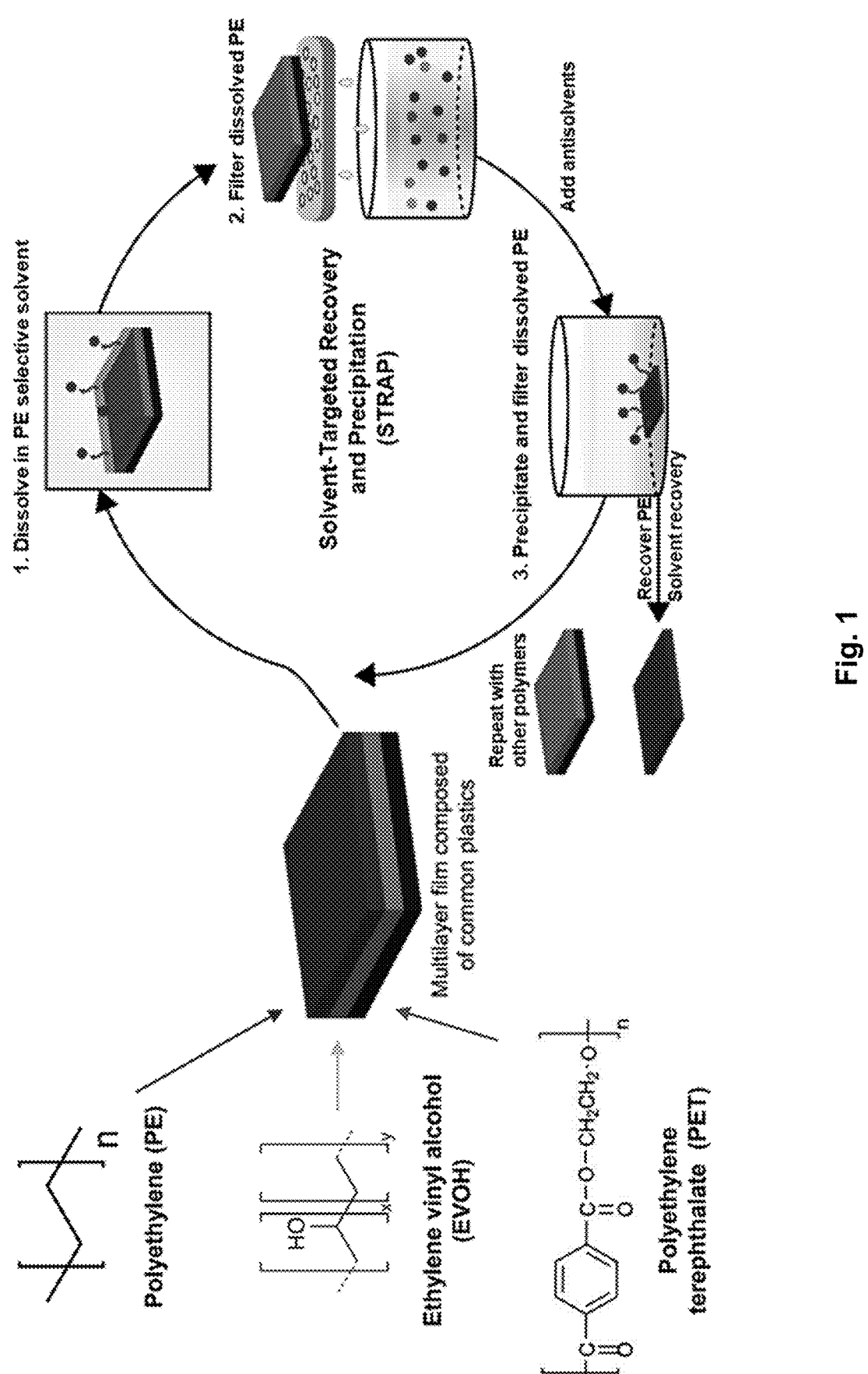
FIG. 1. Overview of the solvent-targeted recovery and precipitation (STRAP) process. Schematic representation of a multilayer plastic film consisting of three common polymer resins, and key steps in the STRAP process for segregating these component resins into pure, recyclable streams using a series of solvent washes.

Disclosed herein is a method to deconstruct multilayer plastic films or mixed plastic wastes with three or more polymer components into their constituent resins via a series of solvent washes in an approach that we call solvent-targeted recovery and precipitation (STRAP). As shown in FIG. 1 as an example, the general principle underlying the STRAP process is to selectively dissolve a single polymer component in a solvent system in which the targeted polymer component is soluble, but the other polymer components are not. The solubilized polymer component is then separated from the multilayer plastic film or mixed plastic waste by mechanical filtration and precipitated by changing the temperature and/or adding a cosolvent (i.e., an antisolvent) that renders the dissolved polymer insoluble. The solvent and antisolvent are distilled and reused in this process, and the targeted polymer component is recovered as a dry, pure solid. This process is repeated for each of the polymer components in the multilayer plastic film or mixed plastic waste, resulting in several segregated streams that can then be recycled.

The method disclosed herein can be used to separate and recover polymer components in multilayer plastic films or mixed plastic wastes with three or more polymer components, wherein the polymer components include, but are not limited to, polyethylene (PE), ethylene viny alcohol (EVOH), polyethylene terephthalate (PET), polypropene (PP), polyvinyl chloride (PVC), polyamide (PA), polyethylene terephthalate glycol (PETG), polystyrene (PS), polycarbonate (PC), polyether sulfone (PES), polyoxymethylene (POM), polyetherimide (PEI), polyphenylene oxide (PPO), polyphenylene sulfide (PPS), polyvinylidene fluoride (PVDF), polytetrafluoroethylene (PTFE), nylon, styrene maleic anhydride (SMA), and styrene acrylonitrile (SAN). Among these polymers, PE is often classified by its density and branching, including ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), and chlorinated polyethylene (CPE). All of these types of polyethylene are included within the definition of the unadorned word polyethylene ("PE") as used herein.

The multilayer plastic films may further comprise any number of tie layers (also known as adhesive films), such as ethylene vinyl acetate (EVA), wet bond adhesives, and additives (such as TiO$_2$) that may be present in small quantities compared with the principal resin fractions (typically <1 wt % of the total composition).

Selective solvents used in the method can be any common industrial solvents, including, but not limited to, toluene, dodecane, o-xylene, p-xylene, benzene, cyclohexane, n-butanol, dimethylformamide (DMF), tetrahydrofurfuryl alcohol, dimethyl sulfoxide (DMSO), tetrahydrofuran (THF), tetrahydropyran (THP), N-methyl-2-pyrrolidnone (NMP), γ-valerolactone (GVL), acetone, 1-propanol, 1,2-propanediol, isopropyl alcohol (IPA), methanol, water, formic acid, furfural, acetonitrile, 1,4-dioxane, cyrene, and dihydropyran.

The key to successful implementation of the STRAP process is the ability to preselect solvent systems and temperatures capable of selectively dissolving a single polymer component from among all the components present in a multilayer plastic film or mixed plastic waste. Given the complexity of multilayer plastic films and mixed plastic wastes, which are often composed of more than 10 components, and the large number of industrial solvents and solvent mixtures available, solvent selection is challenging using experimental screening alone. The aforementioned tie layers and additives present in actual multilayer plastic films further complicate the problem of identifying an appropriate series of solvent-mediated steps to deconstruct the bulk material into a manageable series of segregated streams, as they are present in dilute quantities (<1 wt %) and are often ill-defined.

Figure 2:
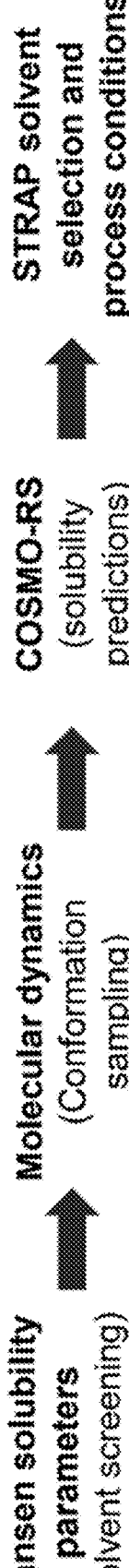
FIG. 2. Flowchart of using computational tools to select solvent systems and temperatures that selectively dissolve a single polymer component from among all the components present in a multilayer plastic film or mixed plastic waste.

Thus, disclosed herein is a guided approach to rationally select solvents using calculations of Hansen solubility parameters (HSPs), molecular dynamics (MD) simulations, and a combined quantum chemical and statistical mechanical modeling approach named the conductor-like screening model for realistic solvents (COSMO-RS), as summarized in FIG. 2.

The solubility of a polymer can be characterized by three HSPs that quantify the strength of dispersion interactions ($\delta_D$), dipole-dipole interactions ($\delta_P$), and hydrogen bonding interactions ($\delta_H$) between solvent and polymer molecules. These three parameters are used as coordinates that locate the compounds in HSP space. Each polymer has an additional radius parameter, $R_0$, that defines a sphere in HSP space. HSPs (and values of $R_0$) for a wide range of pure solvents and polymers have been tabulated based on empirical measurements to obtain self-consistent values (S. Abbott, C. M. Hansen, *Hansen Solubility Parameters in Practice* (2008); Hansen-Solubility.com). HSPs for solvents are estimated as functions of their measured enthalpies of vaporization. HSPs for polymers are determined by experimentally quantifying polymer solubility in reference solvent systems that span HSP space and by identifying a spherical subspace centered on the HSPs of the polymer such that solvents that promote polymer dissolution fall within the sphere. $R_0$ therefore depends on the polymer's solubility in the reference solvent systems.

"Good" solvents (those that promote polymer dissolution at the desired concentration) that are not included in the reference set can then be identified by calculating the geometric distance ($R_a$) between HSP values for the solvent (solv.) and polymer (poly.) in $\delta_D$-$\delta_P$-$\delta_H$ space using Equation 1:

$$R_a^2 = 4\left(\delta_D^{solv.} - \delta_D^{poly.}\right)^2 + \left(\delta_P^{solv.} - \delta_P^{poly.}\right)^2 + \left(\delta_H^{solv.} - \delta_H^{poly.}\right)^2 \quad \text{(Equation 1)}$$

Figure 3A:
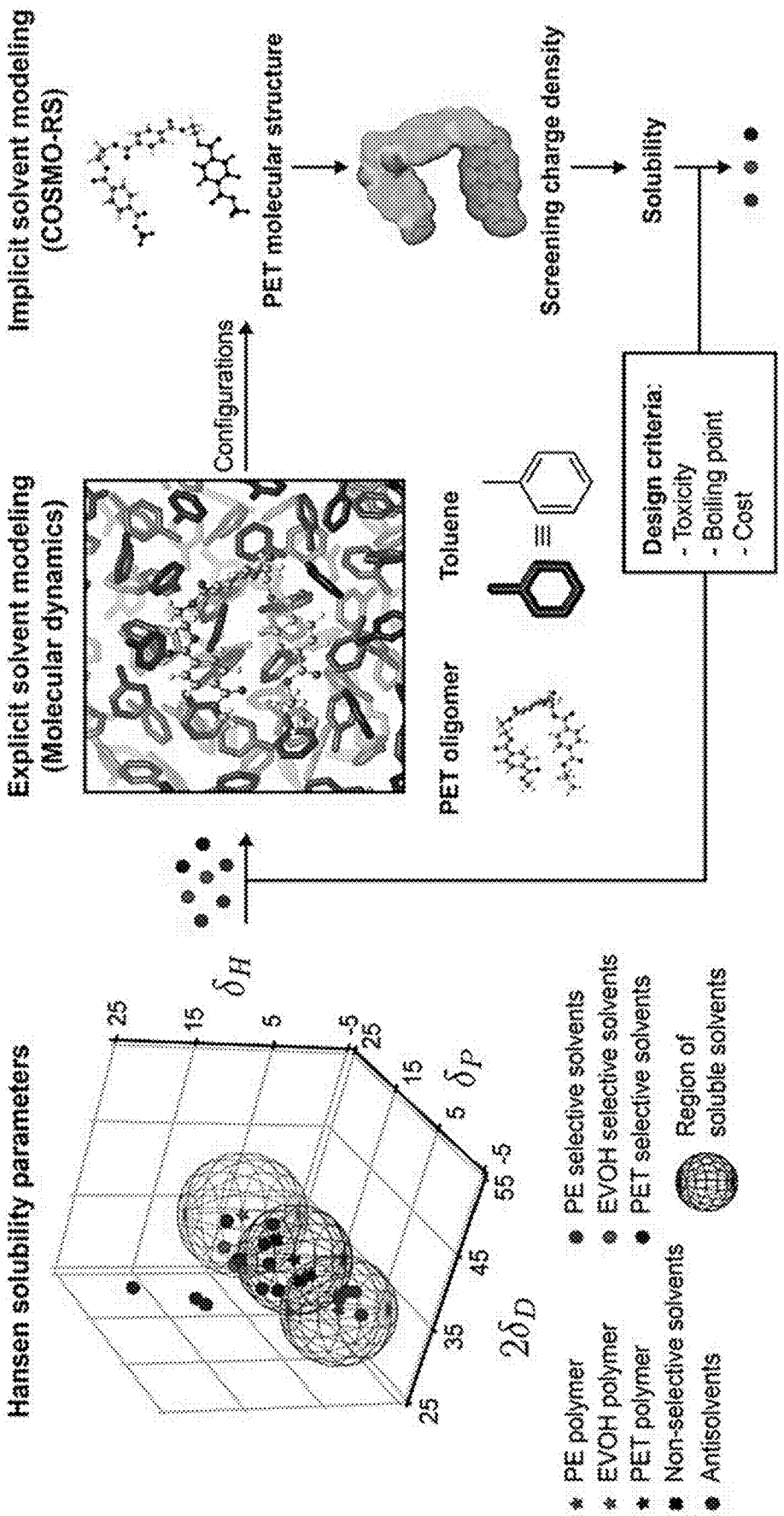

Good solvents are defined as those that fall within the solubility sphere for the corresponding polymer (see FIG. 3A as an example) or equivalently when the ratio $R_a/R_0$ is less than one (1). HSP calculations can thus select good solvents (with $R_a/R_0$<1) and poor solvents (with $R_a/R_0$>1) using only a small number of experiments. Antisolvents can also be identified as solvents in which none of the polymer layers are readily soluble.

MD simulations and COSMO-RS are used for further quantitative solubility predictions. MD simulations provide detailed calculations of polymer structures and conformations. COSMO-RS enables predictions of polymer solubility as a function of both the temperature and the liquid phase composition using the conformations from MD. COSMO-RS combines unimolecular density functional theory calculations with statistical thermodynamics methods to account for molecular interactions, thus enabling a priori predictions of polymer solubility in solvent mixtures as a function of both the temperature and the composition of the liquid phase (A. Klamt, Conductor-like screening model for real solvents: A new approach to the quantitative calculation of solvation phenomena. *J. Phys. Chem.* 99, 2224-2235 (1995); A. Klamt et al., Refinement and parametrization of COSMO-RS. *J. Phys. Chem. A* 102, 5074-5085 (1998)). See Examples 1 and 2 for exemplary methods of conducting MD simulations and COSMO-RS.

In certain versions, the method further comprises a deinking step to remove ink from printed plastics before dissolving the polymer components. Methods of removing ink from printed plastics have been previously reported, such as using a mixture of surfactants in water (U.S. Pat. No. 9,616,595), and detergent comprising nonionic surfactant, organic solvent, and aqueous mineral base (European Patent Application Publication No. EP1419829A1). Any reagents and methods that are effective in removing ink from printed plastics are contemplated to be useful in the method disclosed herein. In preferred embodiments, the deinking step is conducted by treating the multilayer plastic film or mixed plastic waste in a solvent comprising THF and DMF at 83° C.

The temperature of the solvents and dissolution time for dissolving the polymers can be optimized to improve efficiency of the STRAP process. Size of the plastics being treated is one of the factors affecting the dissolution time. Shredding the plastics into smaller particles helps to decrease the dissolution time of the polymer components. Preferably, the multilayer plastic films or mixed plastic wastes are cut into stamps ≤1 cm$^2$. More preferably, the multilayer plastic films or mixed plastic wastes are shredded to strips of ≤5 mm, ≤4 mm, ≤3 mm, or ≤2 mm. In one embodiment, the multilayer plastic films or mixed plastic wastes are shredded to strips of ≤2 mm. At the size of ≤2 mm, the dissolution time of the plastics can be reduced to less than 5 minutes.

Also disclosed herein are exemplary embodiments of the method, applied to recover constituent polymers from various multilayer plastic films and mixed plastic wastes. The exemplary embodiments are described in detail in the Examples. The exemplary embodiments are not to limit the scope of the disclosure.

1. A method to recover constituent polymers in a multi-layer plastic film consisting essentially of PE, EVOH, and PET (See Example 1). The method comprises:
   (i) selectively dissolving the PE in toluene at about 110° C., separating the solubilized PE from the EVOH and PET by mechanical filtration, and precipitating the solubilized PE by adding acetone; and
   (ii) selectively dissolving the EVOH in DMSO at about 95° C., separating the solubilized EVOH from the PET by mechanical filtration, and precipitating the solubilized EVOH by adding water.

2. A method to recover constituent polymers in a multi-layer plastic film consisting essentially of PE, EVOH, and PET (See Example 2). The method comprises:
   (i) selectively dissolving the PE in toluene at about 110° C., separating the solubilized PE from the EVOH and PET by mechanical filtration, and precipitating the solubilized PE by lowering the temperature of the toluene to about 35° C.; and
   (ii) selectively dissolving the EVOH in a solvent comprising DMSO and water at about 95° C., separating the solubilized EVOH from the PET by mechanical filtration, and precipitating the solubilized EVOH by lowering the temperature of the DMSO and water to about 35° C.

3. A method to recover constituent polymers in a multi-layer plastic film consisting essentially of PE, EVOH, PET, and a tie layer of EVA (See Example 1). The method comprises:
   (i) selectively dissolving the PE and EVA in toluene at about 110° C., separating the solubilized PE and EVA from the EVOH and PET by mechanical filtration, and precipitating the solubilized PE and EVA by adding acetone;
   (ii) selectively dissolving the EVA in NMP at about 170° C., separating the solubilized EVA from the PE by mechanical filtration, and precipitating the solubilized EVA by adding acetone; and
   (iii) selectively dissolving the EVOH in DMSO at about 95° C., separating the solubilized EVOH from the PET by mechanical filtration, and precipitating the solubilized EVOH by adding water.

4. A method to recover constituent polymers in a multi-layer plastic film consisting essentially of PE, EVOH, PET, and a tie layer of EVA (See Example 2). The method comprises:
   (i) selectively dissolving the PE and EVA in toluene at about 110° C., separating the solubilized PE and EVA from the EVOH and PET by mechanical filtration, and precipitating the solubilized PE by lowering the temperature of the toluene to about 35° C.;
   (ii) separating the solubilized EVA from the precipitated PE by mechanical filtration, and precipitating the solubilized EVA by adding acetone; and
   (iii) selectively dissolving the EVOH in a solvent comprising DMSO and water at about 95° C., separating the solubilized EVOH from the PET by mechanical filtration, and precipitating the solubilized EVOH by lowering the temperature of the DMSO and water to about 35° C.

5. A method to recover constituent polymers in a multi-layer plastic film consisting essentially of PETG, PE, EVOH, and PET (See Example 2). The method comprises:
   (i) selectively dissolving the PETG in a solvent comprising DMF and THF at about 87° C., separating the solubilized PETG from the PE, EVOH, and PET by mechanical filtration, and precipitating the solubilized PETG by adding 1-propanol;
   (ii) selectively dissolving the PE in toluene at about 110° C., separating the solubilized PE from the EVOH and PET by mechanical filtration, and precipitating the solubilized PE by lowering the temperature of the toluene to about 35° C.; and
   (iii) selectively dissolving the EVOH in a solvent comprising DMSO and water at about 95° C., separating the solubilized EVOH from the PET by mechanical filtration, and precipitating the solubilized EVOH by lowering the temperature of the DMSO and water to about 35° C.

6. A method to recover constituent polymers in a multi-layer plastic film consisting essentially of PE, EVOH, and PET with a deinking step (See Example 3). The method comprises:
   (i) treating the multilayer plastic film in a solvent comprising THF and DMF at about 83° C. to remove ink from the multilayer plastic film; and
   (ii) recovering polymers as described in the exemplary embodiments 1 or 2.

7. A method to recover PE and PP from a mixed plastic waste consisting essentially of PE, PP, PVC, PET, and PA (See Example 5). The method comprises:
   (i) selectively dissolving the PE in dodecane at about 100° C., separating the solubilized PE from the PP, PVC, PET and PA by mechanical filtration, and precipitating the solubilized PE by lowering the temperature of the dodecane to about 35° C.; and
   (ii) selectively dissolving the PP in toluene at about 110° C., separating the solubilized PP from the PVC, PET and PA by mechanical filtration, and precipitating the solubilized PP by lowering the temperature of the toluene to about 35° C.

8. A method to recover constituent polymers in a multi-player plastic film consisting essentially of PE, EVOH, and nylons (See Example 6). The method comprises:
   (i) selectively dissolving the PE in toluene at about 110° C., separating the solubilized PE from the EVOH and nylons by mechanical filtration, and precipitating the solubilized PE by lowering the temperature of the toluene to about 35° C.; and
   (ii) selectively dissolving the EVOH in a solvent comprising DMSO and water at about 85° C., separating the solubilized EVOH from the nylons by mechanical filtration, and precipitating the solubilized EVOH by lowering the temperature of the DMSO and water to about 35° C.

9. A method to recover constituent polymers in a mixed plastic waste consisting essentially of PVC, LDPE, PP, HDPE, PET, nylon 6,6,6, nylon 6, and nylon 6,6 (See Example 6). The method comprises:
   (i) selectively dissolving the PVC in THF at about 68° C., separating the solubilized PVC from the remaining mixed plastic waste by mechanical filtration, and precipitating the solubilized PVC by adding water;
   (ii) selectively dissolving the LDPE in toluene at about 85° C., separating the solubilized LDPE from the remaining mixed plastic waste by mechanical filtration, and precipitating the solubilized LDPE by lowering the temperature of the toluene to about 35° C.;

(iii) selectively dissolving the PP in THP at about 90°
C., separating the solubilized PP from the remaining
mixed plastic waste by mechanical filtration, and
precipitating the solubilized PP by lowering the
temperature of the THP to about 35° C.;

(iv) selectively dissolving the HDPE in toluene at about
110° C., separating the solubilized HDPE from the
remaining mixed plastic waste by mechanical filtra-
tion, and precipitating the solubilized HDPE by
lowering the temperature of the toluene to about 35°
C.;

(v) selectively dissolving the PET in GVL at about 160°
C., separating the solubilized PET from the remain-
ing mixed plastic waste by mechanical filtration, and
precipitating the solubilized PET by lowering the
temperature of the GVL to about 35

(vi) selectively dissolving the nylon 6,6,6 in 1,2-pro-
panediol at about 135° C., separating the solubilized
nylon 6,6,6 from the remaining mixed plastic waste
by mechanical filtration, and precipitating the solu-
bilized nylon 6,6,6 by lowering the temperature of
the 1,2-propanediol to about 35° C.;

(vii) selectively dissolving the nylon 6 in DMSO at
about 145° C., separating the solubilized nylon 6
from the remaining mixed plastic waste by mechani-
cal filtration, and precipitating the solubilized nylon
6 by lowering the temperature of the DMSO to about
35° C.; and (viii) selectively dissolving the nylon 6,6 in formic acid
at about 65° C., separating the solubilized nylon 6,6
from the remaining mixed plastic waste by mechani-
cal filtration, and precipitating the solubilized nylon
6,6 by adding water.

While specific embodiments disclosed herein have been
shown and described in detail to illustrate the application of
the principles stated above, it will be understood that the
disclosure may be embodied otherwise without departing
from such principles.

EXAMPLES

Example 1. Recycling of Multilayer Plastic
Packaging Materials by Solvent-Targeted Recovery
and Precipitation In this Example, we demonstrate the STRAP process by
separating three representative polymer resins—PE, EVOH,
and PET—from an actual postindustrial multilayer film
(manufactured by Amcor Flexibles) that is primarily com-
posed of these three components. We achieved separation of
these three components with nearly 100% material effi-
ciency, recovering the individual resins in a chemically pure
form, through sequential solubilization of each component
in a solvent system identified by molecular modeling of
temperature-dependent polymer solubilities. Detailed tech-
noeconomic analyses demonstrate that, in a postindustrial
operating environment characterized by minimum volumes
of 5400 tons/year and near-constant film compositions, the
STRAP process could recycle the Amcor multilayer film into
pure, corresponding resins at a cost comparable to the virgin
materials. Therefore, the STRAP process represents a real-
istic and near-term approach to design solvent systems for
recycling multilayer plastics. See Walker et al. [33] pub-
lished on Nov. 20, 2020, incorporated herein by reference in
its entirety.

Materials and Methods

Materials: Model resins were obtained from vendors and
used as received: Soarnol EVOH (Mitsubishi Chemical, 32 mole percent ethylene), high-density PE (ExxonMobil
Chemical; molecular weight, 7845.30 Da), and Array
9921M PET (DAK Americas). Solvents and antisolvents
were obtained from vendors and used as received: acetone
(Fisher Scientific, histological grade), water (Alfa Aesar,
high-performance liquid chromatography grade), toluene
(Sigma-Aldrich, >99.5%), and DMSO (Sigma-Aldrich,
American Chemical Society reagent grade). The model
multilayer film was obtained from Amcor Flexibles (Com-
mercial film, proprietary formulation).

ATR-FTIR spectroscopy: ATR-FTIR spectroscopy was
conducted using a Bruker Optics Vertex system with a
diamond-germanium ATR single reflection crystal. Samples
were dried in a vacuum oven overnight to remove water
content before analysis and were pressed uniformly against
the diamond surface using a spring-loaded anvil. Sample
spectra were obtained in triplicates using an average of 128
scans over the range between 400 and 4000 cm$^{-1}$ with a
spectral resolution of 2 cm$^{-1}$. Air was used as background.

Differential scanning calorimetry: Glass transition tem-
peratures of PET and EVOH samples were determined by
differential scanning calorimetry on a TA Instruments Q100
calorimeter equipped with a liquid nitrogen—cooled refrig-
eration unit. Temperature ramps were calibrated with an
empty pan reference cell. The heating rate was 5° C. min$^{-1}$,
and 20 mg of sample was used in each experiment. The glass
transition temperature was determined using the TA Instru-
ment—provided analytical software that locates the maxi-
mum in the apparent heat capacity of the sample over the
observed temperature range, as per standard methods.

Headspace gas chromatography—flame ionization detec-
tor tests: One gram of each of the samples was sealed inside
a 20-ml headspace vial. The vials were heated at 130° C. for
5 min using a Teledyne Tekmar "Versa" headspace autosam-
pler and delivered to an Agilent 7890 GC with an Rtx-1701
column. The resulting peaks were compared to an external
standard containing 1 mg of each of the solvents in 1 ml of
a high boiling glycol ether, where 1 mg is equivalent to 1000
ppm in 1 g.

Computational and technoeconomic modeling methods:
Technoeconomic modeling was performed in the Aspen Plus
suite. HSPs ($\delta_D$, $\delta_P$, and $\delta_H$) and values of $R_0$ were taken
from [1]. COSMO-RS calculations were carried out using
COSMOtherm 19 software with the parameterization file
named BP_TZVPD_FINE_18 [2, 3]. All density functional
theory calculations were performed using the TUR-
BOMOLE 7.3 software [4]. All classical MD simulations
used to generate polymer conformations for the COSMO-RS
calculations were performed using GROMACS 2016 [5].
Polymer and solvent molecules were parameterized using
Antechamber and the Generalized AMBER force fields [6,
7].

MSPs of recycled polymers afforded from separation of
the PE, EVOH, and PET components in the Amcor Com-
mercial film using the STRAP process were estimated using
a process model developed in Aspen Plus (V11.0 Aspen
Technology). To this end, the STRAP process was divided
into two sections: (i) a PE separation process section and (ii)
an EVOH/PET separation process section. Process models
for the polymer dissolution units (stirred tanks), polymer
precipitation units (settling tanks), and solvent/antisolvent
separation units (distillation columns) were developed in the
Aspen Plus modeling suite, with corresponding performance
metrics based on the experimental data reported here. Pro-
cess models for feed handling equipment such as shredders, floating tanks, friction washers, dewatering machines, and thermal dryers were adapted from previous work and scaled appropriately [8].

Results

Computational Tools Used to Select Solvents for the STRAP Process

Figure 3B:
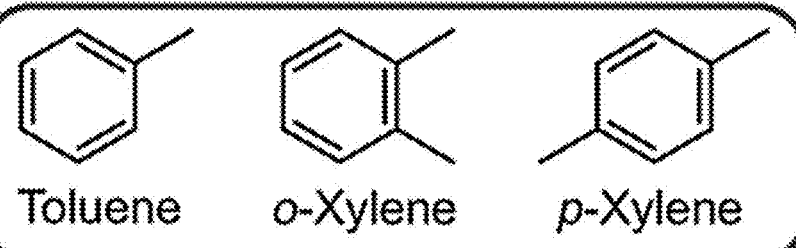
Figure 3B:
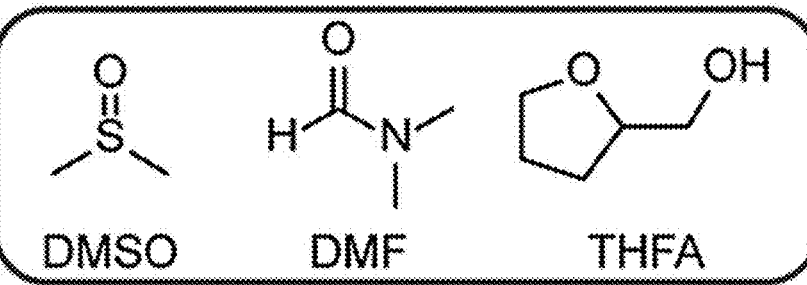
Figure 3B:
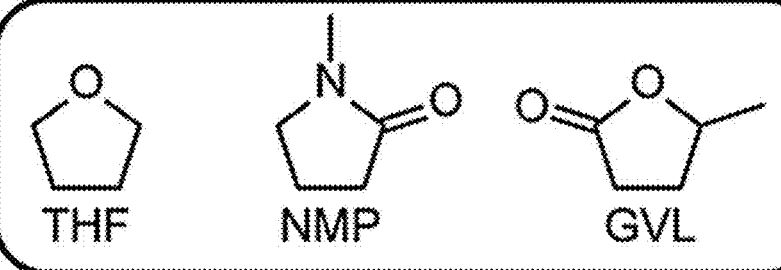
Figure 3B:
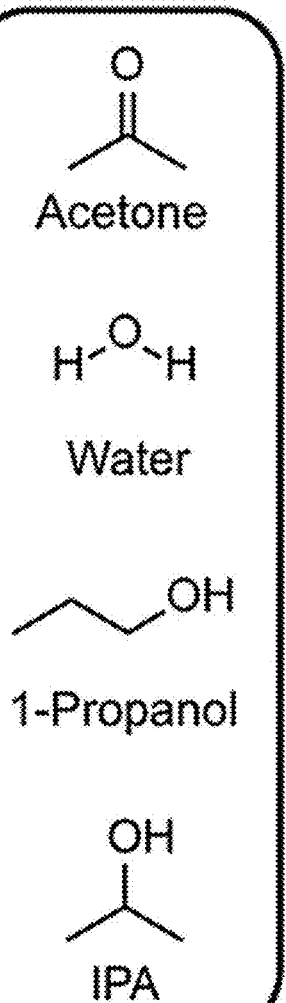
Figure 3C:
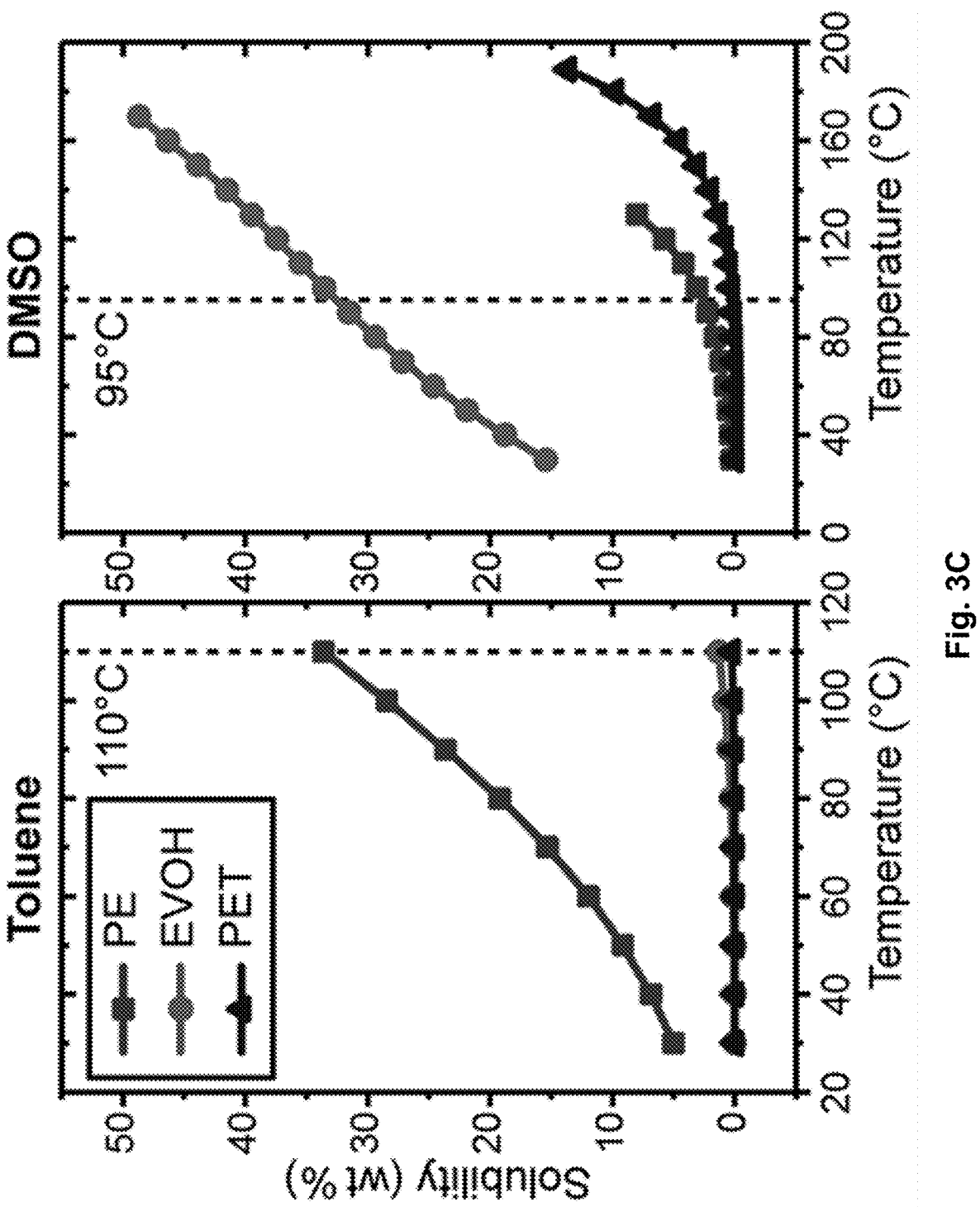
Figure 3D:
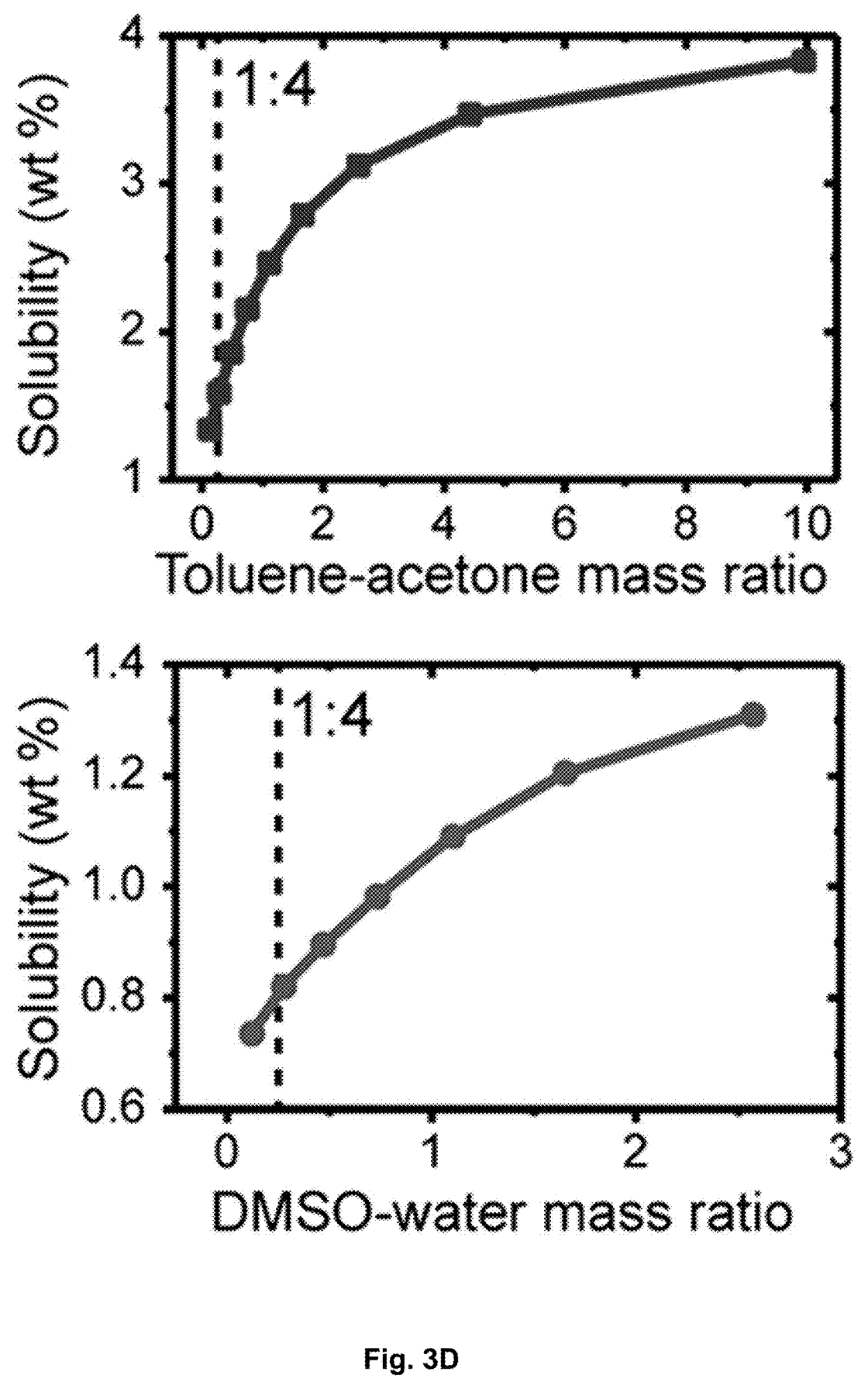

We tabulated HSPs for 22 common industrial solvents from [1] and compared with HSPs for PE, EVOH, and PET to determine solvents suitable for selective dissolution of each resin from among physical mixtures of the three (FIG. 3B). HSPs for a subset of solvents considered are listed in Table 1. On the basis of these calculations and consideration of design criteria relating to cost, co-miscibility of solvents and antisolvents, and toxicity limits, we selected toluene/acetone and dimethyl sulfoxide (DMSO)/water mixtures as solvent/antisolvent systems for selectively dissolving/recovering PE and EVOH resins, respectively. The HSP analysis does not predict PET to be readily soluble in any of these solvents.

tions (FIG. 3C). In toluene, the solubility of PE increases more rapidly than PET and EVOH with temperature, and the solubility of PET or EVOH never exceeds a few weight percent in the temperature range considered. Therefore, we chose the boiling point of toluene (110° C.) for the separation of PE. In DMSO, although the solubility of EVOH is much higher than the solubilities of PET and PE, the PE solubility begins to increase near 100° C. We thus chose to separate EVOH in DMSO at 95° C. We lastly computed the solubilities of PE in a toluene-acetone mixture and EVOH in a DMSO-water mixture by varying the solvent-to-antisolvent mass ratios (FIG. 3D). Both solubilities decrease as the fraction of antisolvent increases. We chose a mass ratio of 1:4 DMSO:water for precipitation, which is close to the lowest mass ratios we calculated.

Table 1 lists the normalized HSP interaction radii ($R_a/R_0$), COSMORS—predicted solubilities, and experimentally determined solubility limits for PE, EVOH, and PET in select solvent systems. As expected, the highest experimentally determined solubilities are obtained for the solvent

TABLE 1

Solubilities of PE, EVOH, and PET in select solvent systems determined by HSPs ($R_a/R_0$), COSMO-RS calculations, and experiments. $R_a/R_0$ is the ratio of the polymer-solvent distance to the interaction radius of the polymer ($R_0$) in $\delta_D - \delta_P - \delta_H$ space. $R_a/R_0$ less than unity means that the polymer is likely to dissolve in the solvent, whereas Ra/Ro greater than unity means that the polymer is insoluble in the solvent. ND indicates nondetected solubilities.

| Component resin | Solvent system | Temperature (° C.) | $R_a/R_0$ | COSMO-RS solubility (wt %) | Experimental solubility (wt %) |
|---|---|---|---|---|---|
| PE | Toluene | 110 | 0.37 | 33.62 | 14.56* |
| PE | DMSO | 95 | 2.66 | 2.69 | 0.04 |
| PE | 1:4 toluene:acetone | 25 | 1.31 | 1.57 | ND |
| PE | 1:4 DMSO:water | 25 | 5.53 | 0.00 | ND |
| EVOH | Toluene | 110 | 2.00 | 0.27 | 0.00 |
| EVOH | DMSO | 95 | 1.03 | 32.54 | 14.05 |
| EVOH | 1:4 toluene:acetone | 25 | 1.53 | 0.13 | ND |
| EVOH | 1:4 DMSO:water | 25 | 3.53 | 0.82 | ND |
| PET | Toluene | 110 | 1.06 | 1.33 | 0.00 |
| PET | DMSO | 95 | 1.65 | 0.25 | 0.02 |
| PET | 1:4 toluene:acetone | 25 | 0.91 | 0.00 | ND |
| PET | 1:4 DMSO:water | 25 | 4.80 | 0.00 | ND |

*Upper limit of PE wt % in toluene tested, as higher concentrations resulted in a viscous solution that was difficult to stir. This value therefore represents a lower limit for PE solubility in toluene at the temperature indicated.

We next performed COSMO-RS calculations to estimate process conditions (temperature and specific mixture compositions) for efficient material recovery. To consider different polymer configurations, we performed classical MD simulations of a single oligomer in solution. The lowest energy configurations were then input to COSMO-RS and used to calculate the solubilities of the three polymers in the same 22 solvents for which HSPs were computed. Good solvents (i.e., with high polymer solubility) identified by COSMO-RS largely overlapped with those selected based on HSPs, indicating that both methods produce similar solvent selections. Toluene and DMSO are among the top candidate solvents that selectively dissolve PE and EVOH, respectively, based on both methods. Both methods also indicate that tetrahydrofuran (THF) is a possible candidate for selectively dissolving PET, but the COSMO-RS calculations suggest that solubility would still be low at room temperature.

Figure 4A:
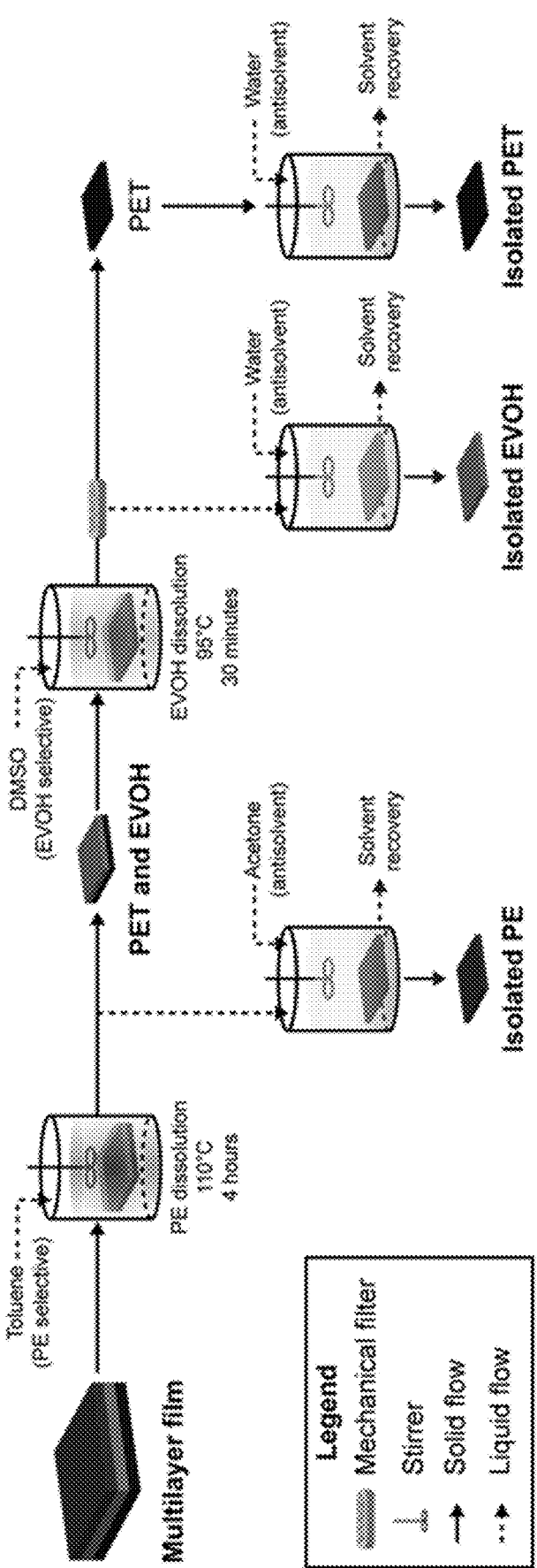
FIGS. 4A-4C. STRAP process separates PE, EVOH, and PET mixtures.

We next calculated the solubilities of all three polymers in toluene and DMSO at temperatures ranging from room temperature to the boiling point of each solvent to determine the temperatures necessary to facilitate the desired separasystems selected from simulations, with discrepancies between the predicted and experimental solubilities due in part to uncertainty in the crystallinity of the polymer samples. Together with FIGS. 3A-3D, the results in Table 1 form the basis for a process to separate a mixture consisting of PE, EVOH, and PET into pure resins consisting of three steps (FIG. 4A):

1) Selectively dissolving the PE fraction in toluene at 110° C. and then separating the solubilized fraction from the EVOH and PET via mechanical filtration;

2) Selectively dissolving the EVOH fraction in DMSO at 95° C. and then separating the solubilized fraction from the remaining PET via mechanical filtration; and 3) Recovering the solubilized PE and EVOH fractions by lowering the corresponding solutions' temperatures to 25° C. and adding four masses of acetone or water, respectively, to precipitate the polymer resins as solids. The recovered PE and EVOH are then separated from the toluene-acetone or DMSO-water mixtures by filtration. The solvents used in this process can then be separated via distillation and reused.

STRAP Process Used to Separate PE, EVOH, and PET

Figure 4B:
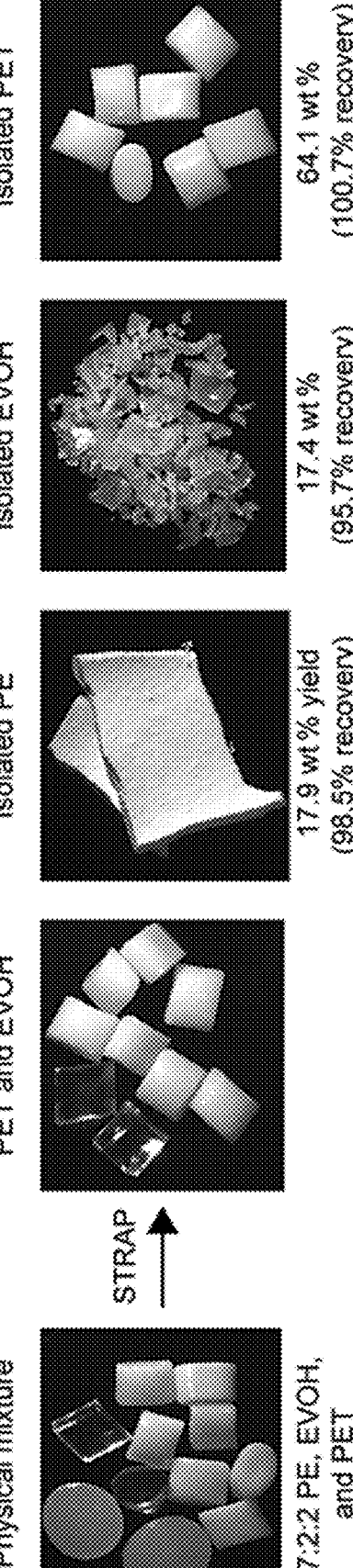

To demonstrate the STRAP process using the protocol outlined above, we first attempted to separate a physical mixture of resin beads consisting of 7:2:2 PET:EVOH:PE by weight. As shown in FIG. 4B, near quantitative yields of the original polymers were recovered (98.5 wt % recovery of PE, 95.7 wt % recovery of EVOH, and 100.7 wt % recovery of PET). The solid fractions isolated from this process were essentially pure in their individual PE, EVOH, or PET components, as expressed by their Fourier transform infrared (FTIR) spectra (FIG. 5).

Figure 4C:
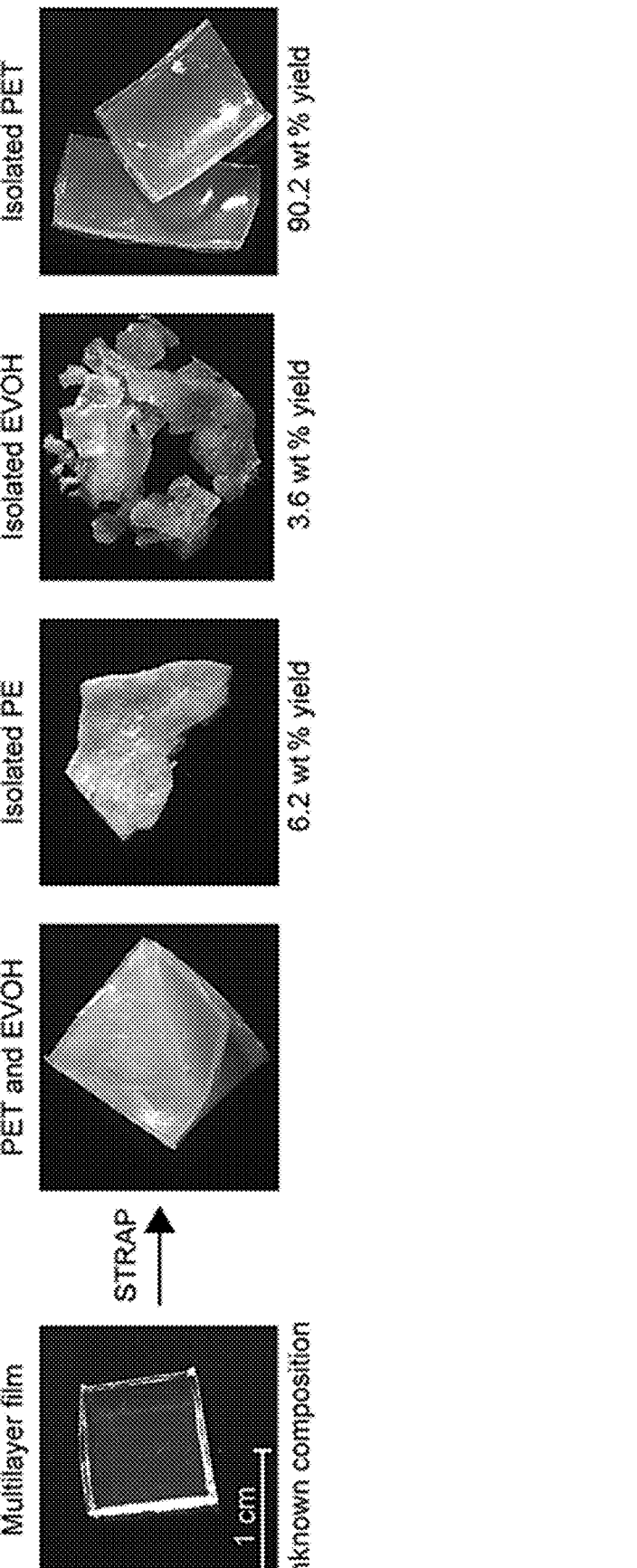

We next attempted to deconstruct an actual postindustrial, rigid multilayer film manufactured by Amcor Flexibles. This multilayer film consists primarily of PET with PE and EVOH. The film was cut into 1×1 cm² stamps and stirred in a solvent system consisting of toluene at 110° C., and then a solvent consisting of DMSO at 95° C., each with a solid-to-liquid ratio of 1:4 by mass. Following vacuum filtration at 95° C., the filtered solutions were combined with an antisolvent at room temperature consisting of four masses of acetone or water with respect to toluene or DMSO, and the resulting mixtures were allowed to cool to room temperature before filtering out the precipitated solids. The resulting three solid fractions were all washed with water and dried in a vacuum oven overnight at 85° C. to remove residual solvents. Near quantitative recovery of the pure resins was achieved with a total mass balance of 100.4 wt % with an SE of ±1.39 wt % between three replicate experiments (FIG. 4C).

Characterizing the Solids from the STRAP Process

Figure 5:
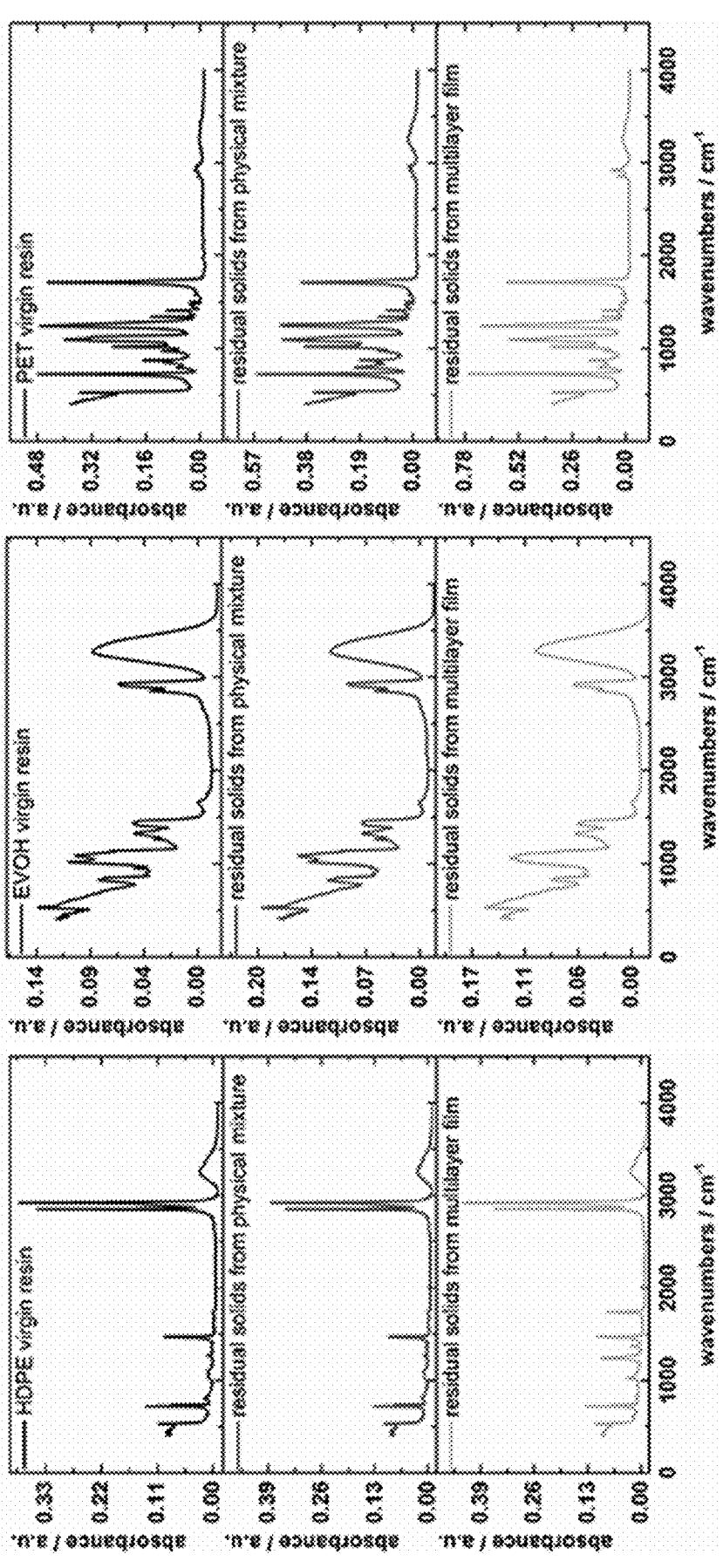
FIG. 5. ATR-FTIR spectra for: a) HDPE, b) EVOH, and c) PET. ATR-FTIR spectra are displayed for virgin resin beads (top), and solids collected from a physical mixture of resin bead (middle) and an actual Amcor commercial multilayer film (bottom) in the STRAP process.

FIG. 5 displays the attenuated total reflectance (ATR)—FTIR spectra corresponding to representative solid materials recovered from the experiments described above. As express by their ATR-FTIR spectra, the PET, EVOH, and PE recovered from the physical mixture are indistinguishable from the same, corresponding virgin resins. These results demonstrate that the STRAP process is able to separate a physical mixture of PET, EVOH, and PE into three solid fractions that are essentially pure in the individual resin components. Likewise, the virgin PET and the PET-rich solids recovered from the Amcor multilayer film are indistinguishable from one another, indicating a complete separation of PET from the multilayer film. Similar results were achieved for the EVOH fraction recovered from the multilayer film.

The toluene-soluble material recovered from the Amcor multilayer film contains primarily PE with an EVA impurity (FIG. 5). The presence of this EVA component (a copolymer tie layer) was not known a priori, and its removal is not necessary for the recycling of the PE in Amcor equipment. Nonetheless, a third solvent-mediated separation step was performed to complete the separation of these two components by dissolving the EVA component in N-methylpyrrolidinone (NMP) in which PE is immiscible. The resulting solids (FIG. 6) displayed a marked decrease in the EVA contaminant, as expressed by a reduction in the corresponding spectral feature in the FTIR signature.

Having demonstrated the near-complete separation of three representative polymer components of a multilayer film, we tested the physical properties of the recovered solids to assess their suitability for reuse in standard industrial processing equipment like blown film extruders. The glass transition temperatures ($T_g$) for the PET and EVOH fractions tested in this Example are displayed in Table 2. The $T_g$ of PE is difficult to measure, and therefore, these tests were not conducted in this Example. The $T_g$ for the EVOH fractions recovered from a physical mixture and the actual multilayer film are unchanged from the virgin resin and are similar to literature values [9-11]. The $T_g$ for the PE recovered from the multilayer film is slightly lower than the $T_g$ for PE recovered from the physical mixture. However, the $T_g$ for the PET fraction recovered from the physical mixture is unchanged compared with the virgin resin and similar to reported values [12, 13]. These results suggest that the $T_g$ of the PET is slightly modified during the process used to manufacture the multilayer film but not during the STRAP process. We note that, under the conditions studied in the Example, we do not expect the average molecular weight of the PE, EVOH, and PET resins to change during the dissolution/recrystallization process. Although not performed in this Example, this behavior could be confirmed by gel permeation chromatography coupled with multiangle laser light scattering.

TABLE 2

Glass transition temperatures for recovered solids materials and virgin plastics as measured by differential scanning calorimetry.

| | Component resin or solid fraction | Glass transition temperature (° C.) | Source |
|---|---|---|---|
| EVOH | Reference values | 55-63 | [9-11] |
| | Virgin resin | 62.12 | This Example |
| | From physical mixture | 62.15 | This Example |
| | From multilayer film | 62.46 | This Example |
| PET | Reference values | 67-81 | [12, 13] |
| | Virgin resin | 76.37 | This Example |
| | From physical mixture | 76.44 | This Example |
| | From multilayer film | 74.43 | This Example |

Last, headspace gas chromatography—flame ionization detector test was conducted to test for the presence of entrained solvents in the recovered polymer fractions (Table 3). It was found that, for all materials listed in Table 1, there was less than 1000 parts per million (ppm) residual solvent present in the recovered resins. At these levels of solvent retention, the recovered polymers are fit for use in most multilayer films insomuch as the solvents will not compromise the mechanical properties of the final, reconstituted products.

TABLE 3

Entrained solvent content (in ppm by mass) for each of the solids fraction collected from physical mixtures of resin beads and an actual Amcor Commercial multilayer film using the STRAP process, as estimated by head-space GC-FID tests.

| Solid fraction | Entrained toluene (ppm) | Entrained acetone (ppm) | Entrained DMSO (ppm) |
|---|---|---|---|
| Recovered from physical mixture | | | |
| Toluene soluble (HDPE) | 0 | 0 | — |
| DMSO soluble (EVOH) | 152 | 0 | 766 |
| Residual solids (PET) | 59 | 0 | 159 |

TABLE 3-continued

Entrained solvent content (in ppm by mass) for each of the solids fraction
collected from physical mixtures of resin beads and an actual Amcor Commercial
multilayer film using the STRAP process, as estimated by head-space GC-FID tests.

| Solid fraction | Entrained toluene (ppm) | Entrained acetone (ppm) | Entrained DMSO (ppm) |
|---|---|---|---|
| Recovered from commercial film | | | |
| Toluene soluble (HDPE) | 0 | 5 | — |
| DMSO soluble (EVOH) | 589 | 0 | 342 |
| Residual solids (PET) | 0 | 0 | 1088 |

Although a detailed analysis is beyond the scope of this Example, additional concerns in this context include how the toxicity, odor, or other properties of retained solvents affect the suitability of the recovered polymers for applications such as food packaging. A number of solutions can be conceived to address these issues on a case-by-case basis. For example, if solvent retention is an issue in a food packaging application, then the recycled resin could be used to produce a multilayer film in which the recycled fraction does not come in contact with the food (i.e., an interior layer of film). Whatever the application, however, the viability of the STRAP process ultimately hinges on the ability to produce fit-for-use recycled resins while efficiently recovering and reusing the solvents so that production of the recycled polymer resins is cost-competitive with the production of the virgin materials.

Technoeconomic Analysis of the STRAP Process

Figure 7:
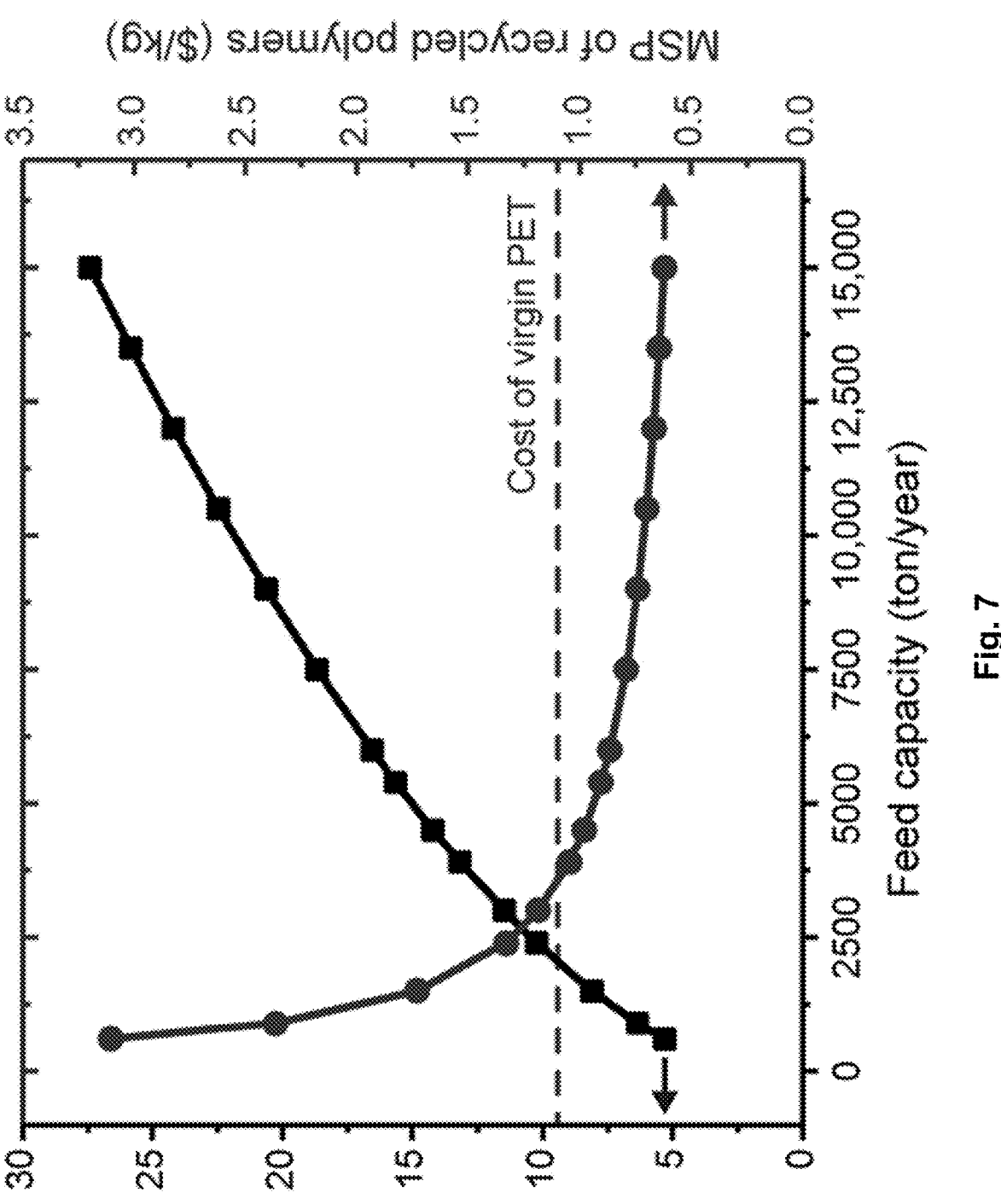
FIG. 7. Total capital investment and MSP for the combined, recycled PE, EVOH, and PET streams derived from an Amcor commercial multilayer film using the STRAP process, both as a function of feed capacity in tons of Amcor commercial film per year (circles, MSP; squares, Capital Investment). Market price of virgin PET (2022) is shown as a dotted line for reference.

Following the point that recycled polymers must be produced at a cost comparable to the price of the corresponding, virgin resins, we carried out a technoeconomic analysis of the STRAP process based on the experimental data reported here. FIG. 7 shows the total capital investment and the minimum selling price (MSP) of recycled polymer components as a function of the feed capacity.

According to our estimates, the STRAP process could separate the Amcor commercial film at an MSP of $1.19/kg for the combined, recycled resins when the feed rate is 3000 tons of Amcor Commercial film per year. The MSP decreases to $0.6/kg as the feed rate is increased to 15,000 tons/year. The distillation columns and the heat required to separate the solvents and antisolvents are the major cost drivers for this process, accounting for 33.6% of the total capital investment and 79.3% of the variable operating cost, respectively. When the feed rate is 3800 tons/year, which is less than half of the volumes processed in APK's Newcycling plant in Germany [14], the MSP of the recovered polymers is competitive with the average market value of virgin PET (1.1/kg) [15, 16]. Note that the Amcor commercial film consists of 90.2 wt % PET.

The energy requirement for separating the multilayer film is 79.13 MJ/kg, which is about 37% less than the energy required to manufacture virgin PET resin (125 MJ/kg). For comparison, the energy generated from combustion of waste plastics (the most realistic, non-landfill disposition for plastic films today) is 6.09 MJ/kg of the multilayer film [17, 18]; however, combustion releases 950 kg of $CO_2$ per ton of plastic waste [19]. These analyses, together with the examples of comparable solvent-based technologies [14, 20-22], show that the STRAP process could be deployed at scale to fully recycle realistic waste streams originating from multilayer plastic film plants.

Discussion

Figure 6:
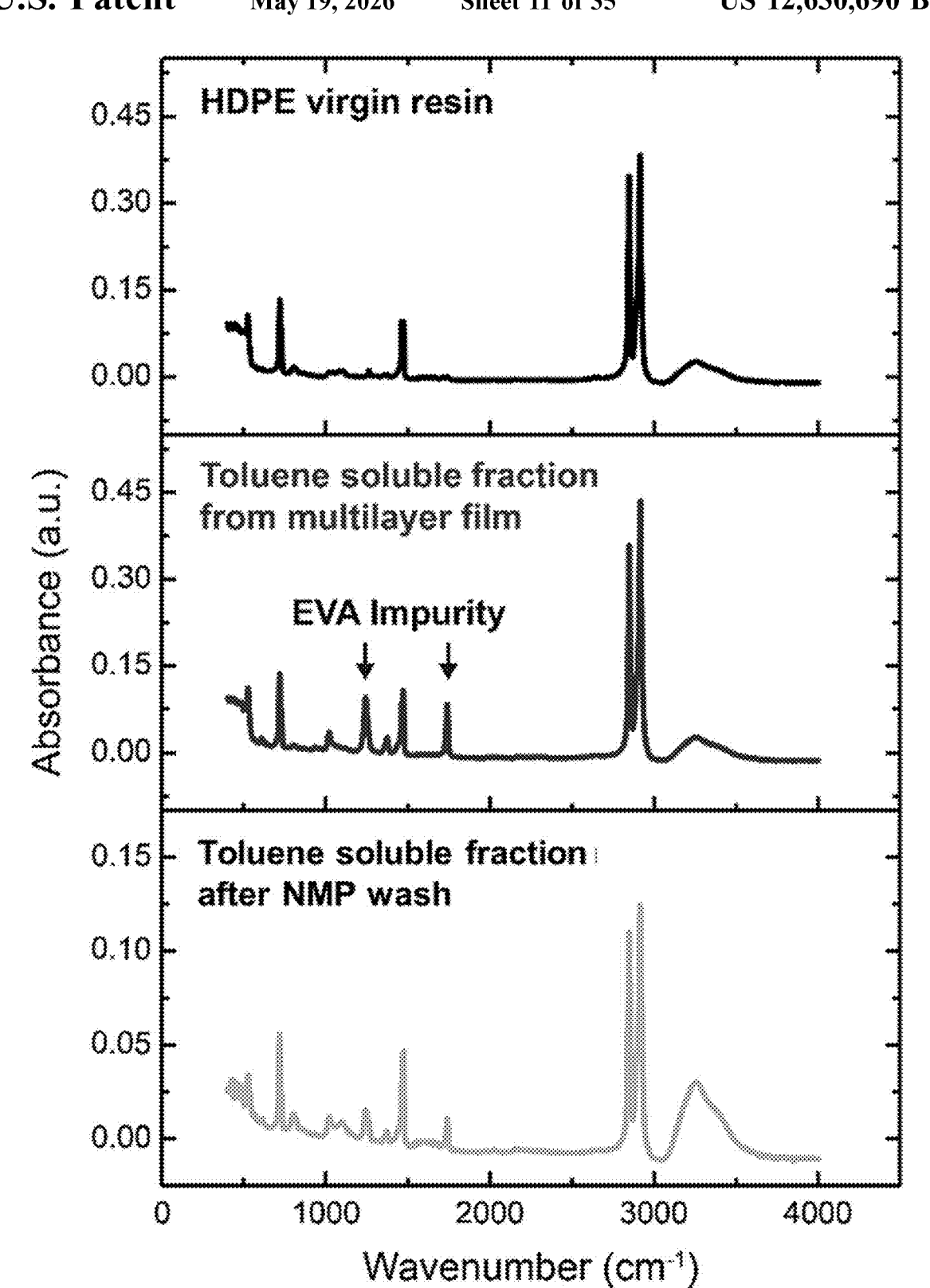
FIG. 6. ATR-FTIR spectra of HDPE after NMP wash. ATR-FTIR spectra of PE. Sub-spectra within each figure correspond to either virgin resins (for reference), or to solid materials recovered from the STRAP process. The sub-spectra are labeled accordingly.

The methodology described here is demonstrably capable of fully deconstructing multilayer plastic wastes of realistic complexity. While we have not carried out a detailed analysis of the dilute but-non-zero levels of tie layers (e.g., EVA; FIG. 6), wet bond adhesives, and other additives present in realistic multilayer films, it is likely that these layers can be recycled with the principle resin fractions, as they are chemically compatible. Highly cross-linked polymers (such as crosslinked polybutadiene), however, may not readily dissolve in any available solvents, making their complete separation from the targeted resins impossible. As discussed above, the impact that these impurities, as well as the entrained solvents (Table 3), have on the fitness of the recovered polymer for use depends on the intended application of the final, reconstituted multilayer film, and a detailed analysis of these impurities is necessary to fully derisk the STRAP process in a particular operating environment.

In conclusion, we demonstrated the ability of the STRAP process to efficiently deconstruct a commercial PIW film into nearly 100% yield of three constituent resins. The process uses sequential solubilization steps in solvents selected on the basis of computational modeling of polymer solubility. We propose that the STRAP process could be quickly implemented on the large scale to target postindustrial multilayer plastic waste streams, as they originate from point sources (manufacturing plants), are of known and near-constant composition, and are of substantially high volume (~100 billion pounds per year globally). These attributes would allow large volumes of postindustrial multilayer plastic waste to be processed and recycled using existing equipment combined with STRAP technology. Detailed economic analyses of the STRAP process, assuming an annual feed rate of 3800 tons, indicate that the STRAP process could fully deconstruct a multilayer plastic waste stream consisting of PE, EVOH, and PET into their corresponding resins at costs similar to the corresponding virgin resins.

Our in-depth molecular modeling framework, which leverages a fundamental understanding of the thermodynamics of the polymer-solvent interactions, is broadly applicable and will allow for the rational design of new solvent systems for processing complex multilayer plastics of almost any composition going forward. This rapidly adaptable aspect of the STRAP process represents a key advancement toward addressing the problem of complex plastic wastes accumulating in the environment, as the compositions of multilayer films are constantly being redesigned to meet changing needs, requiring flexible technologies to successfully recycle them. Last, being based on simple unit operations such as stirred tanks, filters, and distillation columns, the STRAP process can be viewed as a platform technology that could be derisked in a well-defined, postindustrial operating environment and be adapted to process more complex postconsumer waste streams. Together, these attributes make the STRAP process a promising strategy toward the near-term reduction of postindustrial and postconsumer plastic waste and toward addressing the ongoing environmental crisis associated with the permeation of these wastes into human and animal habitats at every scale.

Example 2: Reducing Antisolvent Use in the STRAP Process by Enabling a Temperature-Controlled Polymer Dissolution and Precipitation for the Recycling of Multilayer Plastic Films The objective of this Example is to identify operating conditions that will reduce the amount of antisolvents used in the STRAP process and to demonstrate how STRAP can be applied to a more complex, industrial multilayer film (provided by Amcor). We combine thermodynamic computational tools, polymer characterization methods, and modern process design tools to develop a realistic near-term approach to design solvent systems to recycle multilayer plastics. The efficient utilization of these solvents requires a process that can recover and reuse the solvents, while minimizing the amount of solvents left as waste material. An approach to reduce the use of antisolvents is to use solvents or solvent mixtures that can enable the temperature-controlled dissolution and precipitation of the target polymers in a multilayer film. The use of solvent combinations has been considered as an option in dissolution/precipitation methods for certain polymers. Some studies have used solvent mixtures only for the dissolution of the target plastic to later add an antisolvent for precipitation. Hadi et al. studied mixtures of turpentine/petroleum ether (PetE) to dissolve polyolefins and later precipitate them using n-hexane and PetE [23]. Weeden et al. used mixtures of heptane/dichloromethane to dissolve electronic waste components [24]. However, they recovered the polymers by evaporating the solvents. Pure solvents and solvent combinations have also been used to dissolve various polymers at different temperatures, reducing the number of solvents needed to recover each polymer. Some patents disclosing this technique have also relied on evaporating the solvent to obtain the final solid polymers [25,26]. Precipitating the polymers through a solvent temperature change instead of evaporating the solvent or adding an antisolvent could be a way to make dissolution/precipitation methods more feasible [27].

In this Example, we evaluate and compare the STRAP technology using two different polymer precipitation techniques: precipitation by the addition of an antisolvent (STRAP-A) and precipitation by decreasing the solvent temperature (STRAP-B). Two different post-industrial rigid multilayer films manufactured by Amcor (A1 and A2) where used to demonstrate the STRAP process. The multilayer film A1 was composed of PE, EVOH, and PET with minor component EVA. Film A2 was composed of the same polymers with the addition of glycol modified polyethylene terephthalate (PETG). Thermodynamic tools were used for solvent selection and the experimental results were used in a process model that allowed an estimation of the process costs. See Sanchez-Rivera et al. [44] published on Aug. 10, 2021, incorporated herein by reference.

Materials and Methods

Computational modeling for solvent screening: We assessed polymer solubility computationally to guide solvent selection for the STRAP process; our approach uses a combination of HSPs, MD simulations, and COSMO-RS, following Example 1. In this Example, HSPs were obtained from the HSP handbook [28] and used for preliminary solvent selection, although these values do not provide quantitative predictions of solubility.

MD simulations and COSMO-RS are used for further quantitative solubility predictions utilizing an updated protocol compared to Example 1. Atomistic MD simulations for oligomers were performed to obtain input structures for COSMO-RS. MD simulations were first performed of a single oligomer in dilute solution in the isothermal-isobaric ensemble. Each MD simulation contained one oligomer molecule (EVOH or PETG) and 216 solvent molecules. EVOH was simulated in water and PETG in toluene. The EVOH oligomer molecule contained four vinyl alcohol repeat units and two ethylene repeat units. The PETG oligomer contained four ethylene glycol repeat units and two 1,4-cyclohexanedimethanol repeat units. The radius of gyration ($R_g$) and solvent accessible surface area (SASA) of the oligomer were then calculated as a function of simulation time from the MD trajectories to characterize the distribution of oligomer conformations. Representative oligomer conformations that span the $R_g$-SASA space were extracted from the MD trajectories and used as input to the COSMO-RS workflow detailed below. A total of 22 conformers were taken from the EVOH trajectory and 18 conformers were taken from the PETG trajectory. MD simulations were performed using Gromacs 2016 [5]. All compounds were parameterized by using Antechamber and the Generalized AMBER force fields [6, 7].

Figure 8:
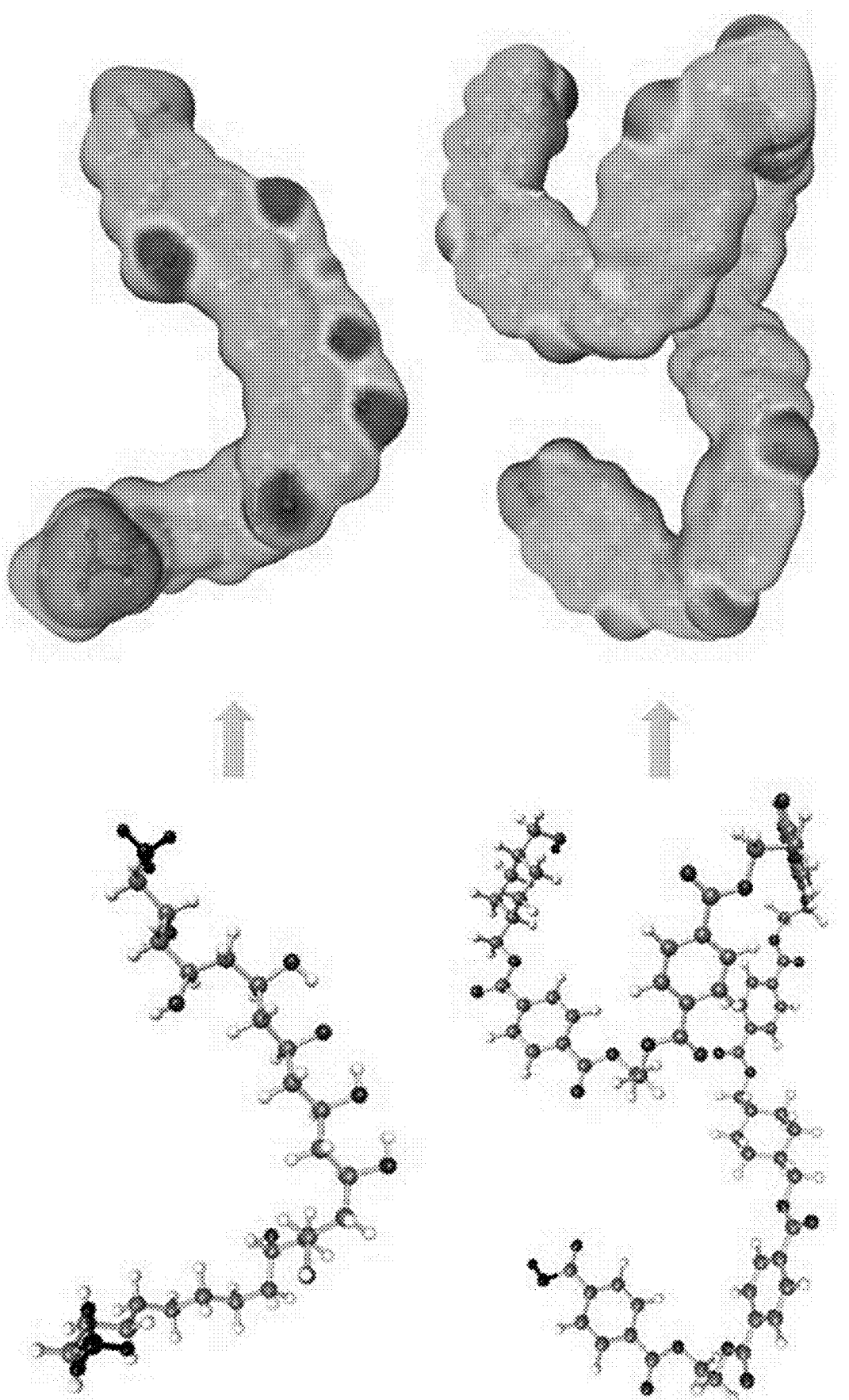
FIG. 8. Molecular structures and corresponding COSMO-RS screening charge densities of an example EVOH oligomer (top) and PETG oligomer (bottom).

COSMO-RS predicts the equilibrium properties of multicomponent systems based on quantum mechanical calculations and statistical thermodynamics methods [29]. It represents each molecule based on the screening charge density that arises at its molecular surface due to the polarization of the medium. The screening charge density is obtained from density functional theory (DFT) calculations and histogrammed to generate a σ-profile. We approximated the σ-profile of a polymer by generating σ-profiles for oligomer structures with deactivated terminal groups [30]. The screening charge density and resulting σ-profile depends on the specific molecular conformation; consequently, we generated a set of oligomer conformations using MD (as described above) to span a range of possible σ-profiles. FIG. 8 provides an example of two conformers for different oligomers and their DFT calculation results of screening charge distributions. The chemical potential of a polymer is calculated based on the σ-profiles to enable predictions of polymer solubility via a solid-liquid equilibrium calculation. DFT calculations of screening charge distributions were performed by Gaussian 16 at the BVP86/TZVP/DGA1 level of theory [31]. COSMO-RS solubility calculations were performed by COSMOtherm 19 with the parameterization BP_TZVP_19 [29,32].

Experimental procedure with multilayer film A1: The main goal of the STRAP process is to separate the constituent polymers in a multilayer plastic film using a series of solvent washes. A model film manufactured by Amcor was used to develop and demonstrate the experimental procedure. The plastic film was an A1 film composed primarily of PE, PET, EVA, and EVOH. Before a typical STRAP experiment, the multilayer film was cut into 1×1 cm² stamps. A 250 mL round-bottom flask connected to a reflux condenser with a cold-water supply line was used. The round bottom flask, which would contain the corresponding solvent and the pieces of multilayer film in 40 g batches, was partially submerged in a 1500 mL dish containing silicone oil as a heat transfer fluid. The system was heated to the desired dissolution temperature with an electric heat plate equipped with a magnetic stir drive and the stirring rate was adjusted to have a constant mixing. Based on the computational analysis for solvent selection, we experimentally assessed the recovery of each polymer in the multilayer film A1 by performing three processing steps: (1) selectively dissolving the PE fraction in toluene at 110° C. for 4 h, then separating the solubilized fraction from the EVOH and PET via mechanical filtration; (2) selectively dissolving the EVOH fraction in DMSO at 95° C. for 30 min, then separating the solubilized fraction from the remaining PET via mechanical filtration; and (3) precipitating the solubilized PE and EVOH fractions with the addition of acetone or water, respectively. The precipitated PE and EVOH were then separated from the toluene-acetone and DMSO-water mixtures by filtration. The resulting solid fractions were dried in a vacuum oven overnight at 65° C. to remove residual solvents. This method was identified as STRAP-A, where the addition of antisolvents is required to precipitate the target polymers.

An alternative method for the precipitation of the dissolved polymers was considered. This consisted of lowering the temperature of the solvent and the dissolved polymer to 35° C. For this method, labeled as STRAP-B, solvent mixtures were considered to both dissolve the target polymer at high temperatures and precipitate the polymer at lower temperatures, reducing the need for high amounts of antisolvents to be added after the dissolution to precipitate the polymer. Toluene-acetone and DMSO-water mixtures were tested for the recovery of PE and EVOH, respectively.

Experimental procedure with multilayer film A2: The same experimental set up was used for the multilayer film A2, which consisted of PETG, PE, EVOH, PET, and EVA. Similarly to A1, the multilayer film was cut into 1×1 cm$^2$ rated from the corresponding solvents by filtration. The EVA was recovered by adding acetone as antisolvent to the toluene after removing the PE solids. The resulting five solid fractions were dried in a vacuum oven overnight at 65° C. to remove residual solvents. The process with multilayer film A2 was labeled as STRAP-C.

Characterization of solids from the STRAP process: ATR-FTIR spectroscopy was used to characterize the separated polymer fractions from the STRAP process and compare their spectra to virgin resins. The instrument was a Bruker Vertex 70 with a liquid nitrogen-cooled Mercury-Cadmium-Telluride (MCT) detector. The ATR cell used was a MIRacle single reflection cell equipped with a diamond crystal (Pike Technologies). In a typical measurement, 128 scans were averaged with a 4 cm$^{-1}$ resolution and range from 4000-400 cm$^{-1}$.

Results and Discussion

STRAP-A with Multilayer Film A1

Figure 9:
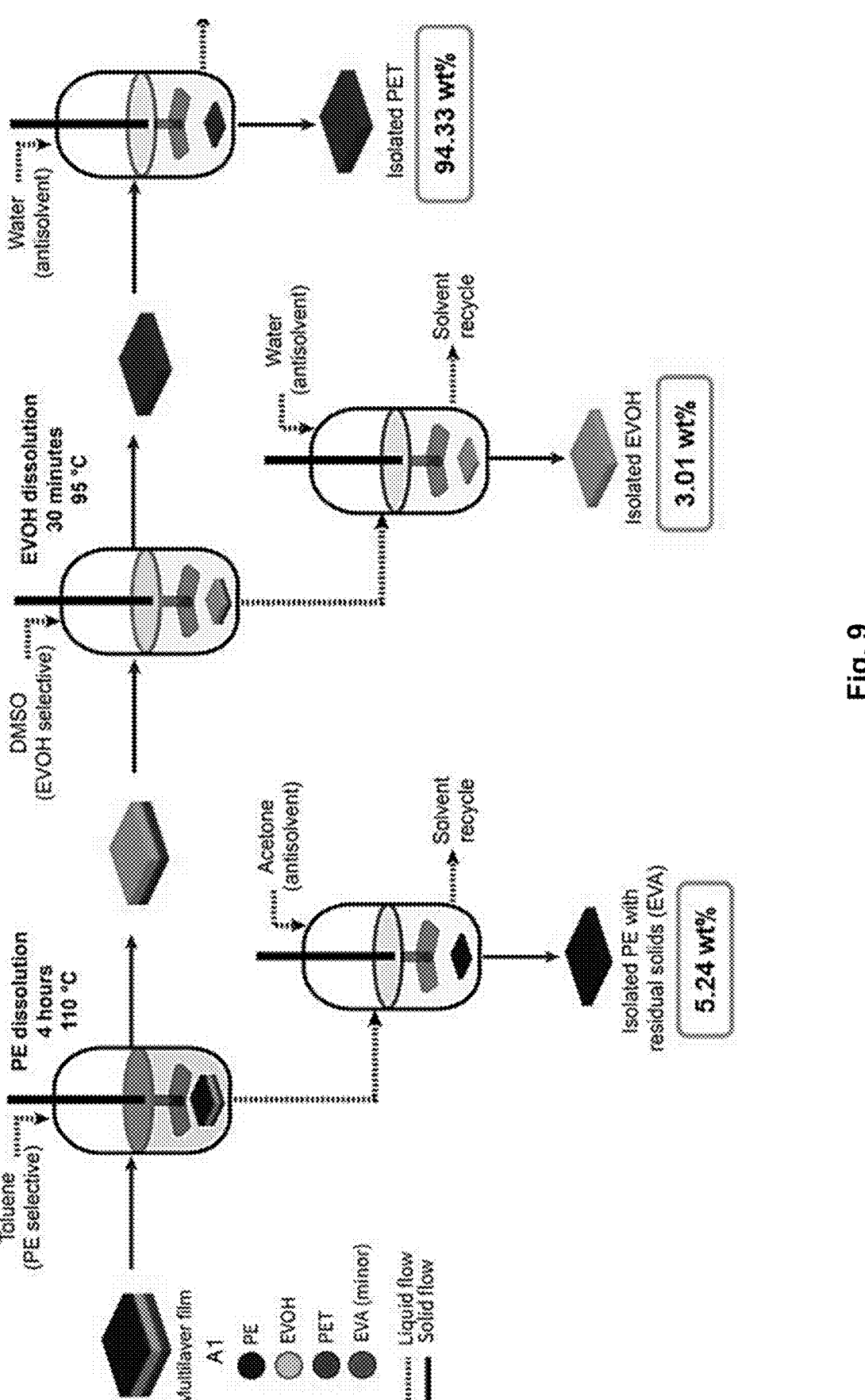
FIG. 9. STRAP-A process schematic for the separation and recovery of the polymer components in a multilayer film A1 manufactured by Amcor.

The STRAP-A process followed the same procedure as in Example 1 and it was used as a benchmark to compare with the alternative processes in this Example. Table 4 shows that an overall average mass balance of 102.58 wt % was obtained with a standard deviation of ±0.96 wt % for the recovery of PE, PET, and EVOH from multilayer film A1. The overall mass balances exceeded 100 wt % possibly due to solvent uptake. Drying conditions will need to be adjusted to minimize entrained solvents. The values reported in Table 4 are consistent with Example 1. FIG. 9 shows solvents, antisolvents, temperatures and dissolution times that were used in each process step for STRAP-A. Acetone and water were used as antisolvents for the precipitation of PE and EVOH, respectively.

TABLE 4

| | | | | | |
|---|---|---|---|---|---|
| Yield of polymers from multilayer film A1 with the STRAP-A process. | | | | | |
| | Initial film | Polymer yield [wt %] | | | Overall mass |
| Experiment | mass [g] | PE[a] | EVOH | PET | balance [%] |
| 1 | 38.30 | 4.98 | 2.61 | 94.15 | 101.74 |
| 2 | 38.28 | 5.33 | 3.26 | 95.03 | 103.62 |
| 3 | 38.35 | 5.42 | 3.14 | 93.81 | 102.37 |
| average | 38.31 | 5.24 | 3.01 | 94.33 | 102.58 |
| STDEV | 0.04 | 0.23 | 0.34 | 0.62 | 0.96 |

[a]PE solids contain the EVA component.

stamps. We experimentally assessed the recovery of each polymer in the multilayer film A2 by performing four processing steps: (1) selectively dissolving the PETG fraction in a mixture of 60% DMF-40% THF (v/v) at 87° C. for 4 h, then separating the solubilized fraction from the PE, EVOH, PET, and EVA via mechanical filtration; (2) selectively dissolving the PE and EVA fraction in toluene at 110° C. for 2 h, then separating the solubilized fraction from the EVOH and PET via mechanical filtration; (3) selectively dissolving the EVOH fraction in a mixture of 60% DMSO-40% water (v/v) at 95° C. for 30 min, then separating the solubilized fraction from the remaining PET via mechanical filtration; and (4) precipitating the solubilized PETG by adding 1-propanol as antisolvent and precipitating the PE and EVOH fractions by reducing the temperature of the solvents containing the dissolved polymers to 35° C. The precipitated PETG, PE, and EVOH solids were then sepa- The extensive use of antisolvents can be a concern at larger scales due to potential high costs and environmental and safety risks. It was determined that the energy required to separate the respective solvents and antisolvents used in STRAP-A accounted for 33.6% of the total capital costs and 79.3% of the total operating costs [33]. The distillation columns in STRAP-A were the main cost drivers in the process. An alternative to using antisolvents for polymer precipitation is to cool the solvent with the dissolved polymer to induce the precipitation. For this purpose, solvent mixtures were considered to both dissolve the target polymer at a high temperature and to easily precipitate the polymer as the temperature is decreased. In this way, we can have a constant solvent composition throughout the process that targets a specific polymer component in the multilayer film. The thermodynamic computational tools allowed us to quickly screen potential solvent compositions for the recovery of EVOH and PE using this approach.

Computational Modeling Results

Figure 10:
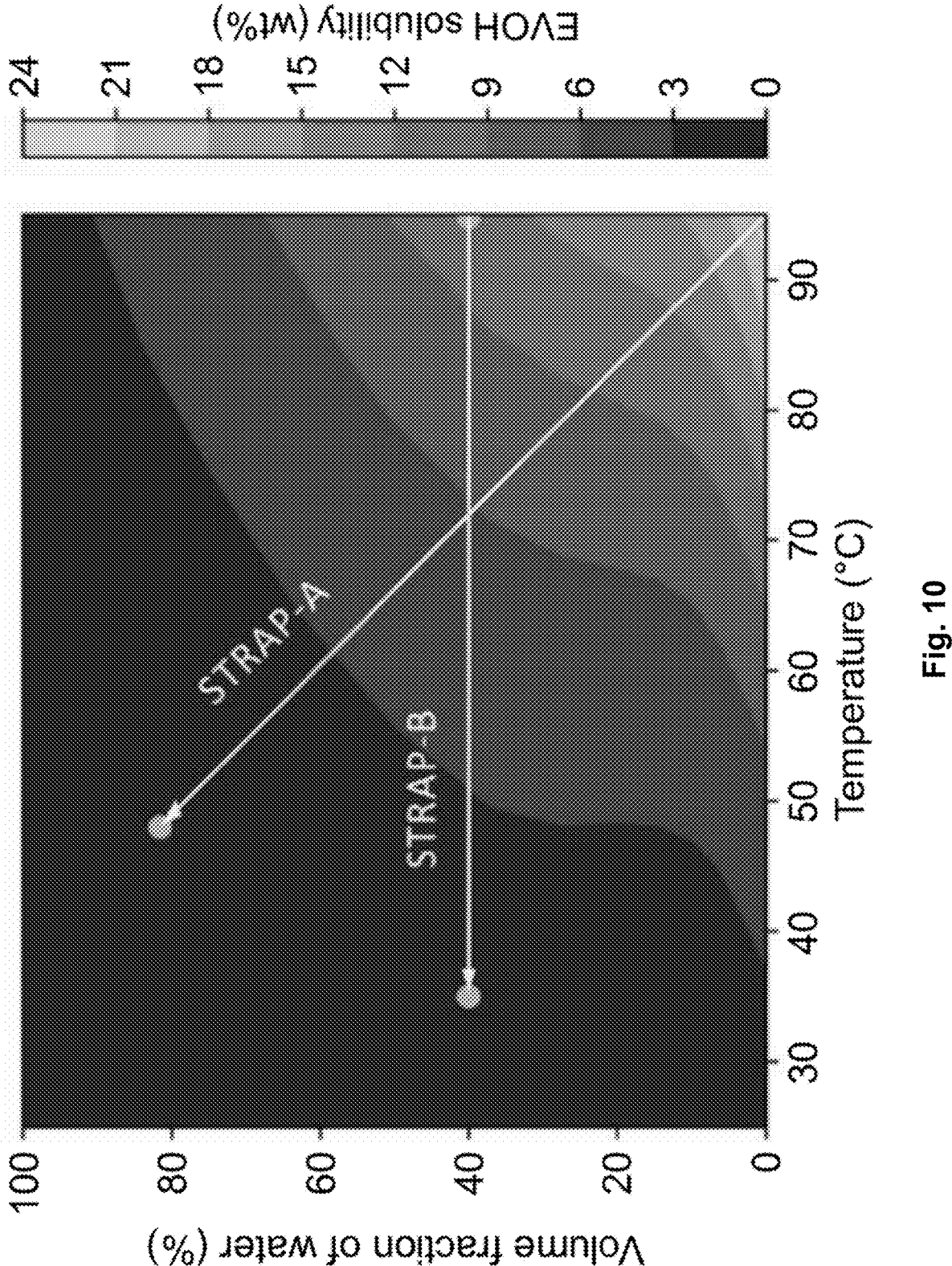
FIG. 10. COSMO-RS solubility predictions for EVOH in DMSO-water mixtures. Two EVOH recovery processes are shown by arrows. The STRAP-A process dissolves EVOH in pure DMSO at 95° C. (predicted solubility 22.77 wt %) and precipitates the EVOH in 81.5% water at 48° C. (predicted solubility 1.23 wt %). The STRAP-B process dissolves EVOH in 40% water at 95° C. (predicted solubility 10.45 wt %) and precipitates the EVOH by reducing the temperature to 35° C. (predicted solubility 1.72 wt %).

COSMO-RS predictions were used to identify potential solvent compositions for the EVOH recovery, leveraging the ability of this method to capture temperature-dependent solubilities. FIG. 10 shows COSMO-RS predictions of EVOH solubility as a function of temperature and DMSO-water compositions. For comparison, the predicted EVOH solubility in pure DMSO at 95° C. is 22.77 wt %, which is similar to the experimentally measured solubility of 24.02 wt %. This comparison supports the validity of COSMO-RS to predict EVOH solubilities. The STRAP-A process dissolves EVOH in pure DMSO at 95° C. Water is then added as the antisolvent to achieve a final 20% DMSO-80% water (v/v) mixture at a lower temperature, reducing the EVOH solubility to trigger its precipitation. These steps are indicated by the labeled white arrow in FIG. 10. This first process takes advantage of the large solubility difference (as predicted by COSMO-RS and measured experimentally) between the two states to achieve a high EVOH recovery.

FIG. 10 indicates that the STRAP-B process could achieve the same decrease in solubility to precipitate the polymer by reducing the temperature without varying the solvent composition. The COSMO-RS solubility calculations indicate that EVOH recovery should be possible in pure DMSO, which is consistent with the inability of pure DMSO to dissolve EVOH at room temperature. However, the experimental recovery of EVOH upon cooling was low. Therefore, different mixture compositions were tested. A 60% DMS 0-40% water mixture (v/v) was selected for EVOH recovery since it was predicted to have a satisfactory solubility (10.45 wt %) at 95° C. and low solubility (1.72 wt %) at 35° C.; the latter value is comparable to the predicted EVOH solubility for the final step of the STRAP-A process. Experimental values indicated a solubility of 7.17 wt % at 95° C. and 0.01 wt % at 35° C., leading to a high EVOH recovery. We note that COSMO-RS overpredicts the experimental solubility, but general trends are correctly captured.

Similar COSMO-RS solubility predictions were computed for PE in various toluene-acetone mixtures to identify if any mixtures were suitable for recovery. The experimental solubility of PE in pure toluene (14.56 wt % at 110° C.) was used as a reference input to the COSMO-RS calculations. The computational results indicate that PE solubility in 90% toluene-10% acetone (v/v) is 0.02 wt % at 55° C. This result suggests that adding only a small fraction of acetone to toluene makes PE insoluble in the mixture, even at elevated temperatures; similar results were obtained for other volume fractions of acetone. This low solubility was verified experimentally, where none of the tested toluene-acetone mixtures could dissolve the PE. Therefore, pure toluene was still used in order to ensure initial PE dissolution. Pure toluene still allowed the PE precipitation to occur with a decrease in temperature.

STRAP-B with multilayer film A1

The STRAP-B process was completed with the solvent compositions allowing for a temperature induced precipitation of the EVOH and PE polymers using the thermodynamic insights from the former section. Table 5 shows that similar polymer yields to STRAP-A were obtained for PE, EVOH, and PET with STRAP-B, demonstrating that temperature-controlled dissolution and precipitation for the polymer recovery is a promising approach that could reduce costs and make solvent-based recycling processes more attractive.

TABLE 5

| Yield of polymers from multilayer film A1 with the STRAP-B process.[a] | | | | | |
|---|---|---|---|---|---|
| Experiment | Initial film mass [g] | Polymer yield [wt %] | | | Overall mass balance [%] |
| | | PE | EVOH | EVA | PET | |
| 1 | 38.272 | 4.02 | 3.16 | 1.06 | 93.47 | 101.86 |
| 2 | 38.34 | 4.05 | 3.27 | 0.76 | 93.81 | 102.84 |
| 3 | 38.26 | 4.53 | 3.24 | 0.78 | 92.69 | 102.02 |
| average | 38.29 | 4.20 | 3.22 | 0.91 | 93.32 | 102.24 |
| STDEV | 0.04 | 0.28 | 0.06 | 0.17 | 0.57 | 0.53 |

[a]Polymers were precipitated by reducing the solvent temperature. A DMSO 60% - water 40% solvent mixture was used for EVOH and toluene was used for PE.

Figure 11:
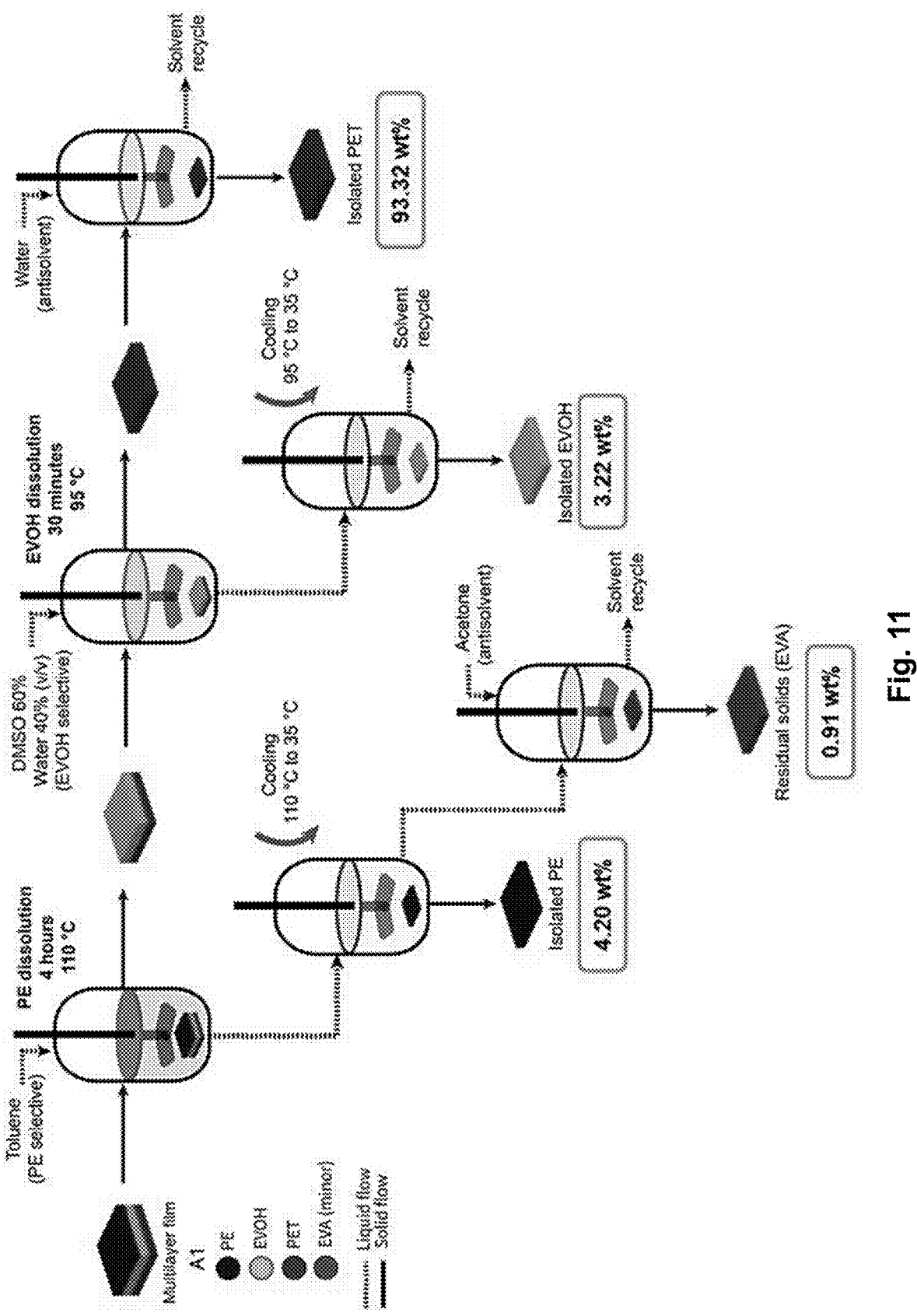
FIG. 11. STRAP-B process schematic for the separation and recovery of the polymer components in a multilayer film A1 manufactured by Amcor.

One of the major differences between the STRAP processes was in the PE yield achieved. The PE yield was higher with STRAP-A where acetone was used as an antisolvent to precipitate the polymer. This difference in yield is due to the presence of ethyl vinyl acetate (EVA), which is a minor component in the multilayer film A1. The EVA is soluble in toluene and can also precipitate when acetone is added, along with the PE. An N-methylpyrrolidinone (NMP) step was previously considered for the EVA removal from the PE but we found that this separation can be easily done by decreasing the temperature of the toluene to precipitate PE, as EVA still remains in the solvent. The EVA can then be precipitated with the addition of acetone as an antisolvent. FIG. 11 shows the solvents, temperatures and dissolution times that were used in each process step for STRAP-B.

ATR-FTIR Characterization of Polymers Recovered with STRAP-A and STRAP-B

Figure 12A:
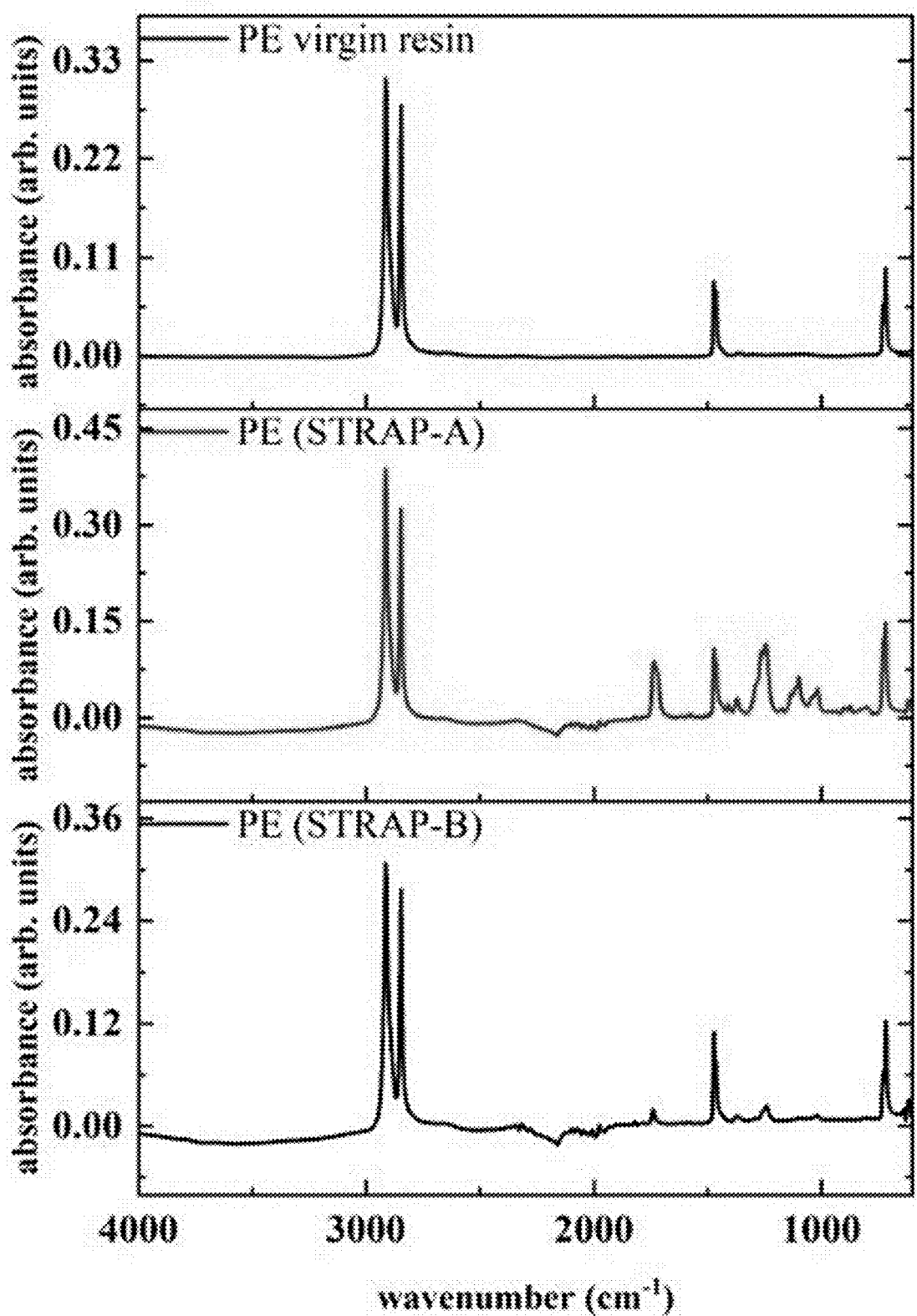
FIGS. 12A-12C. ATR-FTIR spectra of the virgin resins and polymers recovered from multilayer film A1 through STRAP-A and STRAP-B.
Figure 12B:
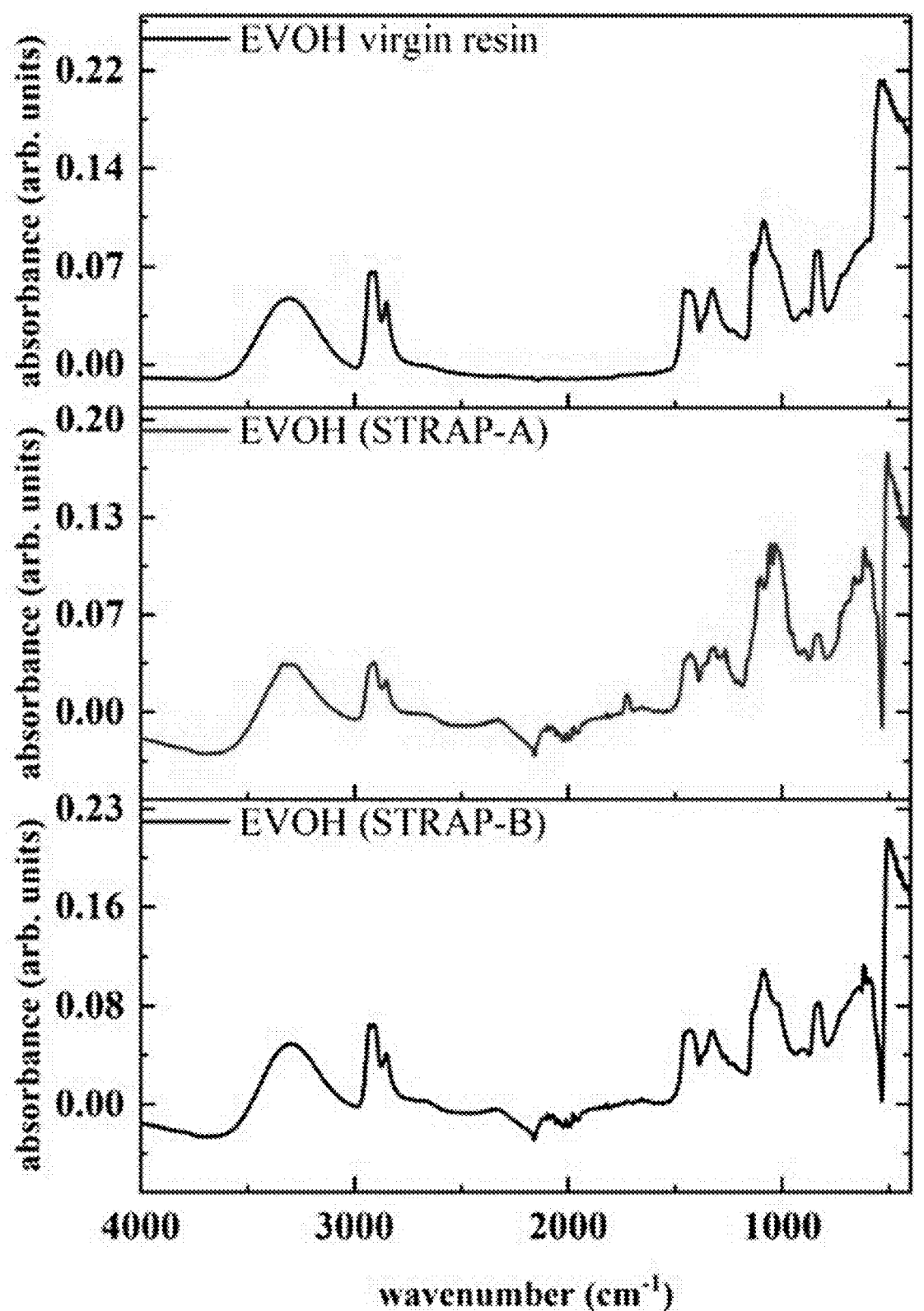
Figure 12C:
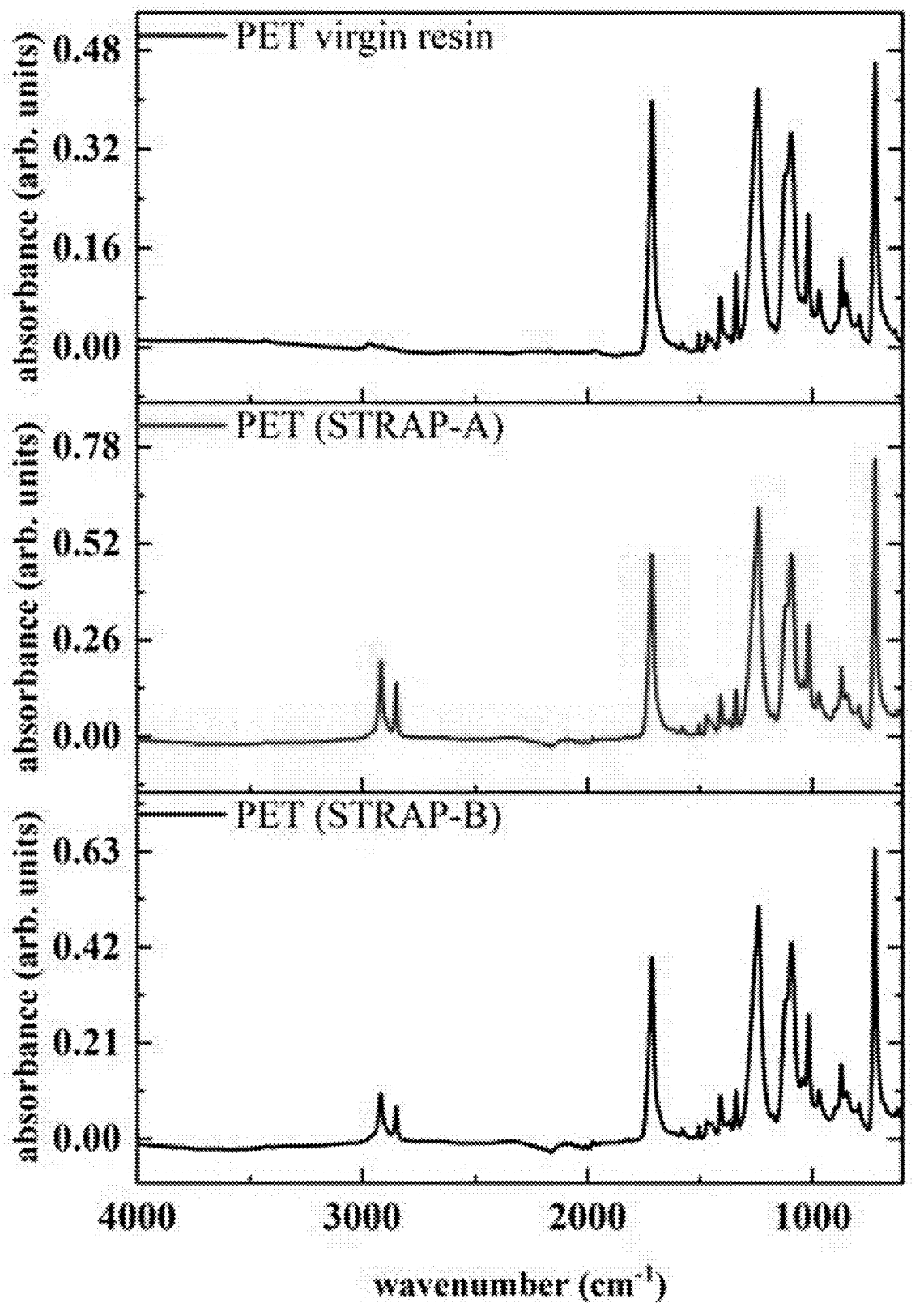
Figure 13:
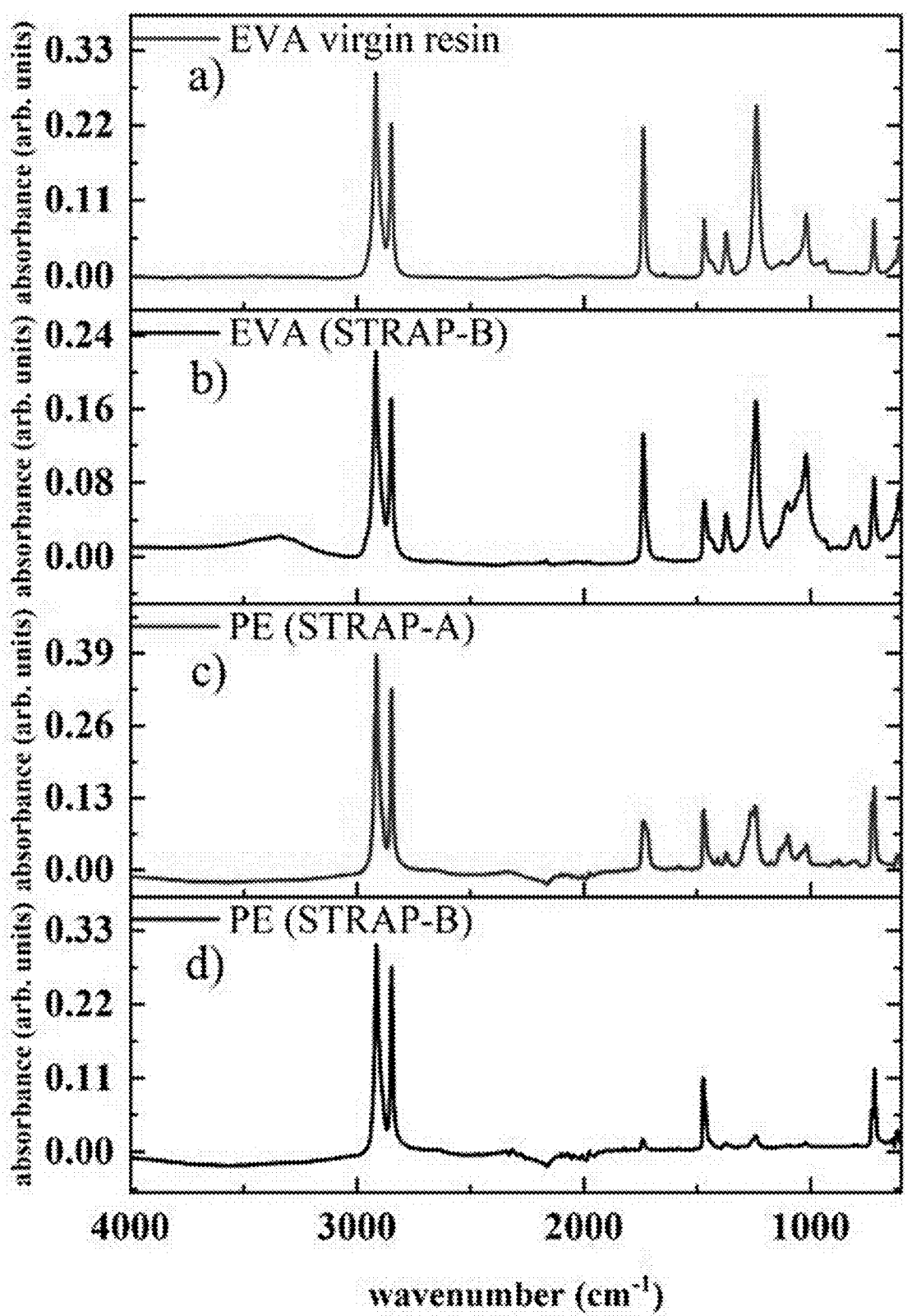
FIG. 13. ATR-FTIR spectra: (a) EVA virgin resin, (b) EVA recovered through STRAP-B from multilayer film A1, (c) PE recovered through STRAP-A from multilayer film A1, (d) PE recovered through STRAP-B from multilayer film A1.

Fourier-transform (FT)IR spectroscopy results of Example 1 have shown that the PE, EVOH, and PET recovered from physical mixtures of these components and from the multilayer film A1 using the STRAP-A process were indistinguishable from the corresponding virgin resins. The FTIR spectra of the PE, EVOH, and PET recovered with STRAP-A and STRAP-B were for the most part similar, indicating that pure polymers can be obtained using either precipitation method after selective dissolution (FIGS. 12A-12C). One of the major differences was observed in the PE spectra, where the polymer recovered through STRAP-A had extra peaks around 1736, 1240, 1097, and 1018 cm⁻¹ (middle panel in FIG. 12A). These peaks were previously attributed to EVA. It was observed in the spectra of the PE recovered through STRAP-B that the EVA peaks were less prominent, confirming that through this process the EVA polymer can be separated from the PE. Further removal of the EVA from the solvent required the addition of acetone as antisolvent. The solids recovered from that additional step were characterized and the spectra confirmed mainly EVA peaks (FIG. 13, panel (b)). In the PET recovered from STRAP-A and B, there were low intensity peaks around $3000 \text{ cm}^{-1}$ possibly coming from PE remnants in the PET (FIG. 12C). The PET purification could be improved by changing solvent amounts and dissolution times of the other polymers. A quantitative measurement of the amount of PE present in the PET could be completed to determine if the PE is significant enough to affect the PET properties.

STRAP-C with Multilayer Film A2

Solvent screening for PETG component in multilayer film A2: An A2 multilayer film, manufactured by Amcor, was used to demonstrate the STRAP process with a more complex feed composition. This film included PETG as an additional polymer component. If the same STRAP process developed for film A1 were applied to film A2, both PETG and PE would be dissolved by toluene. Therefore, we used the computational approach to identify alternative solvents capable of dissolving PETG to develop a new STRAP process (referred to as STRAP-C). We first obtained HSPs for 850 solvents and calculated each solvent's distance in HSP space ($R_a$) to the HSPs of PETG. Each value of $R_a$ was then normalized by the radius of the PETG solubility sphere ($R_0$). Only solvents with values of $R_a/R_0$ less than 1 are expected to dissolve PETG. Table 6 includes HSP values for common, readily available solvents. Toluene, cyclohexanone, 1,4-dioxane, and triethylamine are recognized as good candidates with $R_a/R_0$ values less than 0.7. THF, whereas 1,1-dichloroethane and ethyl acetate have $R_a/R_0$ values between 0.9 and 1, indicating probable dissolution. DMF and ethanol are identified as poor solvents with $R_a/R_0$ values greater than 2. However, PETG is a copolymer that is typically synthesized from terephthalic acid (TPA), ethylene glycol (EG), and 1,4-cyclohexanedimethanol (CHDM), with the ratio of EG/CHDM influencing its properties [34]. Unfortunately, available HSP values for PETG do not provide any information on its composition [28]; consequently, we also performed COSMO-RS solubility calculations, which consider both the structure and composition of this copolymer, to identify solvents capable of dissolving PETG. In this case, PETG was modeled as a random copolymer with a 2:1 molar ratio of EG/CHDM based on known information on the PETG component in film A2. Table 6 shows that the HSP and COSMO-RS results agree with each other for toluene, cyclohexanone, 1,4-dioxane, THF, and ethanol; these solvents have large COSMO-RS predicted solubilities and low values of $R_a/R_0$. However, the COSMO-RS results also identify DMF as a potential good solvent. Based on these results, toluene, cyclohexanone, dioxane, DMF, and THF could all be good solvents for PETG dissolution. Toluene was eliminated as a possible solvent for PETG because it also dissolves PE. We also eliminated dioxane as a solvent due to potential health hazards and eliminated cyclohexanone because ketones can be unstable. We thus selected THF and DMF as possible solvents for further experimental investigation.

TABLE 6

| | COSMO-RS and HSP solubility predictions for PETG. | | | |
|---|---|---|---|---|
| Solvent | COSMO-RS predicted solubility [wt %] | HSP values ($R_a/R_0$) | Boiling point [° C.] | Temperature for COSMO-RS prediction [° C.] |
| toluene | 47.82 | 0.43 | 110.6 | 110 |
| cyclohexanone | 36.80 | 0.58 | 155.4 | 100 |
| 1,4-dioxane | 35.80 | 0.69 | 101.2 | 100 |
| DMF | 14.41 | 2.17 | 152.8 | 100 |
| THF | 10.21 | 0.90 | 66 | 65 |
| 1,1-dichloroethane | 1.43 | 0.96 | 56.3 | 55 |
| 1-propanol | 1.02 | 2.42 | 97.2 | 96 |
| triethylamine | 0.19 | 0.66 | 88.8 | 85 |
| ethanol | 0.15 | 2.84 | 78.2 | 78 |
| ethyl acetate | 0.04 | 0.98 | 77.1 | 75 |

Figure 14:
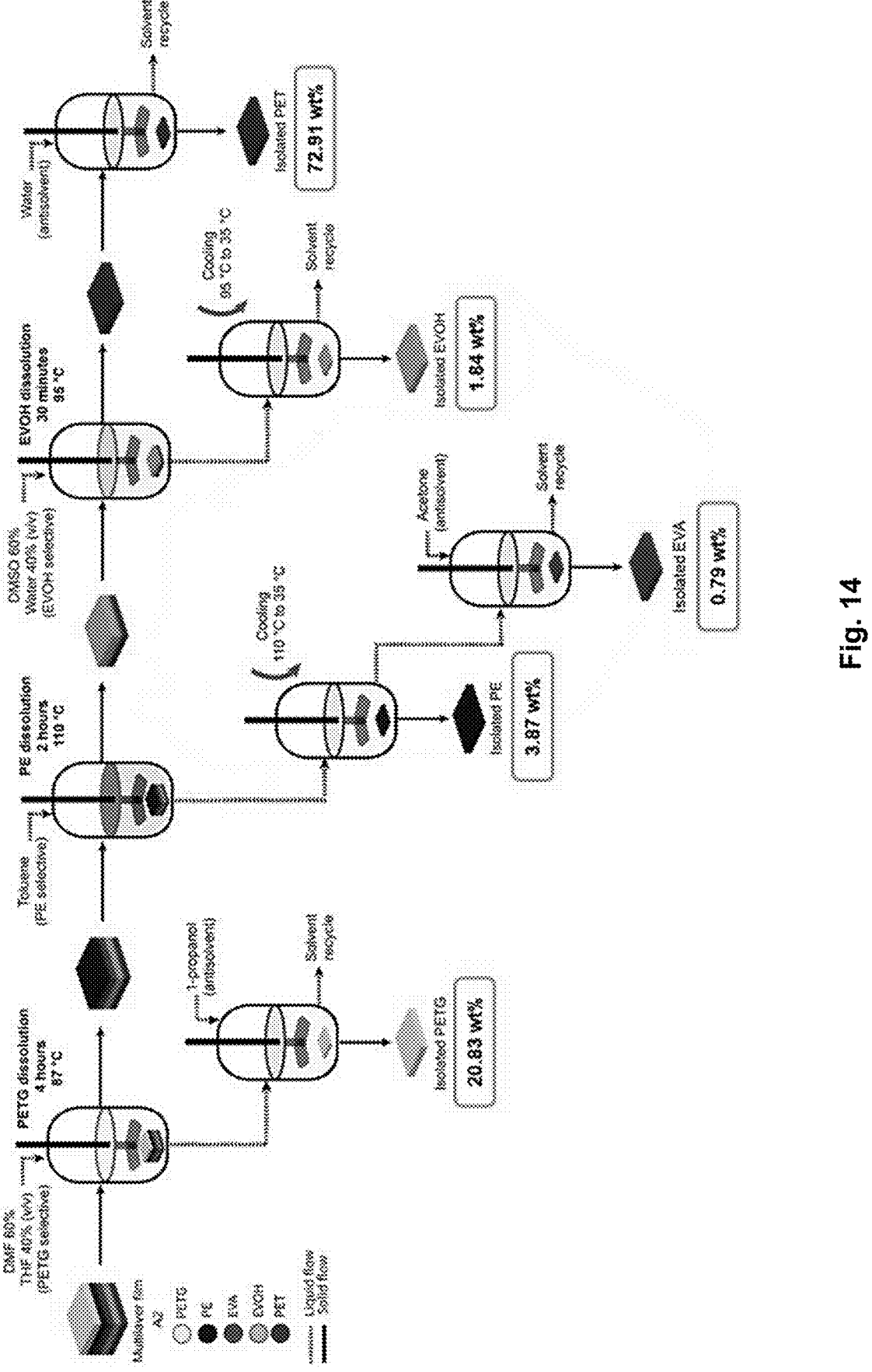
FIG. 14. STRAP-C process schematic for the separation and recovery of the polymer components in a multilayer film A2 manufactured by Amcor.
Figures 15A, 15B, 15C:
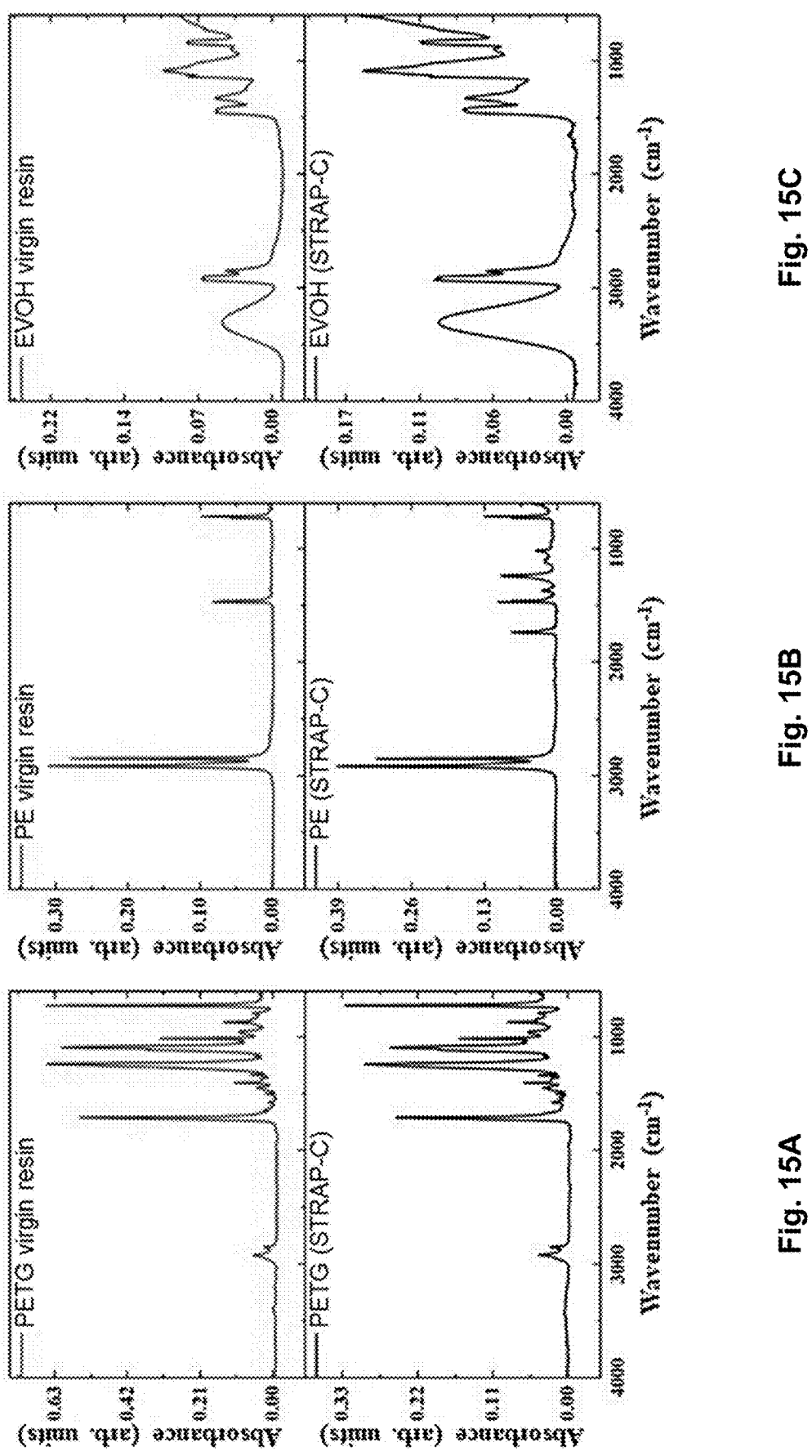
FIGS. 15A-15E. ATR-FTIR spectra of the virgin resins and polymers recovered from multilayer film A2 through STRAP-C.
Figures 15D, 15E:
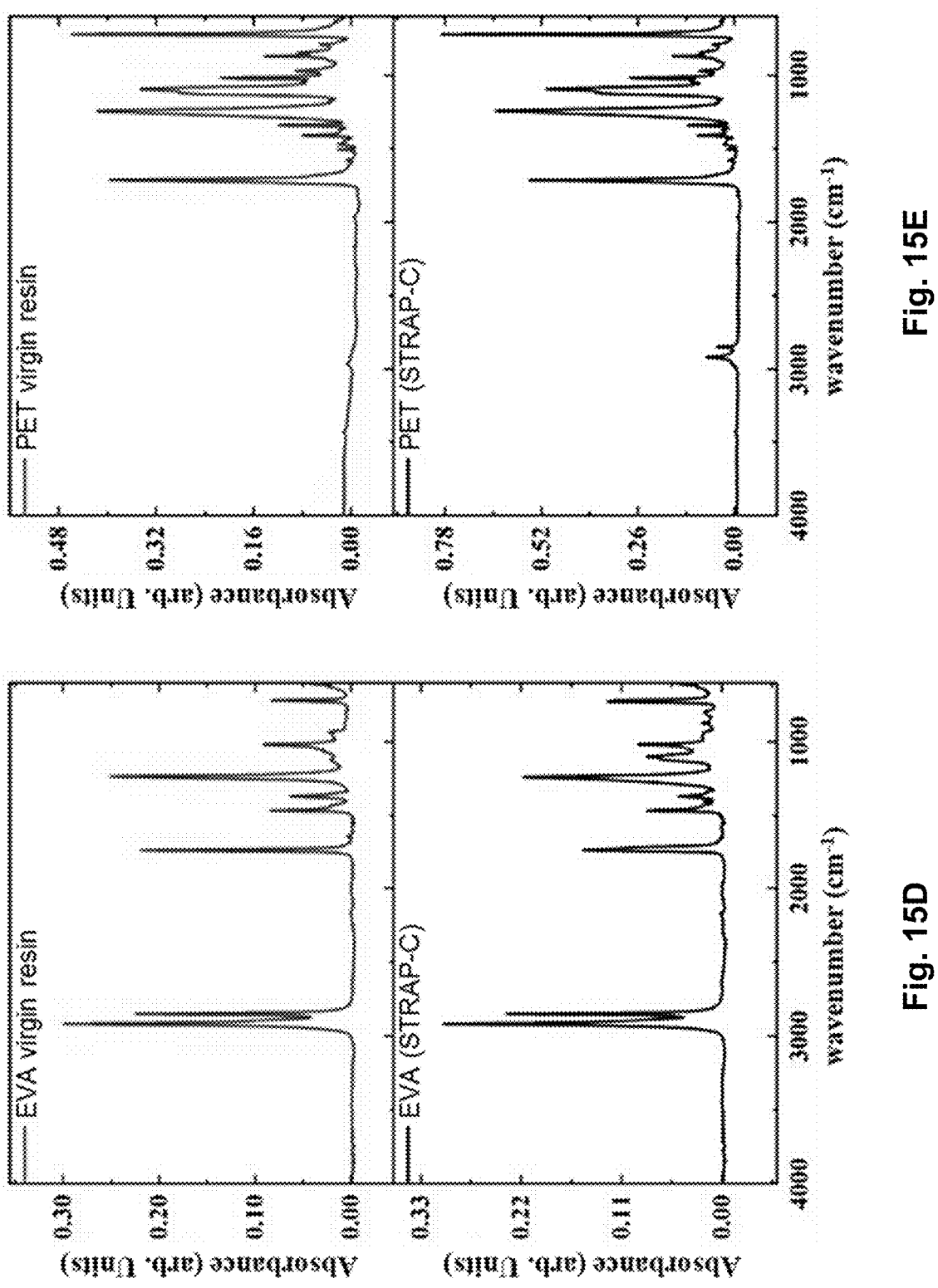

After the solvent selection for the PETG component, the STRAP-C process was applied experimentally to the A2 multilayer film. The PETG dissolution was done at 65° C. for 4 h using THF, before any other polymer component. Separating the PETG entirely from the film using THF was difficult, as some polymer was left behind after the dissolution time was completed. This was not improved with different polymer/solvent ratios or a longer dissolution time. This separation inefficiency was attributed to the film strips being glued together possibly due to the presence of THF. This behavior was not observed whenever DMF was used for the PETG separation. Since DMF also dissolved the EVOH component, different THF/DMF mixtures were tested experimentally to decrease the EVOH solubility because THF is a poor solvent for EVOH ($R_d/R_0$ is 1.34 and the COSMO-RS predicted solubility is 1.78 wt %). A 40% THF-60% DMF (v/v) solvent mixture was determined to selectively dissolve PETG and not EVOH. This mixture was used for the actual film and the PETG yields improved from 15.28 to 20.83 wt %. 1-Propanol was selected as an antisolvent to precipitate the PETG since it had a low solubility in that solvent and it allowed for an easier solvent recycle after the recovery of PETG. Future work could consider solvent compositions to dissolve and precipitate the PETG component without the addition of an antisolvent. The STRAP-C results are presented in Table 7. For the remaining polymer components, which were PE, EVOH, PET, and EVA, the steps from STRAP-B were used, as shown in FIG. 14.

TABLE 7

| | | Yield of polymers from a multilayer film A2 with the STRAP-C process. | | | | | |
|---|---|---|---|---|---|---|---|
| Experi-ment | Initial film mass [g] | Polymer yield [wt %] | | | | | Overall mass balance [%] |
| | | PETG | PE | EVOH | EVA | PET | |
| 1 | 38.61 | 21.04 | 3.74 | 2.05 | 0.0031 | 73.11 | 99.94 |
| 2 | 38.53 | 21.00 | 3.48 | 1.93 | 0.99 | 73.25 | 100.65 |
| 3 | 38.66 | 20.44 | 4.39 | 1.55 | 0.59 | 72.39 | 99.35 |
| average | 38.60 | 20.83 | 3.87 | 1.84 | 0.79 | 72.91 | 99.98 |
| STDEV | 0.07 | 0.34 | 0.47 | 0.26 | 0.28 | 0.46 | 0.65 |

ATR-FTIR Characterization of Polymers Recovered with STRAP-C

The FTIR spectra of the PETG, EVOH, EVA, and PET recovered using STRAP-C looked mostly similar to the corresponding virgin resins (FIGS. 15A-15E). Some notable differences were observed in the PE spectra, where additional peaks were present around 1740, 1370, 1240, and 1020 cm$^{-1}$. These could be due to PETG remnants that were not separated in the first dissolution step. A quantitative measurement would be needed to determine if the PETG amounts in the PE could affect its properties. Dissolution times and solvent amounts could be further adjusted to improve the purity of the PE and remove more of the PETG.

Technoeconomic Analysis

A technoeconomic analysis (TEA) was completed to determine if it is possible to use any of the discussed STRAP processes to produce recycled polymers at a price that is comparable to the virgin resins. The minimum selling price (MSP) of the recycled resins was calculated for a process that operated continuously for 20 years with a 10% discount rate and a free input stream of the multilayer film (using a discounted cash flow analysis). We developed the STRAP process models in Aspen Plus (V11 Aspen Technology) based on our reported experimental mass balances. We estimated the size and cost of the required equipment in the three different STRAP processes with the multilayer films A1 and A2. The equipment purchase prices and variable operating costs of the distillation columns, pumps and heat exchangers were estimated using Aspen Process Economic Analyzer (V11 Aspen Technology), whereas the other equipment prices were estimated using engineering methods such as the proportional expression and the power law rules based on the cost data in our previous study [33].

Figure 16:
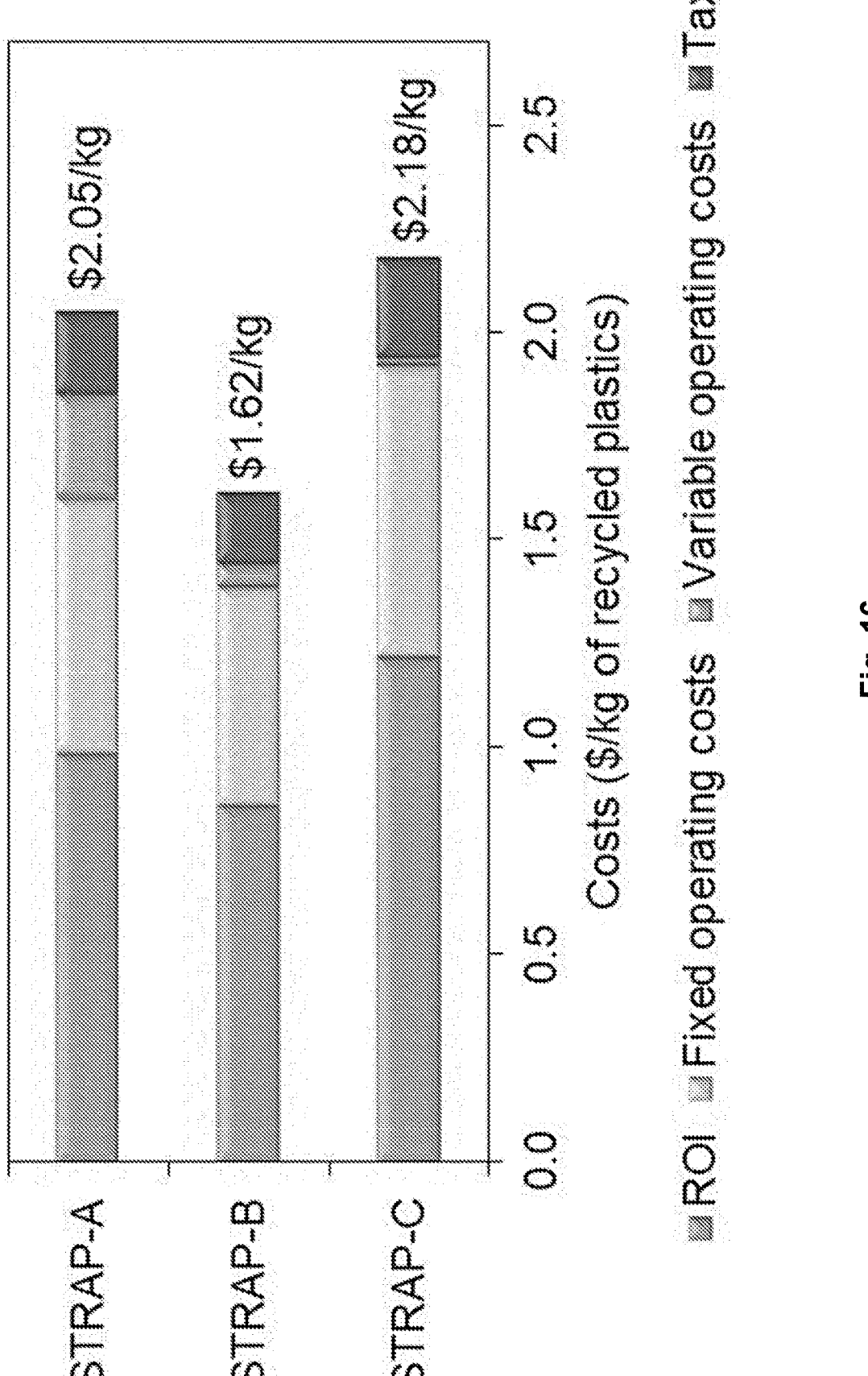
FIG. 16. MSP and breakdown of revenue destinations for STRAP-A, STRAP-B, and STRAP-C.

We calculated the MSPs of the STRAP-A, STRAP-B, and STRAP-C processes based on the material balances and economic parameters given in [44]. The total capital investment (in millions) was 25.65 for STRAP-A, 22.42 for STRAP-B, and 31.78 for STRAP-C. The MSPs of the STRAP-A and STRAP-B processes with the multilayer film A1 were calculated to be $2.05 kg 1 and $1.62 kg 1, respectively, at a feed rate of 3000 tons per year, as shown in FIG. 16. According to our estimates, the MSP of the STRAP-B process was 21.0% lower than that of the STRAP-A process. This is because STRAP-B produced similar polymer yields to STRAP-A but without the distillation-based separation of the solvents and antisolvents. Even with the additional EVA recovery step in STRAP-B, it still has a lower MSP than STRAP-A. Furthermore, the MSP of STRAPA is higher than that of the previous reported STRAP process [33] since the proposed STRAP processes in this Example include extruders for each of the recycled polymers. The extruder accounts for 55.22% of the total equipment purchase cost for STRAP-A.

The STRAP-C process was estimated to have an MSP of $2.18 kg 1 at the feed rate of 3000 tons per year with multilayer film A2. The higher MSP is explained by the fact that STRAP-C recovers an additional polymer, PETG, where DMF/THF and 1-propanol are used as the solvent/antisolvent pair and distillation steps are required to recover and recycle the solvents. In general, by selecting low-boiling solvents and minimizing the amount used, the utility cost of any required distillation columns can be decreased. As a result, even though STRAP-C requires higher capital investment, it operates at a lower variable operating cost.

Figure 17:
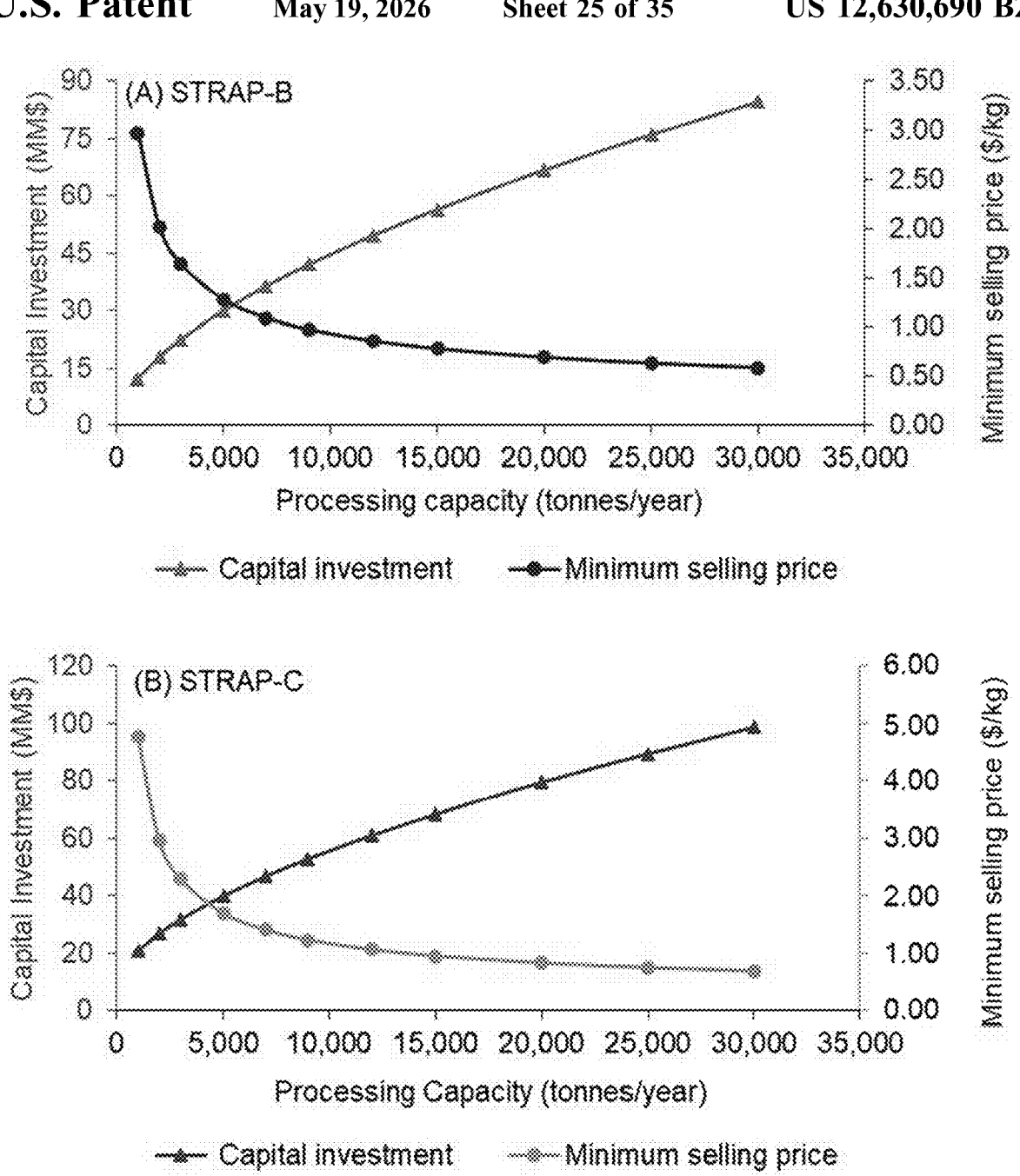
FIG. 17. Total capital investment and MSP for (A, top panel) the STRAP-B process and (B, bottom panel) the STRAP-C process as a function of process feed capacity.

We also conducted a feed rate sensitivity analysis for the STRAP-B and STRAP-C processes in order to evaluate effects of economies of scale. The results, illustrated in FIG. 17, indicate that, between 1000-30000 tons per year of feed, the capital investment appears to increase while the MSP begins to flatten out. The MSP of the STRAP-C process is lower than that of the STRAP-A counterpart as the feed capacity increases, especially after approximately 7000 tons per year of feed [33]. This is because, at 3000 tons per year, the annual capital investment of the STRAP-C process is 62.58% of the total required cost, whereas the annual capital investment accounts for 53.81% of the total required cost of the STRAP-A process. For example, at 7000 tons per year of feed, the MSPs of the STRAP-A and STRAP-C processes are 1.43 kg 1 and 1.40 kg 1, respectively. As the scale increases especially after 15000 tons per year, the MSPs of the recycled polymers (STRAP-A: 51.07 kg 1, STRAP-B: S0.78 kg 1, STRAP-C: 0.95 kg 1) are comparable to the average market values of the virgin resins which has been around 0.9-1.2 kg 1.[20, 42, 43] These estimates show that the STRAP process could be implemented at a large scale to recover and recycle the components in different post-industrial multilayer films.

Figure 18:
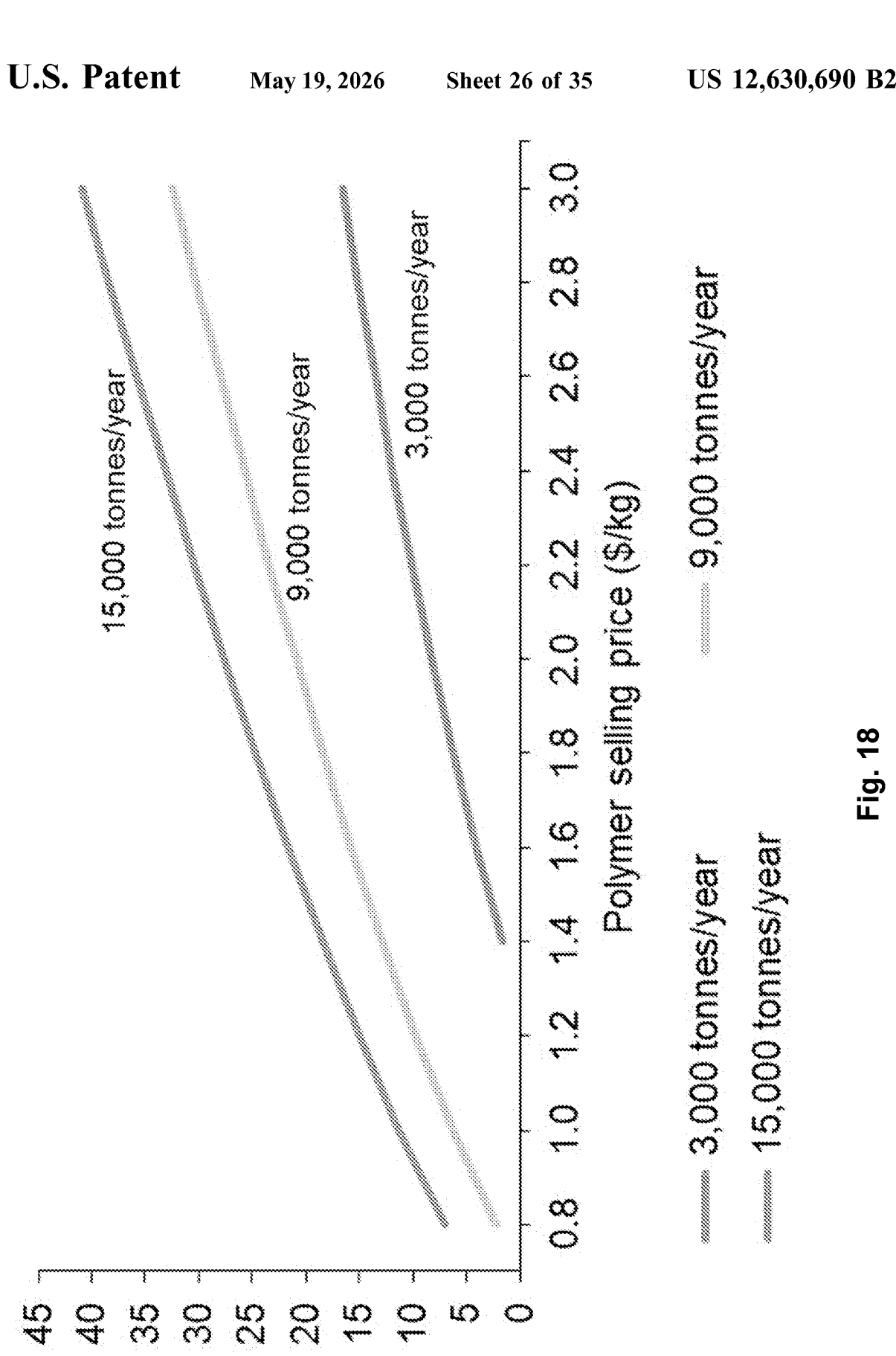
FIG. 18. Internal rate of return for the STRAP-C process as function of polymer selling price for three different feed capacities.
Figure 19:
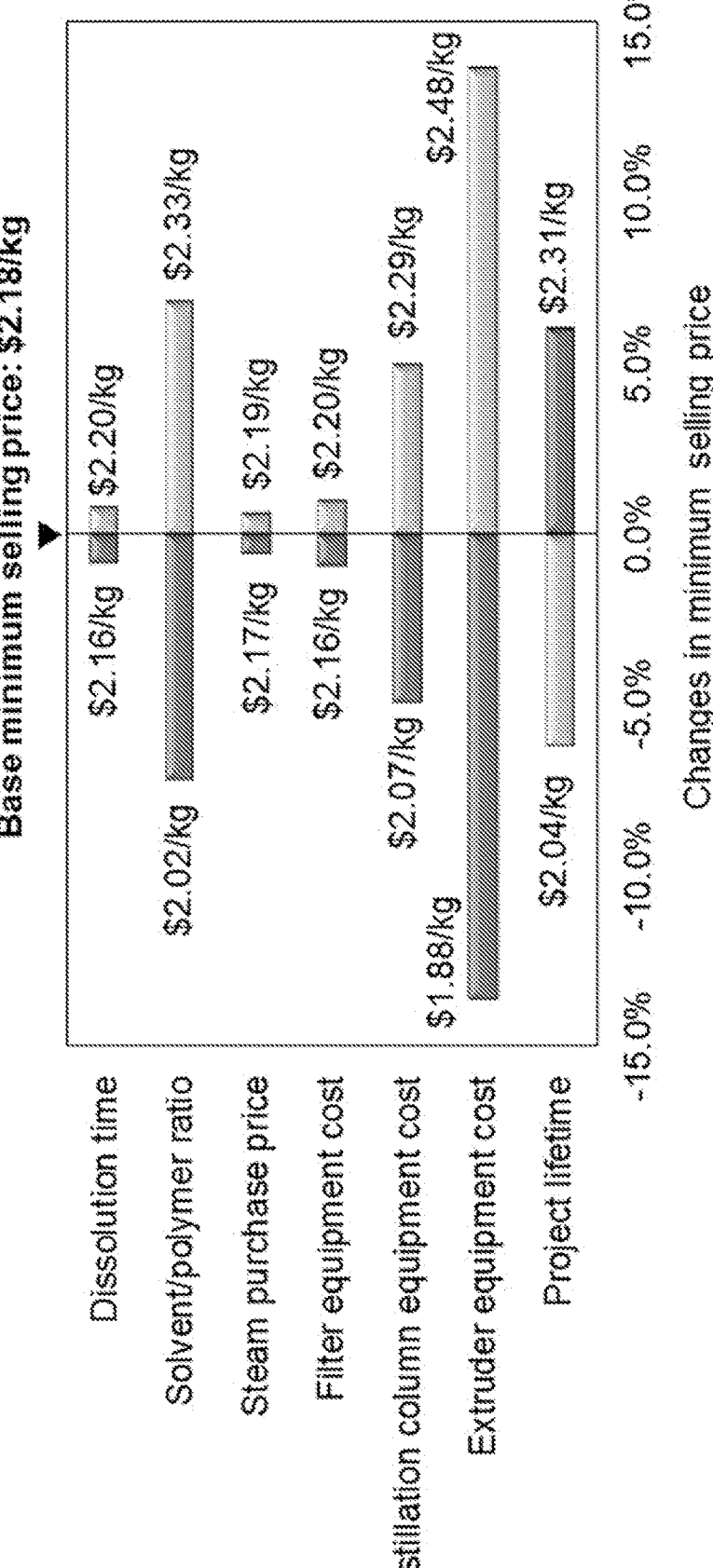
FIG. 19. Sensitivity analysis (±30%) of the parameters for the STRAP-C process.

An economic analysis of the recycled polymers from the STRAP-C process was conducted by changing the polymer selling price from 0.8 to $3.0 kg 1 for the three different feed capacities, as shown in FIG. 18. As expected, the internal rate of return (IRR) of the STRAP-C process increases with increasing the selling price. At the polymer selling price of $3.0 kg 1, the IRR of the STRAP-C process is estimated to be 16.63, 32.51, and 40.99% for 3000, 9000, and 15000 tons per year, respectively. The economic feasibility of the STRAP process shows to be improved with the larger feed capacity due to the effect of economies of scale. Furthermore, to investigate the parameters which have impacts on the economics of the STRAP-C process, we conducted a sensitivity analysis by changing in ±30% of the selected parameters (FIG. 19). The MSP of the STRAP-C is sensitive to the extruder equipment cost and the project lifetime. This is because the cost structure of the STRAP process is dominated by the capital investment. It is also observed that the solvent amount to the polymer influences the MSP since the amount of solvents has an effect on the equipment sizes. Overall, the TEA results for STRAP-B and STRAP-C demonstrate that the STRAP process can remain economically viable as the plastic feed complexity increases. By using solvents that enable temperature-controlled dissolution and precipitation, the capital costs can be significantly reduced by decreasing the required number of separation equipment for solvent recovery.

Conclusions

In this Example, the solvent-targeted recovery and precipitation (STRAP) technology was demonstrated to separate and recover the constituent polymers in two different rigid post-industrial multilayer plastic films manufactured by Amcor. The thermodynamic computational techniques permit initial predictions of polymer solubility in different solvents and solvent mixtures, reducing the number of experiments needed. It was previously determined that the main cost drivers in the STRAP process were the required distillation steps for the recycle of solvents and antisolvents. We show in this Example that reducing the use of antisolvents and replacing them with solvents or solvent mixtures that enable a temperature-controlled polymer dissolution and precipitation is an alternative to make STRAP more economically competitive. This was observed with our STRAP-B process which produced similar yields and was more efficient in the polymer separation than STRAP-A, while using less amounts of antisolvents. In addition to this, we have demonstrated that the STRAP process can remain economically competitive even as the plastic feed complexity increases, as was demonstrated in STRAP-C with multilayer film A2. Solvent mixtures are of great importance in solvent-based recycling systems and tuning the solvent composition will be a valuable parameter to obtain the desired polymer yields. Further developing the computational tools to predict polymer solubilities in different solvents with varying compositions will support in implementing this approach for the recycling of multilayer plastic films. Dissolution times and solvent amounts can be further adjusted to improve the purity of some of the recovered polymers using STRAP. Quantitative measurements could be done to assess if some impurities in the recovered polymers would affect their properties. Future work will also focus on using STRAP to process multilayer films with polymers not reported in this Example, like polyamides, polystyrene, polypropylene, and polyvinyl chloride. Ideally, this would include finding solvents or solvent combinations that facilitate a thermally driven dissolution and precipitation of each polymer. Moreover, we will consider the removal of additives like adhesives and inks, which can also be present in plastic films. Our computational modeling framework will give us an understanding of the thermodynamic polymer-solvent properties and will allow for the design of solvent systems that can be used to efficiently separate and recover the polymer components in different multilayer plastic films.

Example 3: STRAP with Printed Multilayer Film (PE/EVOH/PET)

Figure 20:
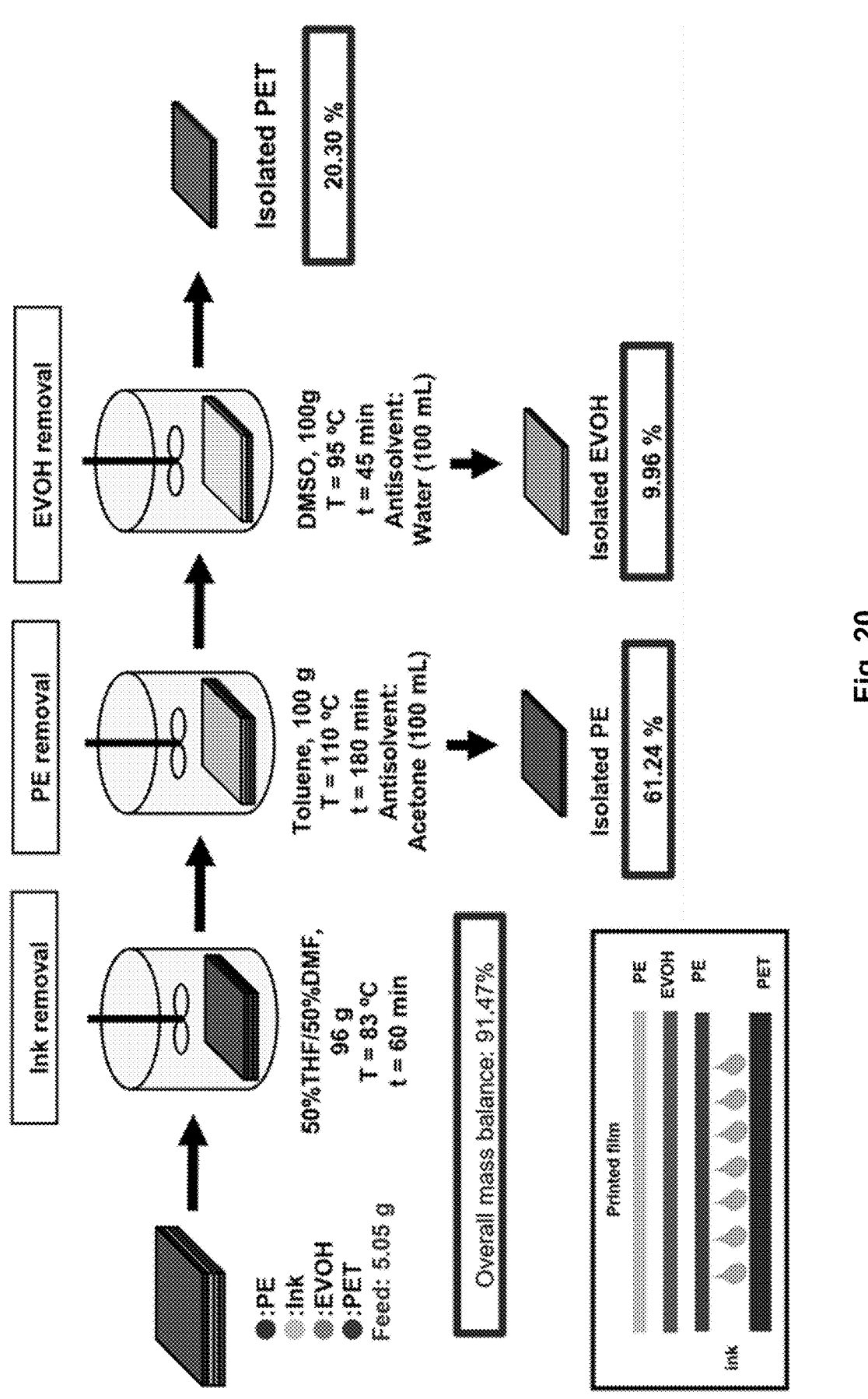
FIG. 20. STRAP process schematic for the separation and recovery of the polymer components in a printed multilayer film with a deinking step.

In this Example, we separated and recovered polymer components from a printed multilayer film consisting essentially of PE, EVOH and PET. The multilayer film was cut into 1×1 cm² stamps. A deinking step was conducted at the beginning by treating the stamps in 50% THF-50% DMF (v/v) at 83° C. for 60 min. Subsequent steps followed the STRAP-A process as described in Examples 1 and 2, except that dissolution of the PE fraction in toluene was conducted at 110° C. for 180 min and dissolution of the EVOH fraction in DMSO was conducted at 95° C. for 45 min (dissolution times are different). FIG. 20 shows the structure of the printed multilayer film, solvents, antisolvents, temperatures and dissolution times that were used in each process step.

Figure 21:
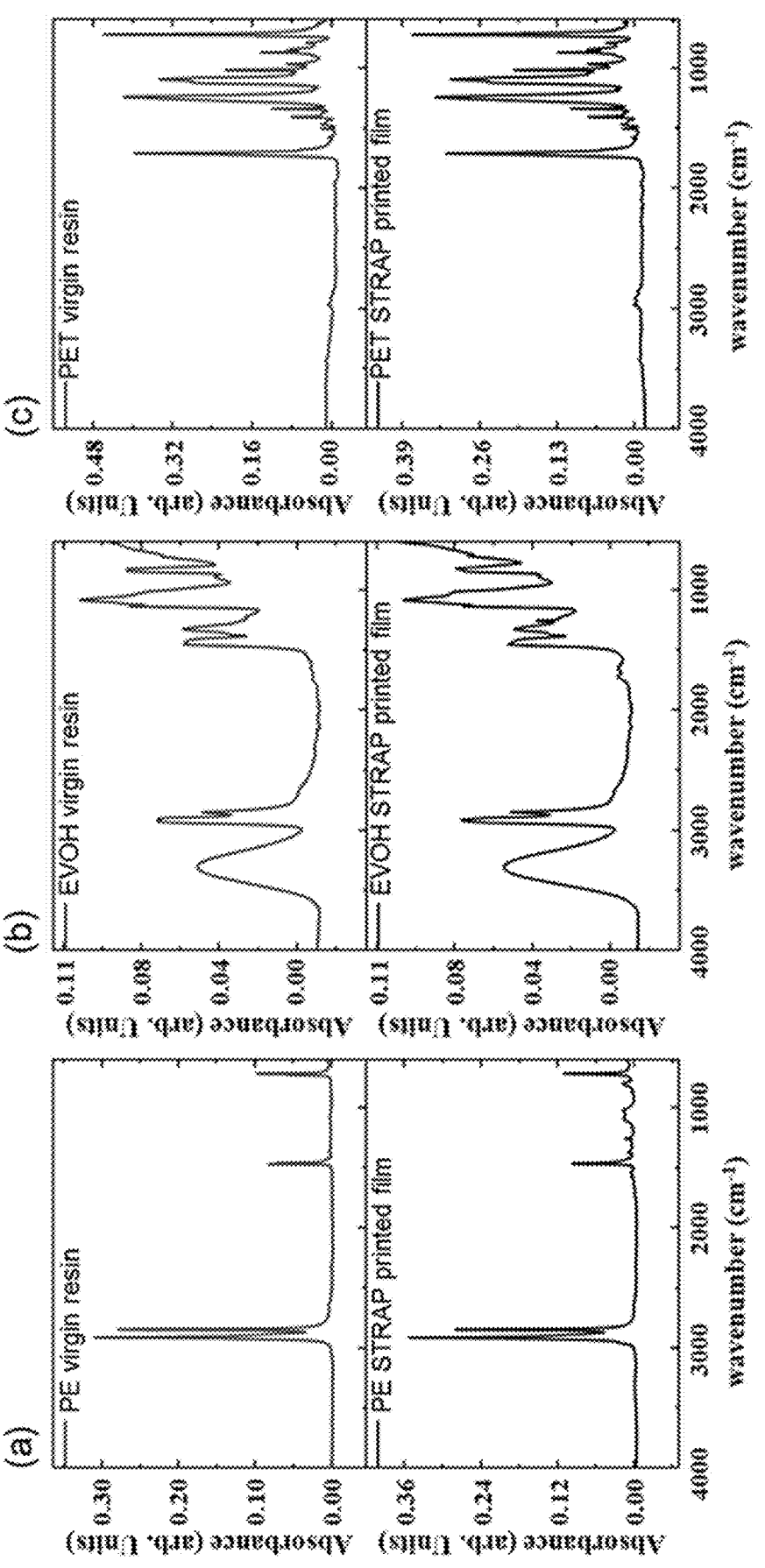
FIG. 21. ATR-FTIR spectra of the virgin resins and polymers recovered from the multilayer film through the STRAP process with a deinking step as shown in FIG. 20. (a)=PE virgin resin (top) versus PE STRAP printed film (bottom); (b)=EVOH virgin resin (top) versus EVOH STRAP printed film (bottom); (c)=PET virgin resin (top) versus PET STRAP printed film (bottom).

The process achieved an overall mass balance of 91.47 wt % (FIG. 20). The ATR-FTIR spectra corresponding to solid materials recovered from the process indicated the PE, EVOH and PET recovered from the film are indistinguishable from the same, corresponding virgin resins (FIG. 21). These results show that the deinking step can be used with the STRAP process to remove ink from printed plastics without significantly affecting yields and quality of the recovered polymer resins.

Example 4: Dissolution Times can be Significantly Reduced with Film Strips of ≤2 mm in Size In this Example, we attempted to reduce dissolution time of the STRAP process by shredding multilayer films to strips of ≤2 mm in size. The multilayer film is a printed film consisting essentially of PE, EVOH and PET. The shredded strips were firstly treated by 50% THF-50% DMF (v/v) at 83° C. for 5 min to remove ink. Subsequent steps followed the STRAP-B process as described in Example 2, except that the dissolution time for PE and EVOH fractions was 5 min, instead of 4 h or 30 min FIG. 22 shows the solvents, temperatures and dissolution times that were used in each process step.

Figure 22:
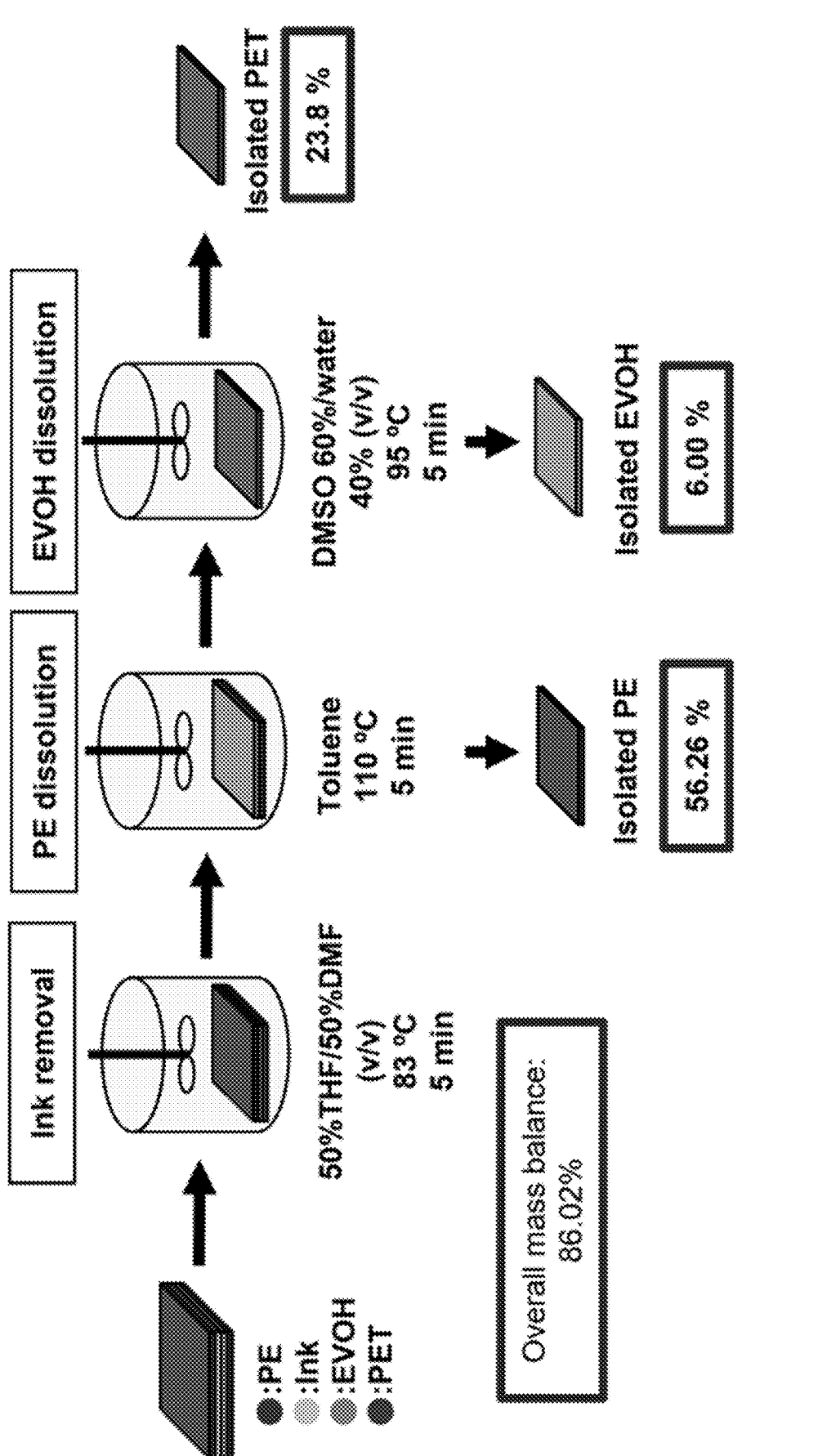
FIG. 22. STRAP process schematic for the separation and recovery of polymer components in a printed multilayer film by shredding the film to strips of ≤2 mm in size.
Figure 23:
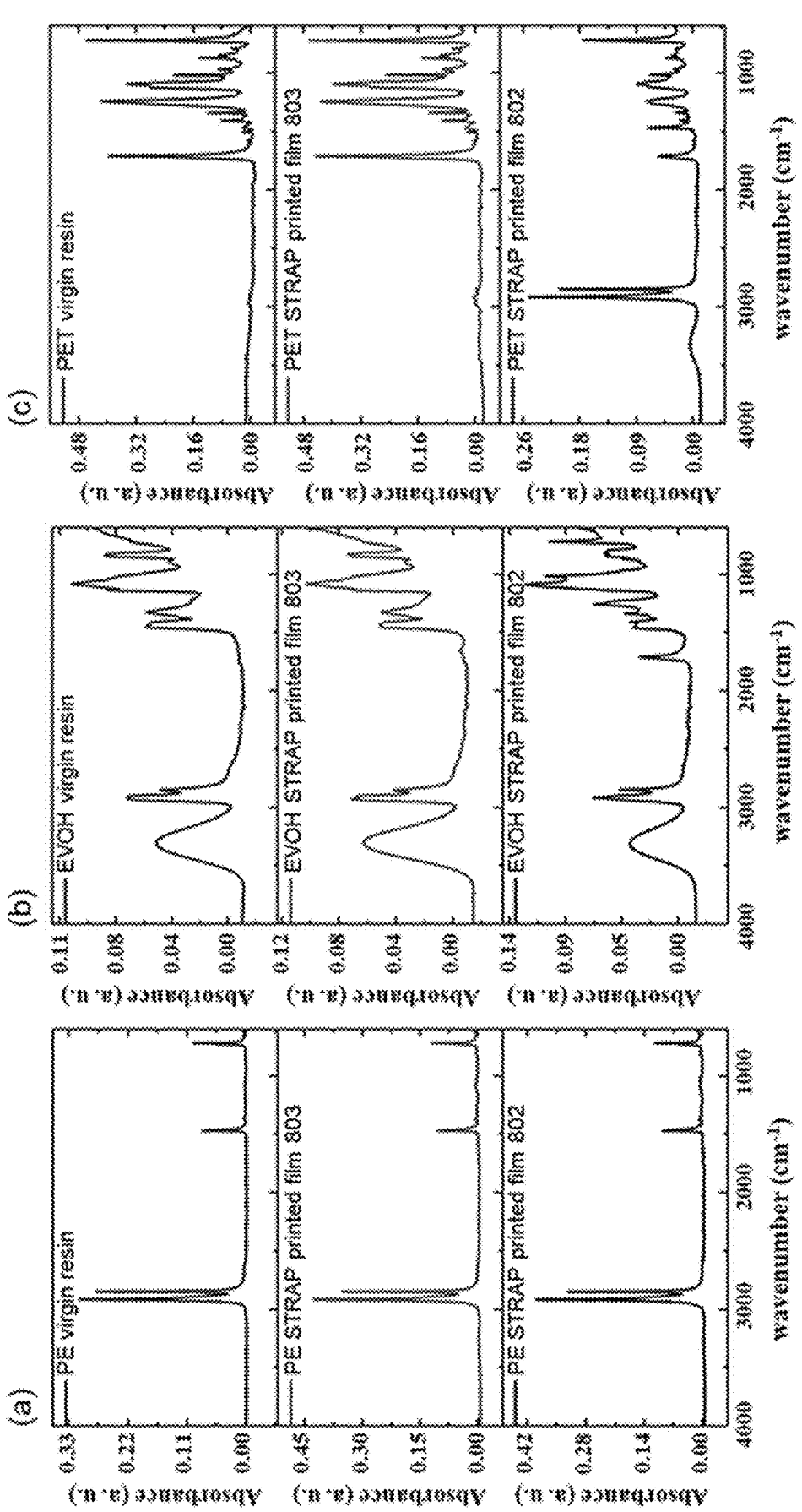
FIG. 23. ATR-FTIR spectra of the virgin resins and polymers recovered from multilayer film through the STRAP process applied to strips of ≤2 mm in size as shown in FIG. 22. (a)=PE virgin resin (top), PE STRAP printed film 803 (middle), PE STRAP printed film 802 (bottom); (b)=EVOH virgin resin (top), EVOH STRAP printed film 803 (middle), EVOH STRAP printed film 802 (bottom); (c)=PET virgin resin (top), PET STRAP printed film 803 (middle), PET STRAP printed film 802 (bottom)

The process achieved an overall mass balance of 86.02 wt % (FIG. 22). The yields are relatively lower than experiments with longer dissolution time using 1×1 cm² films as described in Example 2. However, dissolution time can be further optimized to maximize the yields. Nevertheless, the dissolution time required to dissolve strips ≤2 mm in size would be significantly shorter than the 1×1 cm² films. The PET, EVOH and PE recovered from the film are indistinguishable from the same, corresponding virgin resins, as shown by the ATR-FTIR spectra in FIG. 23, except that one PET sample showed peaks around 3000 cm⁻¹ which could be coming from PE not dissolved (FIG. 23, panel (c)). These results show that shredding multilayer films to strips of smaller size (e.g., ≤2 mm) can effectively reduce the required dissolution time in STRAP process.

Example 5: STRAP with Mixed Plastic Waste

Figure 24:
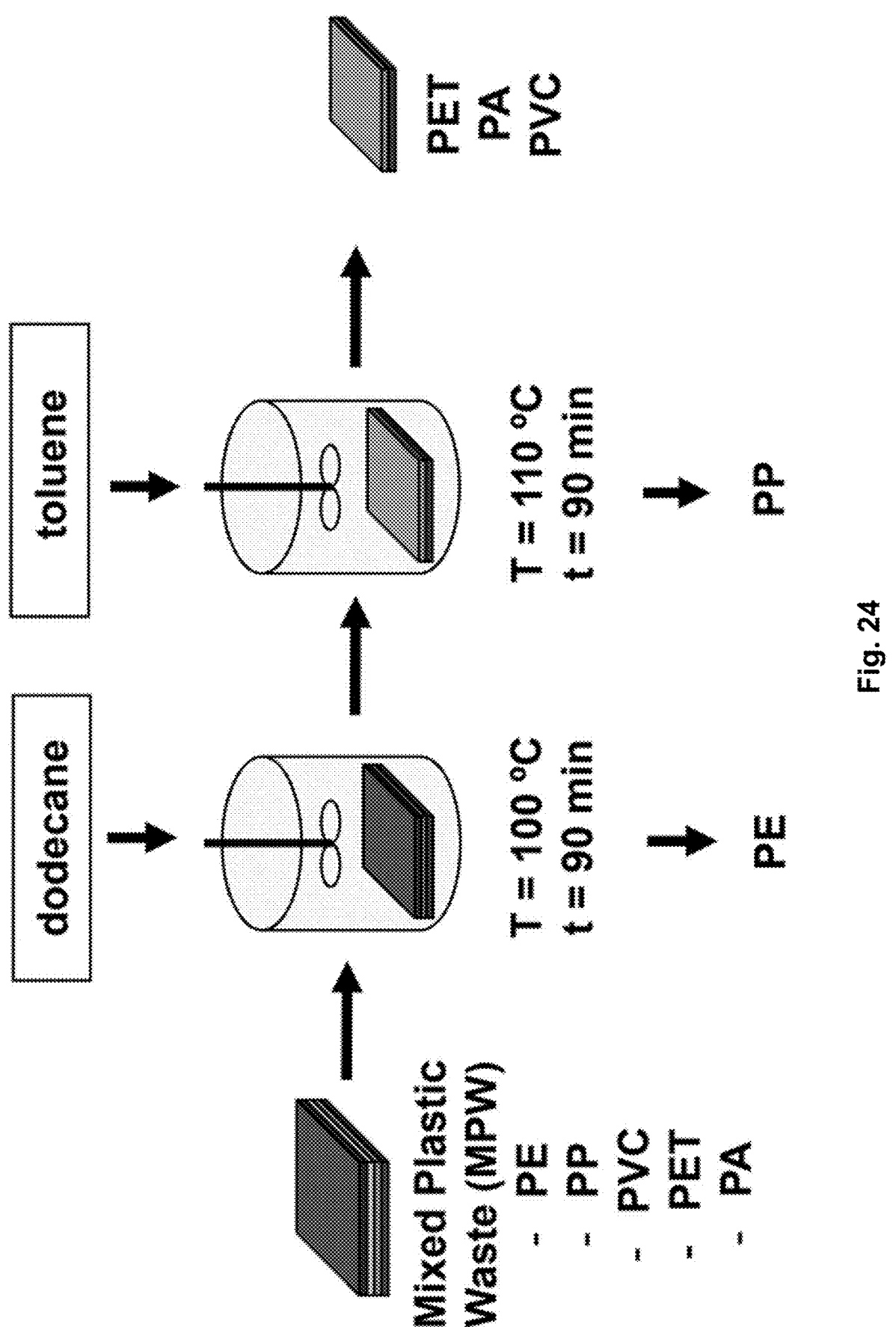
FIG. 24. STRAP process schematic for the separation and recovery of PE and PP from mixed plastic waste.

In this Example, we experimented with mixed plastic waste consisting essentially of PE, PP, PVC, PET and PA, and found a solvent system (dodecane/toluene) that allows for the separation of PE and PP from a mixture of the polymers. PP has been a very difficult polymer to separate historically. The process comprises dissolving PE in dodecane at 100° C. for 90 min, and then dissolving PP in toluene at 110° C. for 90 min. FIG. 24 shows the solvents, temperatures and dissolution times that were used in each process step. The solubilized PE and PP can be precipitated by lowering the temperature of the solvents to about 35° C.

Example 6: STRAP with Nylon-Based Multilayer Plastic Film and Mixed Plastic Waste In this Example, we separated and recovered polymer components from a nylon-based multilayer plastic film consisting essentially of PE, EVOH and nylons, and a mixed plastic waste consisting essentially of several PEs (LDPE and HDPE), nylons (nylon 6,6,6, nylon 6,6 and nylon 6), PP, PET, and PVC. Different solvent and temperature combinations were tried until correct polymers were targeted.

Figure 25:
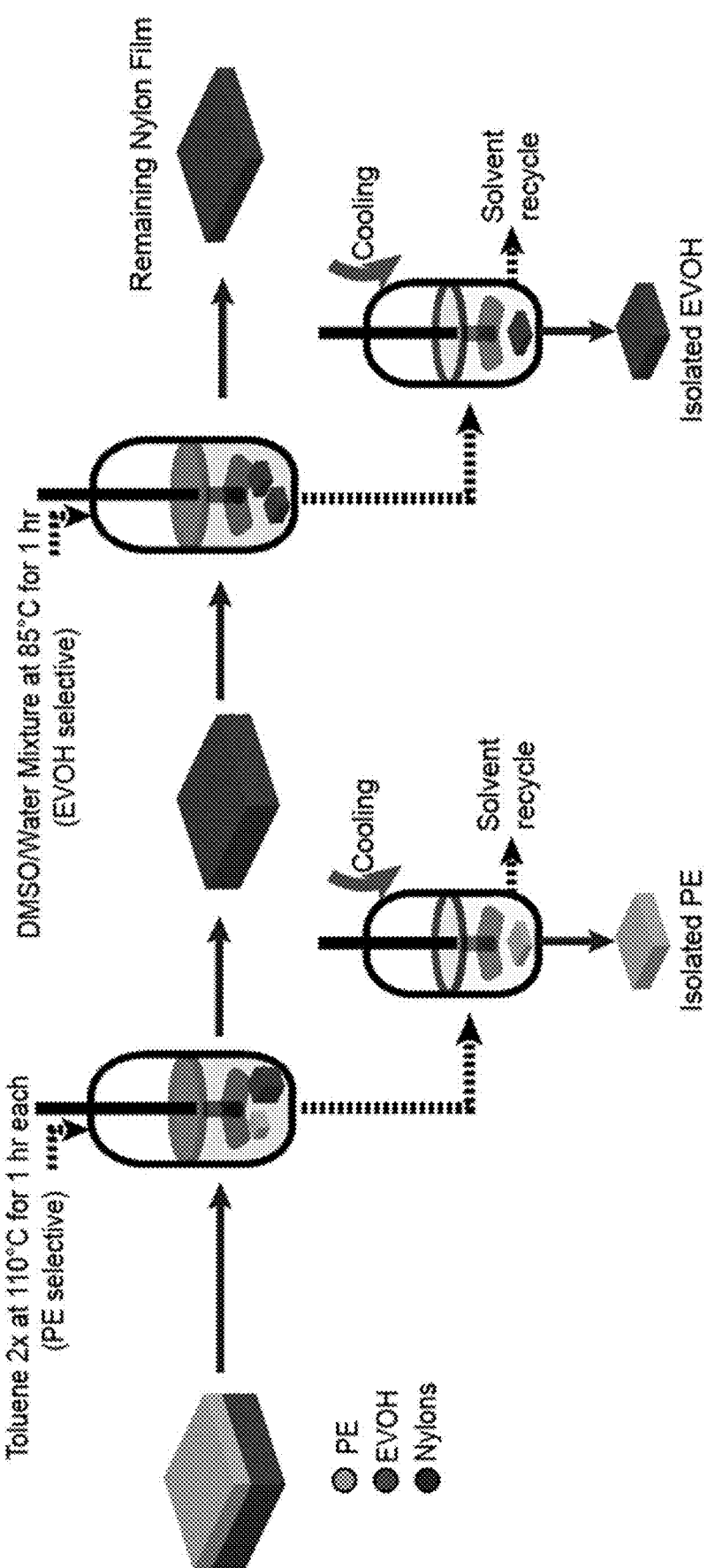
FIG. 25. STRAP process schematic for the separation and recovery of the polymer components from a nylon-based multilayer plastic film.
Figure 26:
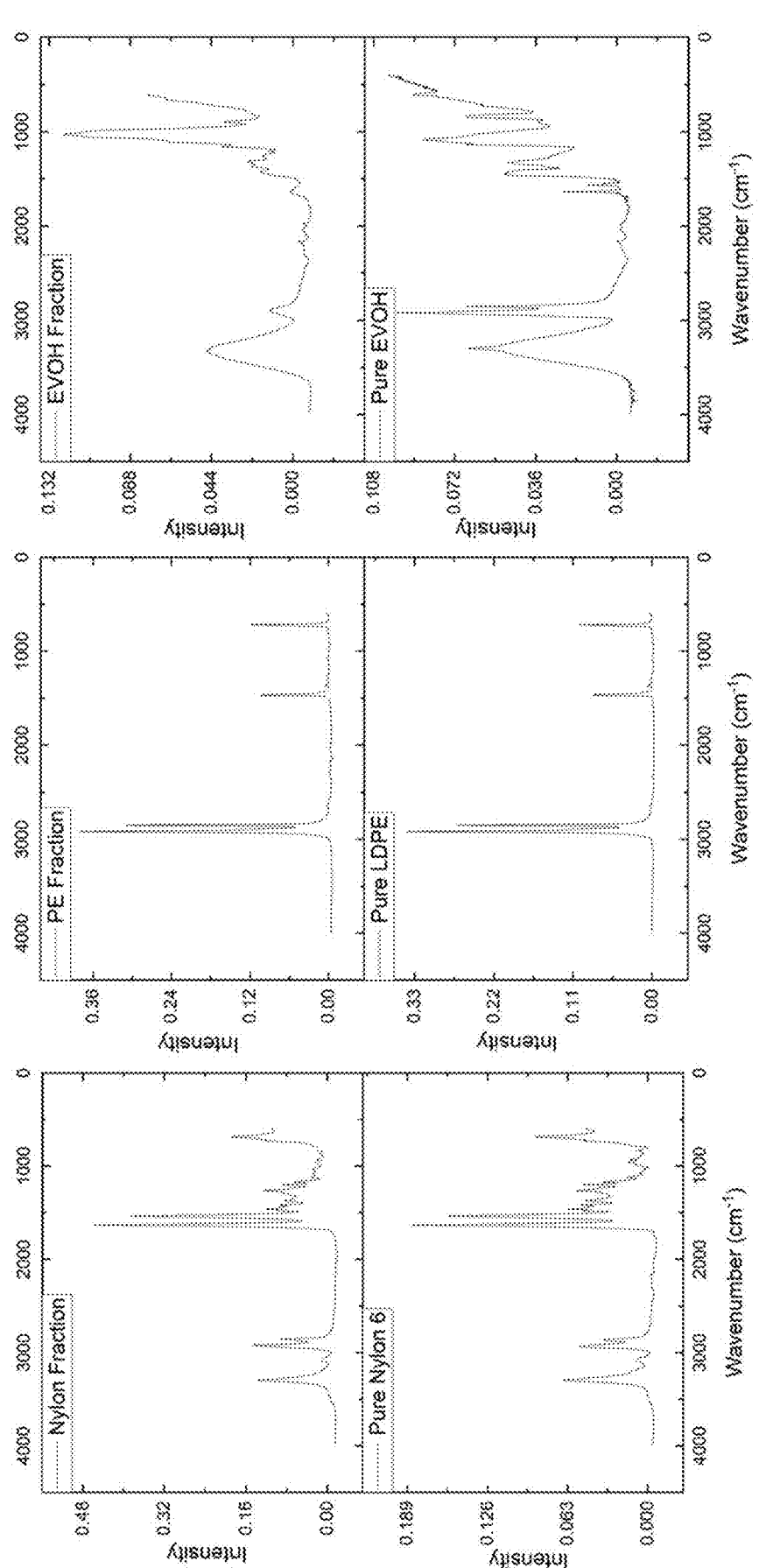
FIG. 26. ATR-FTIR spectra of the virgin resins and polymers recovered from the nylon-based multilayer plastic film through the STRAP process as shown in FIG. 25. Left panel=nylon fraction (top) versus pure nylon 6 (bottom); middle panel=PE fraction (top) versus pure LDPE (bottom); right panel=EVOH fraction (top) versus pure EVOH (bottom).

The process of recovering polymer components from the nylon-based multilayer plastic film comprises dissolving PE in toluene at 110° C., and then dissolving EVOH in a solvent comprising DMSO and water at 85° C. The solubilized PE and EVOH were precipitated by lowering the temperature of the solvents. The remaining solid is the nylons. FIG. 25 shows the solvents, temperatures and dissolution times that were used in each process step. The PE, EVOH and nylon recovered from the film are indistinguishable from the same, corresponding pure resins, as shown by the ATR-FTIR spectra in FIG. 26. Slight differences in peaks for the EVOH may be attributed to additives in the films or contamination. The process achieved an overall mass balance of 96.66% as shown in Table 8.

TABLE 8

| Mass balance for the STRAP of the nylon film. | |
| --- | --- |
| Polymer | Mass Balance (%) |
| PE | 40.4 |
| EVOH | 1.55 |
| Residual (Nylon) | 54.71 |
| Total | 96.66 |

Figure 27:
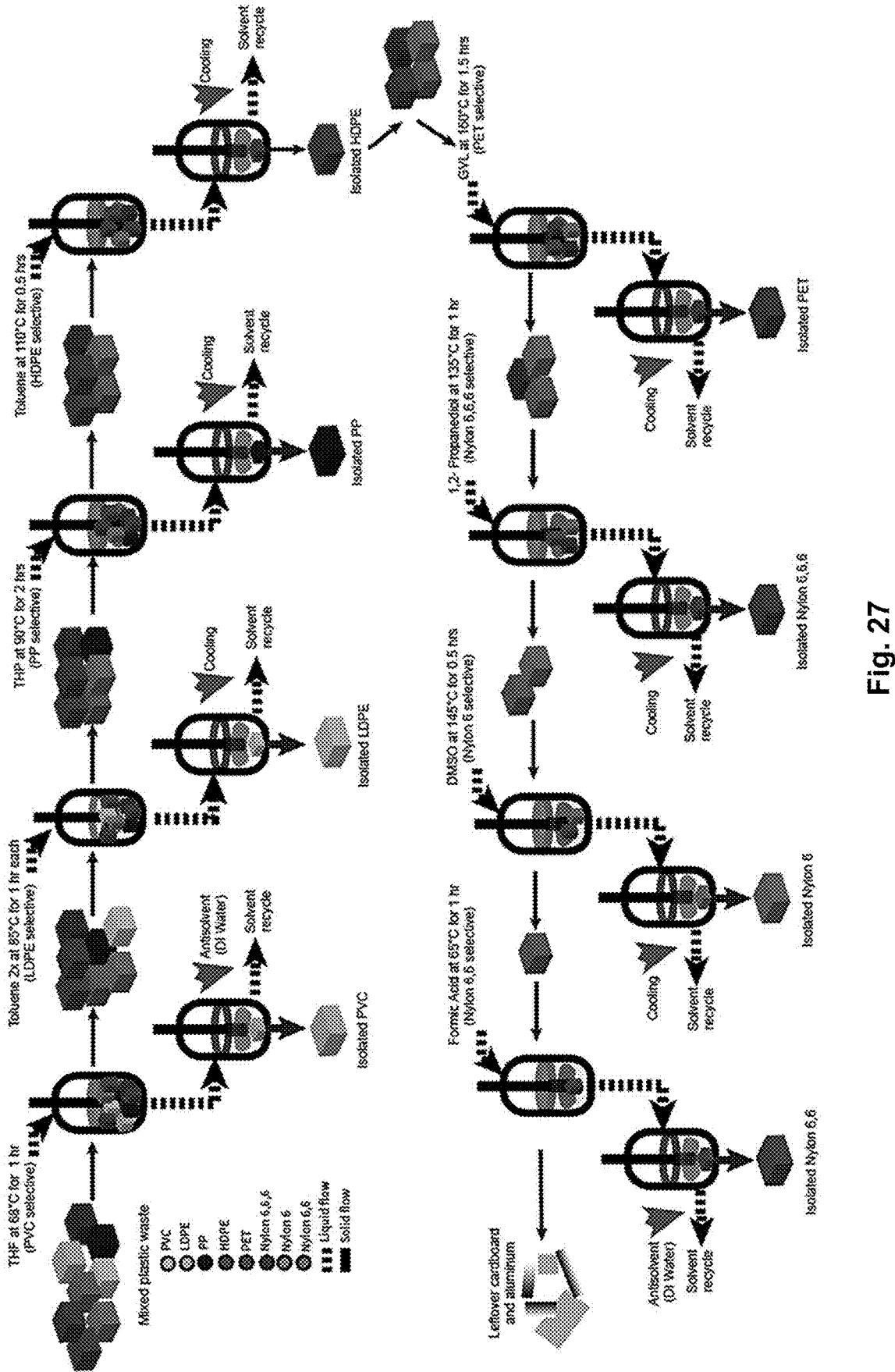
FIG. 27. STRAP process schematic for the separation and recovery of the polymer components from a mixed plastic waste composed of several PEs (LDPE and HDPE), nylons (nylon 6,6,6, nylon 6,6, and nylon 6), PP, PET, and PVC.

The process of recovering polymer components from the mixed plastic waste comprises sequentially dissolving the PVC in THF at 68° C., dissolving the LDPE in toluene at 85° C., dissolving the PP in THP at 90° C., dissolving the HDPE in toluene at 110° C., dissolving the PET in GVL at 160° C., dissolving the nylon 6,6,6 in 1,2-propanediol at 135° C., dissolving the nylon 6 in DMSO at 145° C., and dissolving the nylon 6,6 in formic acid at 65° C. Precipitation of the solubilized polymers were mostly conducted by lowering the temperature of the solvents, except PVC and nylon 6,6, which were precipitated by adding antisolvent water. FIG. 27 shows the solvents, temperatures and dissolution times that were used in each process step. The residual contains aluminum, cardboard, and remaining polymers that were not fully dissolved. The process achieved an overall mass balance of 95.83% as shown in Table 9.

TABLE 9

| Mass balance for the STRAP of the mixed plastic waste. | |
| --- | --- |
| Polymer | Mass Balance (%) |
| PVC | 0 |
| LDPE | 33.15 |
| PP | 6.83 |
| HDPE | 1.02 |
| PET | 25.83 |
| Nylon 666 | 11.05 |
| Nylon 6 | 2.02 |
| Nylon 66 | 0.96 |
| Residual | 14.97 |
| Total | 95.83 |

REFERENCES

1. S. Abbott, C. M. Hansen, *Hansen Solubility Parameters in Practice* (2008); Hansen-Solubility.com.
2. A. Klamt, F. Eckert, M. Hornig, M. E. Beck, T. Bürger, Prediction of aqueous solubility of drugs and pesticides with COSMO-RS. *J. Comput. Chem.* 23, 275-281 (2002).
3. Z. Shen, R. C. Van Lehn, Solvent selection for the separation of lignin-derived monomers using the conductor-like screening model for real solvents. *Ind. Eng. Chem.* Res. 59, 7755-7764 (2020).
4. V. TURBOMOLE, a development of University of Karlsruhe and Forschungszentrum Karlsruhe GmbH, 1989-2007, TURBOMOLE GmbH, since 2007. *There is no corresponding record for this reference.* [*Google Scholar*], (2010).
5. M. J. Abraham, T. Murtola, R. Schulz, S. Páll, J. C. Smith, B. Hess, E. Lindahl, GROMACS: High performance molecular simulations through multi-level parallelism from laptops to supercomputers. *SoftwareX* 1-2, 19-25 (2015)
6. J. M. Wang, W. Wang, P. A. Kollman, D. A. Case, Automatic atom type and bond type perception in molecular mechanical calculations. *J. Mol. Graph. Model.* 25, 247-260 (2006).
7. J. M. Wang, R. M. Wolf, J. W. Caldwell, P. A. Kollman, D. A. Case, Development and testing of a general AMBER force field. *J. Comput. Chem.* 25, 1157-1174 (2004).
8. P. Naviroj, J. Treacy, C. Urffer, *Chemical Recycling of Plastics by Dissolution* (University of Pennsylvania, 2019).
9. Z. Zhang, I. J. Britt, M. A. Tung, Water absorption in EVOH films and its influence on glass transition temperature. *J. Polym. Sci. Pol. Phys.* 37, 691-699 (1999).
10. M. A. Samus, G. Rossi, Methanol absorption in ethylene-vinyl alcohol copolymers: Relation between solvent diffusion and changes in glass transition temperature in glassy polymeric materials. *Macromolecules* 29, 2275-2288 (1996).
11. W. Jiang, X. Qiao, K. Sun, Mechanical and thermal properties of thermoplastic acetylated starch/poly (ethylene-co-vinyl alcohol) blends. *Carbohydr. Polym.* 65, 139-143 (2006).
12. A. B. Thompson, D. W. Woods, The transitions of polyethylene terephthalate. *Trans. Faraday Soc.* 52, 1383-1397 (1956).

13. W. Cobbs Jr., R. Burton, Crystallization of polyethylene terephthalate. *J. Polym. Sci.* 10, 275-290 (1953).

14. I. Vollmer, M. J. F. Jenks, M. C. P. Roelands, R. J. White, T. Harmelen, P. Wild, G. P. Laan, F. Meirer, J. T. F. Keurentjes, B. M. Weckhuysen, Beyond mechanical recycling: Giving new life to plastic waste. *Angew. Chem. Int. Ed.* 59, 15402-15423 (2020).

15. S. H. Krishna, K. Huang, K. J. Barnett, J. He, C. T. Maravelias, J. A. Dumesic, G. W. Huber, M. de bruyn, B. M. Weckhuysen, Oxygenated commodity chemicals from chemo-catalytic conversion of biomass derived heterocycles. *AIChE J.* 64, 1910-1922 (2018).

16. D. Zhang, E. A. del Rio-Chanona, N. Shah, in *Computer Aided Chemical Engineering* (Elsevier, 2018), vol. 44, pp. 1693-1698.

17. R. H. J. M. Gradus, P. H. L. Nillesen, E. Dijkgraaf, R. J. Van Koppen, A cost-effectiveness analysis for incineration or recycling of Dutch household plastic waste. *Ecol. Econ.* 135, 22-28 (2017).

18. G. Bergsma, M. Bijleveld, M. Otten, B. Krutwagen, LCA: *Recycling Van Kunststof Verpakkingsafval Uit Huishoudens* (CE Delft, Delft, 2011).

19. H. H. Khoo, LCA of plastic waste recovery into recycled materials, energy and fuels in Singapore. *Resour. Conserv. Recycl.* 145, 67-77 (2019).

20. G. Pappa, C. Boukouvalas, C. Giannaris, N. Ntaras, V. Zografos, K. Magoulas, A. Lygeros, D. Tassios, The selective dissolution/precipitation technique for polymer recycling: A pilot unit application. Resour. Conserv. Recycl. 34, 33-44 (2001).

21. D. S. Achilias, C. Roupakias, P. Megalokonomos, A. A. Lappas, E. V. Antonakou, Chemical recycling of plastic wastes made from polyethylene (LDPE and HDPE) and polypropylene (PP). *J. Hazard. Mater.* 149, 536-542 (2007).

22. Maeurer, Andreas, Martin Schlummer, Otto Beck. Method for recycling plastic materials and use thereof, U.S. Pat. No. 8,138,232. 20 Mar. 2012

23. A. J. Hadi, G. F. Najmuldeen, K. B. Yusoh, *J. Polym. Eng.* 2013, 33, 471-481

24. G. S. Weeden, Jr., N. H. Soepriatna, N. H. Wang, *Environ. Sci. Technol.* 2015, 49, 2425-2433.

25. E. B. Nauman, J. C. Lynch, U.S. Pat. No. 5,278,282, 1994.

26. E. B. Nauman, J. C. Lynch, U.S. Pat. No. 5,198,471, 1993.

27. S. Ugduler, K. M. Van Geem, M. Roosen, E. I. P. Delbeke, S. De Meester, *Waste Manage.* 2020, 104, 148-182.

28. C. M. Hansen, Hansen solubility parameters: a user's handbook, CRC press, 2007.

29. A. Klamt, *J. Phys. Chem.* 1995, 99, 2224-2235.

30. J Kahlen, K. Masuch, K. Leonhard, *Green Chem.* 2010, 12, 2172-2181.

31. M. Frisch, G. Trucks, H. Schlegel, G. Scuseria, M. Robb, J. Cheeseman, G. Scalmani, V. Barone, G. Petersson, H. Nakatsuji, Gaussian, Inc. Wallingford, C T, 2016.

32. A. Klamt, V. Jonas, T. Burger, J. C. Lohrenz, *J. Phys. Chem. A* 1998, 102, 5074-5085.

33. T. W. Walker, N. Frelka, Z. Shen, A. K. Chew, J. Banick, S. Grey, J. A. Dumesic, R. C. V. Lehn, G. W. Huber, *Sci. Adv.* 2020, 6 (47), eaba7599.

34. T. Chen, J. Zhang, H. You, *RSC Adv.* 2016, 6, 102778-102790.

35. D. C. C. Habgood, A. F. A. Hoadley, L. Zhang, Chem. *Eng. Res. Des.* 2015, 102, 57-68.

36. G. Towler, R. Sinnott, Chemical Engineering Design Principles, Practice and Economics of Plant and Process Design, Elsevier, 2013.

37. M. Ioelovich, Org. Polym. *Mater. Res.* 2019, 1.

38. A. Dutta, A. Sahir, E. Tan, D. Humbird, L. J. Snowden-Swan, P. Meyer, D. S. Jeff Ross, R. Yap, J. Lukas, Process Design and Economics for the Conversion of Lignocellulosic Biomass to Hydrocarbon Fuels Thermochemical Research Pathways with In Situ and Ex Situ Upgrading of Fast Pyrolysis Vapors, National Renewable Energy Laboratory, Pacific Northwest National Laboratory, PNNL-23823, 2015.

39. Alibaba, THF/Tetrahydrofuran Price.

40. Alibaba, DMF/N,N-Dimethylformamide Price.

41. Alibaba, 1-propanol Price.

42. D. Zhang, E. A. del Rio-Chanona, N. Shah, International Symposium on Process Systems Engineering (PSE 2018) 2018, 1693-1698.

43. Commodity Resin Prices Rise, But PP Falls, Plastics Technology 2021, www.ptonline.com/articles/commodity-resin-prices-rise-but-ppfalls.

44. K. L. Sánchez-Rivera, P. Zhou, M. S. Kim, L. D. G. Chávez, S. Grey, K. Nelson, S. Wang, I. Hermans, V. M. Zavala, R. C. Van Lehn, G. W. Huber, *ChemSusChem.* 2021, 14, 4317-4329.

We claim:

1. A method to recover constituent polymers in a multilayer plastic film or mixed plastic waste, comprising:
   (a) selectively dissolving one or more polymers in a solvent at a temperature, wherein the one or more polymers are soluble, but other polymers in the multilayer plastic film or mixed plastic waste are not, to yield a solubilized polymer fraction;
   (b) mechanically separating the solubilized polymer fraction from the multilayer plastic film or mixed plastic waste;
   (c) precipitating each polymer of the solubilized polymer fraction from the solvent; and
   (d) repeating steps (a), (b), and (c) for each different additional polymers in the multilayer plastic film or mixed plastic waste using a solvent and a temperature that selectively dissolves one or more of the additional polymers, wherein a different solvent is used for each step (a).

2. The method of claim 1, further comprising using computational tools to select the solvent and the temperature that selectively dissolves the one or more polymers from among all of the components present in the multilayer plastic film or mixed plastic waste.

3. The method of claim 2, wherein the computational tools include calculating Hansen solubility parameters (HSPs), molecular dynamics (MD) simulations, and combined quantum chemical and statistical mechanical modeling.

4. The method of claim 1, further comprising a deinking step to remove ink from the multilayer plastic film or mixed plastic waste before step (a).

5. The method of claim 4, wherein the deinking step is conducted by treating the multilayer plastic film or mixed plastic waste in a solvent comprising tetrahydrofuran (THF) and N,N-dimethylformamide (DMF).

6. The method of claim 1, further comprising cutting the multilayer plastic film or mixed plastic waste into stamps ≤1 cm² before step (a).

7. The method of claim 1, further comprising shredding the multilayer plastic film or mixed plastic waste into strips ≤5 mm, ≤4 mm, ≤3 mm, or ≤2 mm before step (a).

8. The method of claim 1, wherein in step (c), at least one polymer of the solubilized polymer fraction is precipitated from the solvent by adding an antisolvent.

9. The method of claim 1, wherein in step (c), at least one polymer of the solubilized polymer fraction is precipitated from the solvent by changing the temperature of the solvent.

10. The method of claim 1, wherein the multilayer plastic film consists essentially of polyethylene (PE), ethylene vinyl alcohol (EVOH) and polyethylene terephthalate (PET).

11. The method of claim 10, wherein in step (a), the PE is selectively dissolved in toluene, and the EVOH is selectively dissolved in dimethyl sulfoxide (DMSO).

12. The method of claim 11, wherein in step (c), the solubilized PE is precipitated by adding acetone, and the solubilized EVOH is precipitated by adding water.

13. The method of claim 10, wherein in step (a), the PE is selectively dissolved in toluene or a $C_6$ to $C_{12}$ alkane, and the EVOH is selectively dissolved in a solvent comprising DMSO and water.

14. The method of claim 13, wherein in step (c), the solubilized PE is precipitated by lowering the temperature of the toluene, and the solubilized EVOH is precipitated by lowering the temperature of the DMSO and water.

15. The method of claim 10, wherein the multilayer plastic film further comprises a tie layer comprising ethylene vinyl acetate (EVA).

16. The method of claim 15, wherein the EVA is dissolved in toluene in step (a) and precipitated by adding acetone in step (c) together with the PE, and the EVA is separated from the PE after step (c) by selectively dissolving the EVA in N-methylpyrrolidinone (NMP).

17. The method of claim 15, wherein the EVA is dissolved in toluene in step (a) together with the PE, and the EVA is separated from the PE in step (c) by lowering the temperature of the toluene to precipitate the PE.

18. The method of claim 1, wherein the multilayer plastic film consists essentially of polyethylene terephthalate glycol (PETG), PE, EVOH and PET.

19. The method of claim 18, wherein in step (a), the PETG is selectively dissolved in a solvent comprising DMF and THF, the PE is selectively dissolved in toluene, and the EVOH is selectively dissolved in a solvent comprising DMSO and water.

20. The method of claim 19, wherein in step (c), the solubilized PETG is precipitated by adding 1-propanol, the solubilized PE is precipitated by lowering the temperature of the toluene, and the solubilized EVOH is precipitated by lowering the temperature of the DMSO and water.

21. The method of claim 1, wherein the mixed plastic waste consists essentially of PE, polypropylene (PP), polyvinyl chloride (PVC), PET and polyamide (PA).

22. The method of claim 21, wherein in step (a), the PE is selectively dissolved in dodecane, and the PP is selectively dissolved in toluene.

23. The method of claim 22, wherein in step (c), the solubilized PE is precipitated by lowering the temperature of the dodecane, and the solubilized PP is precipitated by lowering the temperature of the toluene.

24. The method of claim 1, wherein the multilayer plastic film consists essentially of PE, EVOH and nylon.

25. The method of claim 24, wherein in step (a), the PE is selectively dissolved in toluene, and the EVOH is selectively dissolved in a solvent comprising DMSO and water.

26. The method of claim 25, wherein in step (c), the solubilized PE is precipitated by lowering the temperature of the toluene, and the solubilized EVOH is precipitated by lowering the temperature of the DMSO and water.

27. The method of claim 1, wherein the mixed plastic waste consists essentially of PVC, low-density polyethylene (LDPE), PP, high-density polyethylene (HDPE), PET, nylon 6,6,6, nylon 6, and nylon 6,6.

28. The method of claim 27, wherein in step (a), the PVC is selectively dissolved in THF, the LDPE is selectively dissolved in a $C_6$ to $C_{12}$ alkane, the PP is selectively dissolved in tetrahydropyran (THP) at about 90° C., the HDPE is selectively dissolved in toluene, the PET is selectively dissolved in γ-valerolactone (GVL) at about 160° C., the nylon 6,6,6 is selectively dissolved in 1,2-propanediol at about 135° C., the nylon 6 is selectively dissolved in DMSO at about 145° C., and the nylon 6,6 is selectively dissolved in formic acid at about 65° C.

29. The method of claim 28, wherein in step (c), the solubilized PVC is precipitated by adding water, the solubilized LDPE is precipitated by lowering the temperature of the $C_6$ to $C_{12}$ alkane, the solubilized PP is precipitated by lowering the temperature of the THP, the solubilized HDPE is precipitated by lowering the temperature of the toluene, the solubilized PET is precipitated by lowering the temperature of the GVL, the solubilized nylon 6,6,6 is precipitated by lowering the temperature of the 1,2-propanediol, the solubilized nylon 6 is precipitated by lowering the temperature of the DMSO, and the solubilized nylon 6,6 is precipitated by adding water.

* * * * *